US012578829B2

(12) United States Patent
Kim et al.

(10) Patent No.: US 12,578,829 B2
(45) Date of Patent: Mar. 17, 2026

(54) INPUT SENSING UNIT HAVING IMPROVED SENSING SENSITIVITY AND DISPLAY DEVICE INCLUDING THE SAME

(71) Applicant: Samsung Display Co., Ltd., Yongin-Si (KR)

(72) Inventors: Gayoung Kim, Yongin-si (KR); Jina Kang, Yongin-si (KR); Kyowon Ku, Yongin-si (KR); Young-Seok Seo, Yongin-si (KR); Hyunjee Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/658,605

(22) Filed: May 8, 2024

(65) Prior Publication Data

US 2024/0302931 A1 Sep. 12, 2024

Related U.S. Application Data

(63) Continuation of application No. 18/418,369, filed on Jan. 22, 2024, now Pat. No. 12,039,138.

(30) Foreign Application Priority Data

Mar. 6, 2023 (KR) ........................ 10-2023-0029092

(51) Int. Cl.
*G06F 3/044* (2006.01)
*G06F 3/046* (2006.01)

(52) U.S. Cl.
CPC ............ *G06F 3/0446* (2019.05); *G06F 3/046* (2013.01); *G06F 2203/04106* (2013.01)

(58) Field of Classification Search
CPC ................... G06F 3/0446; G06F 3/046; G06F 2203/04106
See application file for complete search history.

(56) References Cited

U.S. PATENT DOCUMENTS 9,639,220 B2 5/2017 Wang
11,402,943 B2 8/2022 Cho et al.
(Continued)

FOREIGN PATENT DOCUMENTS

KR 10-2020-0060601 A 6/2020
KR 10-2022-0062191 A 5/2022

*Primary Examiner* — Lisa S Landis
(74) *Attorney, Agent, or Firm* — Innovation Counsel LLP

(57) ABSTRACT

Disclosed are an input sensing unit and a display device including the input sensing unit. The input sensing unit includes a first sensing electrode extending in a first direction, a second sensing electrode extending in a second direction and insulated from the first sensing electrode, a first pen sensing electrode extending in the first direction and including a $1\text{-}1^{st}$ pen sensing electrodes and a $1\text{-}2^{nd}$ pen sensing electrode disposed on different layers and overlapping each other, and a second pen sensing electrode extending in the second direction and including a $2\text{-}1^{st}$ pen sensing electrodes and a $2\text{-}2^{nd}$ pen sensing electrode disposed on different layers and overlapping each other. The $1\text{-}1^{st}$ pen sensing electrode is disposed adjacent to the first sensing electrode on the same layer, and the $2\text{-}1^{st}$ pen sensing electrode is disposed adjacent to the second sensing electrode on the same layer.

28 Claims, 27 Drawing Sheets

(56) References Cited

U.S. PATENT DOCUMENTS

| | | | |
|---|---|---|---|
| 11,625,118 B2 | 4/2023 | Kim et al. | |
| 2021/0342053 A1* | 11/2021 | Cho | .................. G06F 3/04164 |

* cited by examiner

DD

PIT
HC
WP } WM
AL
WIN
AL1
DM
AL2
PPL
AL3
CSL
AL4
CTL1
AL5
CTL2

I ◄——————————————————————————————————————————► I'

NDA ◄——► DA ◄——► NDA

DR3
⊗ ——► DR2
DR1

NDA ◄——► DA ◄——► NDA

ARL
ISP
TFE
OL
CL
SUB

DM {
DP {

DR3
⊗ ——► DR2
DR1

PSP1-2

DME

SCT1

CP2

PSE2-2

CT1

CT2

SCT3

SCT4

OP1

SCT2

PSE1-2

PSP1-2

DR1

DR2

DR3

INPUT SENSING UNIT HAVING IMPROVED SENSING SENSITIVITY AND DISPLAY DEVICE INCLUDING THE SAME

CROSS-REFERENCE TO RELATED APPLICATIONS

This application is a continuation application of U.S. patent application Ser. No. 18/418,369, filed on Jan. 22, 2024, which claims priority under 35 U.S.C. § 119 to Korean Patent Application No. 10-2023-0029092 filed on Mar. 6, 2023, in the Korean Intellectual Property Office, the disclosures of which are incorporated by reference herein in their entireties.

BACKGROUND

Embodiments of the present disclosure described herein relate to an input sensing unit and a display device including the input sensing unit.

Multimedia devices, such as a television, a mobile phone, a tablet computer, a car navigation unit, a game machine, and the like, include a display device that generates an image and displays the image for a user through a display screen. The display device may include a display panel that displays an image, a touch panel that senses a touch of a user, and a digitizer that senses a touch of a pen.

The touch panel and the digitizer may be separate devices disposed on and under the display panel and driven in different ways. To provide the display device that senses the touch of the user and the touch of the pen, the touch panel and the digitizer are required to be disposed in the display device. Due to this, the thickness of the display device may be increased.

SUMMARY

Embodiments of the present disclosure provide a display device including an input sensing unit having improved sensing sensitivity for a pen.

Embodiments of the present disclosure provide a display device for sensing external inputs, such as a touch of a user and a touch of a pen, and decreasing the thickness.

According to an embodiment, an input sensing unit includes a first sensing electrode that extends in a first direction, a second sensing electrode that extends in a second direction crossing the first direction and that is insulated from the first sensing electrode, a first pen sensing electrode that extends in the first direction and includes a pen sensing electrode 1-1 and a pen sensing electrode 1-2 that are disposed on different layers and that overlap each other, and a second pen sensing electrode that extends in the second direction and includes a pen sensing electrode 2-1 and a pen sensing electrode 2-2 that are disposed on different layers and that overlap each other. The pen sensing electrode 1-1 is disposed adjacent to the first sensing electrode and disposed on the same layer as the first sensing electrode, and the pen sensing electrode 2-1 is disposed adjacent to the second sensing electrode and disposed on the same layer as the second sensing electrode.

The pen sensing electrode 1-1 and the pen sensing electrode 1-2 may be electrically connected to each other, and the pen sensing electrode 2-1 and the pen sensing electrode 2-2 may be electrically connected to each other.

The pen sensing electrode 1-1 and the pen sensing electrode 2-1 may be disposed on the same layer, and the pen sensing electrode 1-2 and the pen sensing electrode 2-2 may be disposed on the same layer.

The first sensing electrode may include a sensing electrode 1-1 and a sensing electrode 1-2 having shapes symmetrical to each other in the second direction, and the second sensing electrode may include a sensing electrode 2-1 and a sensing electrode 2-2 having shapes symmetrical to each other in the first direction. The pen sensing electrode 1-1 may be disposed between the sensing electrode 1-1 and the sensing electrode 1-2 in a plan view, and the pen sensing electrode 2-1 may be disposed between the sensing electrode 2-1 and the sensing electrode 2-2 in a plan view.

Each of the sensing electrode 2-1 and the sensing electrode 2-2 may include second sensing patterns arranged in the second direction and second connecting patterns, each of which overlaps the second sensing patterns spaced apart from each other in the second direction, the second connecting patterns being disposed on a layer different from the second sensing patterns. The second sensing patterns may be electrically connected through the second connecting patterns.

Each of the sensing electrode 1-1 and the sensing electrode 1-2 may include first sensing patterns arranged in the first direction and first extending patterns that extend from the first sensing patterns in the first direction and connect the first sensing patterns. The first extending patterns may be integrally formed with the first sensing patterns.

The pen sensing electrode 1-1 may include pen sensing patterns 1-1 disposed on the same layer as the first sensing patterns and arranged in the first direction and extending patterns 1-1 that extend from the pen sensing patterns 1-1 in the first direction and connect the pen sensing patterns 1-1. The pen sensing patterns 1-1 and the extending patterns 1-1 may be integrally formed with each other.

The pen sensing electrode 1-2 may include pen sensing patterns 1-2 disposed on the same layer as the second connecting patterns and arranged in the first direction. The pen sensing patterns 1-2 may overlap the pen sensing patterns 1-1, respectively and may be electrically connected to the pen sensing patterns 1-1.

The pen sensing electrode 2-1 may include pen sensing patterns 2-1 disposed on the same layer as the second sensing patterns and arranged in the second direction and extending patterns 2-1 that extend from the pen sensing patterns 2-1 in the second direction.

The pen sensing electrode 2-2 may be formed of the same material and formed at the same time with the pen sensing patterns 1-2 and the second connecting pattern while overlapping the pen sensing patterns 2-1 and the extending patterns 2-1 and may be disposed to cross between the pen sensing patterns 1-2 spaced apart from each other in the first direction.

Openings may be defined in the pen sensing electrode 2-2, and the second connecting patterns may be disposed in the openings, respectively.

The first extending patterns and the extending patterns 1-1 may be disposed to cross between the extending patterns 2-1.

The pen sensing electrode 2-1 may include pen sensing patterns 2-1 disposed on the same layer as the second sensing patterns and arranged in the second direction, extending patterns 2-1 that extend from the pen sensing patterns 2-1 in the second direction, and connecting patterns 2-1 spaced apart from the pen sensing patterns 2-1 and the extending patterns 2-1 and disposed on the same layer as the pen sensing patterns 2-1 and the extending patterns 2-1. The pen sensing electrode 2-2 may include pen sensing patterns 2-2 that overlap a corresponding pen sensing pattern 2-1 among the pen sensing patterns 2-1 and a corresponding connecting pattern 2-1 among the connecting patterns 2-1. The pen sensing patterns 2-1 may be electrically connected to each other through the connecting patterns 2-1 and the pen sensing patterns 2-2.

Openings may be defined in each of the pen sensing patterns 2-2, and the second connecting patterns may be disposed in the openings, respectively.

The input sensing unit may further include a dummy pattern that is disposed between the pen sensing electrode 1-2 and the pen sensing electrode 2-2 and that overlaps the first sensing patterns and the second sensing patterns in a plan view.

The pen sensing electrode 2-1 may include pen sensing patterns 2-1 disposed on the same layer as the second sensing patterns and arranged in the second direction, and extending patterns 2-1 that extend from the pen sensing patterns 2-1 in the second direction. The pen sensing electrode 2-2 may include pen sensing patterns 2-2 that are disposed on the same layer as the second connecting patterns and that overlap the pen sensing patterns 2-1 and connecting patterns 2-2, each of which overlaps the extending patterns 2-1 spaced apart from each other in the second direction, the connecting patterns 2-2 being spaced apart from the pen sensing patterns 2-2 and disposed on the same layer as the pen sensing patterns 2-2. The connecting patterns 2-2 may be electrically connected to the overlapping extending patterns 2-1.

The pen sensing electrode 1-2 may be disposed to cross between the pen sensing patterns 2-2 and disposed on the same layer as the pen sensing patterns 2-2, and first openings that overlap the second connecting patterns and second openings that overlap the connecting patterns 2-2 may be defined in the pen sensing electrode 1-2.

Each of the sensing electrode 1-1 and the sensing electrode 1-2 may include first sensing patterns disposed on the same layer as the second sensing patterns and arranged in the first direction and first connecting patterns, each of which overlaps the first sensing patterns spaced apart from each other in the first direction, the first connecting patterns being disposed on the same layer as the second connecting patterns. The first sensing patterns may be electrically connected through the first connecting patterns.

The pen sensing electrode 2-1 may include pen sensing patterns 2-1 disposed on the same layer as the second sensing patterns and arranged in the second direction and connecting patterns 2-1 disposed between the pen sensing patterns 2-1 to be spaced apart from each other and disposed on the same layer as the pen sensing patterns 2-1. The pen sensing patterns 2-1 may be electrically connected together through the connecting patterns 2-1 and the pen sensing electrode 2-2.

The pen sensing electrode 2-2 may include pen sensing patterns 2-2-1 that overlap a corresponding pen sensing pattern 2-1 among the pen sensing patterns 2-1 and a corresponding connecting pattern 2-1 among the connecting patterns 2-1 and pen sensing patterns 2-2-2, each of which overlaps the connecting patterns 2-1 arranged in the second direction, the pen sensing patterns 2-2-2 being disposed between the pen sensing patterns 2-2-1.

Openings may be defined in each of the pen sensing patterns 2-2-2, and the second connecting patterns may be disposed in the openings, respectively.

The pen sensing electrode 1-1 may include pen sensing patterns 1-1 disposed on the same layer as the first sensing patterns and arranged in the first direction and extending patterns 1-1 that extend from the pen sensing patterns 1-1 in the first direction and connect the pen sensing patterns 1-1. The pen sensing patterns 1-1 and the extending patterns 1-1 may be integrally formed with each other.

The pen sensing electrode 1-1 may include pen sensing patterns 1-1 disposed on the same layer as the first sensing patterns and arranged in the first direction and connecting patterns 1-1 spaced apart from the pen sensing patterns 1-1 and disposed on the same layer as the pen sensing patterns 1-1. The pen sensing patterns 1-1 may be electrically connected to each other through the connecting patterns 1-1 and the pen sensing electrode 1-2.

The pen sensing electrodes 1-2 may include pen sensing patterns 1-2 arranged in the first direction with the pen sensing patterns 2-2-2 disposed therebetween, the pen sensing patterns 1-2 and the pen sensing pattern 2-2-2 being disposed on the same layer, and the pen sensing patterns 1-2 may overlap the pen sensing patterns 1-1, respectively and may be electrically connected to the pen sensing patterns 1-1.

The pen sensing electrode 2-1 may include pen sensing patterns 2-1 disposed on the same layer as the second sensing patterns and arranged in the second direction and extending patterns 2-1 that extend from the pen sensing patterns 2-1 in the second direction and connect the pen sensing patterns 2-1. The pen sensing patterns 2-1 and the extending patterns 2-1 may be integrally formed with each other.

Openings may be defined in the pen sensing electrode 1-2, and the second connecting patterns may be disposed in the openings, respectively.

The pen sensing electrode 2-2 may include pen sensing patterns 2-2 arranged in the second direction with the pen sensing electrode 1-2 disposed therebetween, the pen sensing patterns 2-2 and the pen sensing electrode 1-2 being disposed on the same layer, and each of the pen sensing patterns 2-2 may be electrically connected to a corresponding pen sensing pattern 2-1 among the pen sensing patterns 2-1 and a corresponding extending pattern 2-1 among the extending patterns 2-1.

A length of the first pen sensing electrode in the first direction may be longer than a length of the second pen sensing electrode in the second direction.

According to an embodiment, a display device includes a display panel that displays an image and an input sensing unit that is disposed on the display panel and that senses a first input and a second input different from each other. The input sensing unit includes a first sensing electrode including first sensing patterns arranged in a first direction, a second sensing electrode that is insulated from the first sensing electrode and that includes second sensing patterns disposed on the same layer as the first sensing patterns and arranged in a second direction, a first pen sensing electrode that extends in the first direction and that is disposed adjacent to the first sensing patterns, and a second pen sensing electrode that extends in the second direction and that is disposed adjacent to the second sensing patterns and insulated from the first pen sensing electrode. At least one of the first pen sensing electrode and the second pen sensing electrode includes first pen sensing patterns disposed on the same layer as the first and second sensing patterns and second pen sensing patterns disposed on a layer different from the first and second sensing patterns and electrically connected to the first pen sensing patterns.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1A:
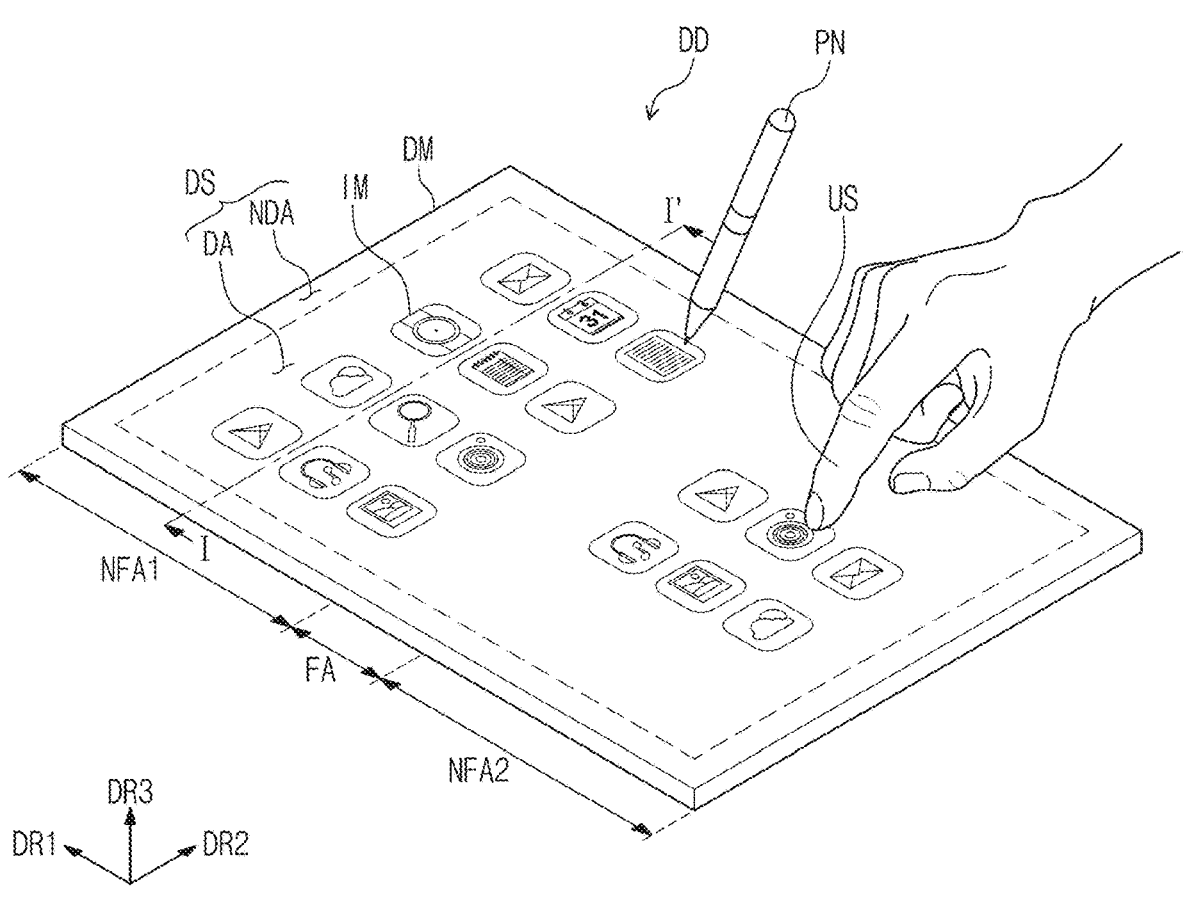
FIG. 1A is a perspective view of a display device according to an embodiment of the present disclosure.

Various changes can be made to the present disclosure, and various embodiments of the present disclosure may be implemented. Thus, specific embodiments are illustrated in the drawings and described as examples herein. However, it should be understood that the present disclosure is not to be construed as being limited thereto and covers all modifications, equivalents, and alternatives falling within the spirit and scope of the present disclosure.

In this specification, when it is mentioned that a component (or, an area, a layer, a part, etc.) is referred to as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description. As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, an input sensing unit and a display device according to an embodiment of the present disclosure will be described with reference to the accompanying drawings.

Figure 1B:
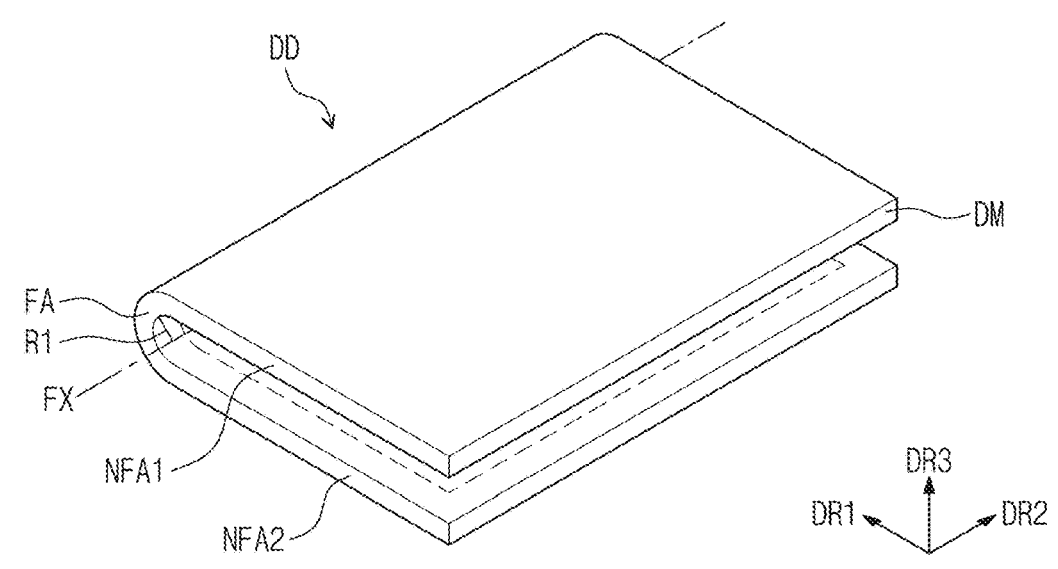
FIG. 1B is a perspective view illustrating a folded state of the display device illustrated in FIG. 1A.

FIG. 1A is a perspective view of the display device DD according to an embodiment of the present disclosure. FIG. 1B is a perspective view illustrating a folded state of the display device DD illustrated in FIG. 1A.

The display device DD may be a device that is activated depending on an electrical signal and that displays an image IM. For example, the display device DD may be a large device such as a television, a billboard, or the like, or may be a small and medium-sized device such as a monitor, a mobile phone, a tablet computer, a car navigation unit, a game machine, or the like. However, the embodiments of the display device DD are illustrative, and the display device DD is not limited to any one as long as it does not deviate from the spirit and scope of the present disclosure.

Referring to FIG. 1A, the display device DD may include a display module DM that displays the image IM and senses an external input. In a plan view, the display module DM may have a rectangular shape with long sides extending in a first direction DR1 and short sides extending in a second direction DR2 crossing the first direction DR1. However, without being limited thereto, the display module DM may have various shapes such as a circular shape, a polygonal shape, and the like.

In this embodiment, a third direction D3 may be defined as a direction substantially perpendicular to a plane defined by the first direction D1 and the second direction D2. Front surfaces (or, upper surfaces) and rear surfaces (or, lower surfaces) of elements constituting the display device DD may be opposite each other in the third direction DR3, and the normal directions of the front surfaces and the rear surfaces may be substantially parallel to the third direction DR3. Separation distances between the front surfaces and the rear surfaces defined in the third direction DR3 may correspond to the thicknesses of the elements.

The expression "from above the plane" or "in a plan view" used herein may mean that it is viewed in the third direction DR3. The expression "on a section" or "in a cross-sectional view" used herein may mean that it is viewed in the first direction DR1 or the second direction DR2. Meanwhile, the directions indicated by the first to third directions DR1, DR2, and DR3 may be relative concepts and may be changed to different directions.

The display device DD may be a rigid or flexible display device. The term "flexible" used herein may mean a property of being bent and may include everything from a structure that can be fully folded to a structure that can be bent to a level of several nanometers. For example, the flexible display device DD may include a curved device, a rollable device, a slidable device, or a foldable device.

The display module DM may have flexibility. The display module DM may include a folding region FA and at least one non-folding region NFA1 or NFA2. FIG. 1A illustrates the display module DM including the first and second non-folding regions NFA1 and NFA2. The folding region FA may be disposed between the first non-folding region NFA1 and the second non-folding region NFA 2. The first non-folding region NFA1, the folding region FA, and the second non-folding region NFA 2 may be arranged in the first direction DR1.

An upper surface of the display module DM may be defined as a display surface DS and may have a plane defined by the first direction DR1 and the second direction DR2. The image IM generated by the display module DM may be provided to a user through the display surface DS.

The display surface DS may include a display region DA and a non-display region NDA adjacent to the display region DA. The display region DA may display the image IM, and the non-display region NDA may not display the image IM. The non-display region NDA may correspond to a region that surrounds the display region DA and that is printed in a predetermined color and may define a border of the display module DM.

The display module DM may sense inputs applied from outside the display module DM. For example, the display module DM may sense a first input by a touch of a user US and a second input by a pen PN. Through time division driving, the display module DM may sense the input by the touch of the user US (or the first input) during a first mode period and may sense the input by the pen PN (or the second input) during a second mode period.

Referring to FIGS. 1A and 1B, the display device DD may be a foldable display device that has a folded state and an unfolded state. For example, the folding region FA of the display device DD may be folded about a folding axis FX parallel to the second direction DR2. FIG. 1B illustrates an example that the folding axis FX is defined as a short axis parallel to the short sides of the display module DM. However, without being limited thereto, the folding axis FX may be defined as a long axis parallel to the long sides of the display module DM.

When the display device DD is folded, the folding region FA may be bent to have a radius of curvature R1. In an embodiment, the distance between the first non-folding region NFA1 and the second non-folding region NFA2 may be substantially the same as two times the radius of curvature R1. However, without being limited thereto, the display device DD may be folded such that the distance between the first non-folding region NFA1 and the second non-folding region NFA2 is less than two times the radius of curvature R1 and may have a dumbbell shape in a cross-sectional view.

When the display module DM is folded, the display surfaces DS corresponding to the first non-folding region NFA1 and the second non-folding region NFA2 may face each other. The display module DM may be folded in an in-folding manner such that the display surface DS of the display module DM is not exposed to the outside. However, without being limited thereto, the display module DM may be folded in an out-folding manner such that the display surface DS of the display module DM is exposed to the outside.

In an embodiment, the display device DD may be configured such that in-folding and out-folding operations are repeated from an unfolding operation, or without being limited thereto, the display device DD may be configured to select one of an in-folding operation and an out-folding operation from an unfolding operation.

Figure 2:
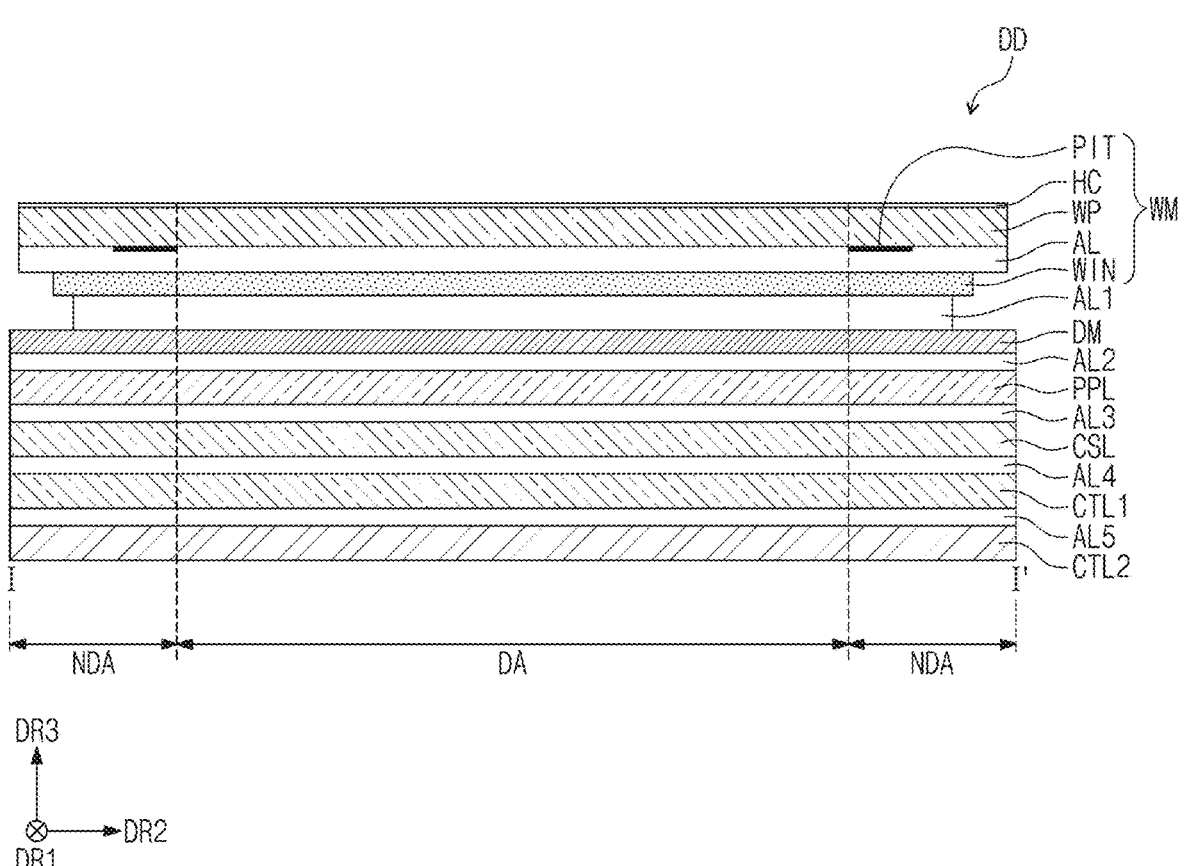
FIG. 2 is a cross-sectional view of the display device corresponding to line I-I' of FIG. 1A according to an embodiment of the present disclosure.

FIG. 2 is a cross-sectional view of the display device DD according to an embodiment of the present disclosure. FIG. 2 illustrates a section of the display device DD corresponding to line I-I' of FIG. 1A.

The display device DD may include a window WM, the display module DM, a panel protection layer PPL, a cushion layer CSL, a first conductive sheet CTL1, a second conductive sheet CTL2, and first to fifth adhesive layers AL1 to AL5.

Each of the first to fifth adhesive layers AL1 to AL5 may couple two components stacked adjacent to each other among the components of the display device DD. The first to fifth adhesive layers AL1 to AL5 may include a pressure sensitive adhesive (PSA) or an optically clear adhesive (OCA). However, the types of adhesive layers are not limited thereto.

The display module DM may display an image and may simultaneously sense the above-described first and second inputs. The display module DM may include at least a display panel DP (refer to FIG. 3) and an input sensing unit ISP (refer to FIG. 3) that will be described below. A configuration of the display module DM will be described below in detail.

The window WM may provide an outer surface of the display device DD. The window WM may be disposed on the display module DM and may protect the display module DM from an external impact and a scratch.

The window WM may include a base film layer WIN, a window protection layer WP, a hard coating layer HC, and a printed layer PIT (or a black matrix layer).

The base film layer WIN may have an optically transparent property. The base film layer WIN may include glass or a synthetic resin. The base film layer WIN may have a single-layer structure or a multi-layer structure. For example, the base film layer WIN may include synthetic resin films coupled by an adhesive, or may include a glass film and a synthetic resin film coupled by an adhesive.

The window protection layer WP may be disposed on the base film layer WIN. The window protection layer WP may be attached to the base film layer WIN through an adhesive layer AL. The window protection layer WP may include a flexible plastic material such as polyimide or polyethylene terephthalate.

The hard coating layer HC may be disposed on an upper surface of the window protection layer WP. The upper surface of the window protection layer WP may be coated with the hard coating layer HC. The hard coating layer HC may include a hard coating agent including at least one of an organic composition, an inorganic composition, and an organic-inorganic composite composition. The hard coating layer HC may improve the durability of the window WM, may prevent a scratch, and may provide a flat upper surface.

The printed layer PIT may be disposed on a lower surface of the window protection layer WP. The printed layer PIT may be a black matrix layer having a black color. However, the color of the printed layer PIT is not limited thereto. The printed layer PIT may overlap the non-display region NDA. The printed layer PIT may be adjacent to the periphery of the window protection layer WP. However, a stacked structure of the window WM is not necessarily limited to the structure illustrated in FIG. 2, and the order in which some components are stacked may be changed. Furthermore, components of the window WM are not limited to those described above, and some of the components may be omitted or additional components may be further disposed.

The panel protection layer PPL may be disposed under the display module DM. The panel protection layer PPL may protect the bottom of the display module DM. The panel protection layer PPL may include a flexible plastic material. For example, the panel protection layer PPL may include polyethylene terephthalate. However, without being limited thereto, the panel protection layer PPL may be omitted.

The cushion layer CSL may be disposed under the panel protection layer PPL. The cushion layer CSL may absorb an external impact. The cushion layer CSL may have a porous structure. For example, the cushion layer CSL may include synthetic resin foam such as acrylonitrile butadiene styrene copolymer, polyurethane, polyethylene, ethylene vinyl acetate, or plyvinyl chloride. However, without being limited thereto, the cushion layer CSL may be omitted.

The first conductive sheet CTL1 may be disposed under the cushion layer CSL. The second conductive sheet CTL2 may be disposed under the first conductive sheet CTL1. Each of the first conductive sheet CTL1 and the second conductive sheet CTL2 may include a conductive material. The first conductive sheet CTL1 and the second conductive sheet CTL2 may shield an external magnetic field such that the external magnetic field is not applied to the display module DM from below the display module DM. However, without being limited thereto, at least one of the first conductive sheet CTL1 and the second conductive sheet CTL2 may be omitted.

The first conductive sheet CTL1 may include a material having a high magnetic permeability. The first conductive sheet CTL1 may include a ferromagnetic material. The first conductive sheet CTL1 may be provided as a ferrite sheet including ferrite. Alternatively, the first conductive sheet CTL1 may include a magnetic metal powder layer that includes a base resin and magnetic metal powder mixed in the base resin.

The second conductive sheet CTL2 may include a diamagnetic material. The second conductive sheet CTL2 may have noise shielding and/or heat dissipation effects. For example, the second conductive sheet CTL2 may block electromagnetic waves such that electromagnetic waves generated from electronic modules of the display device DD do not interfere with the display module DM. Furthermore, the second conductive sheet CTL2 may release heat generated from the display module DM. The second conductive sheet CTL2 may include a metal layer such as copper, aluminum, gold, or titanium, a metal oxide layer such as ITO or IZO, carbon nano-tubes, or graphite.

Figure 3:
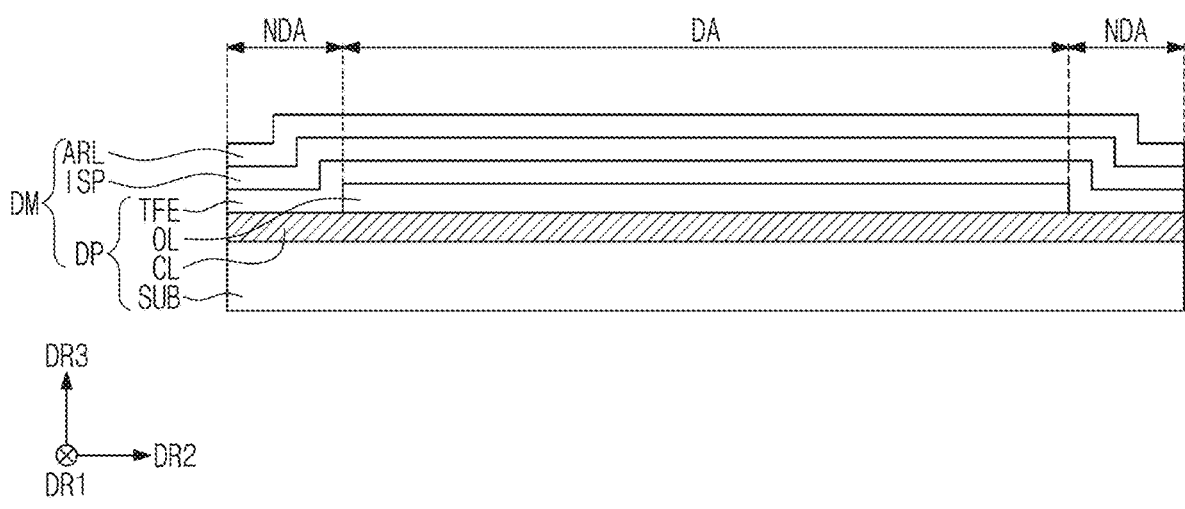
FIG. 3 is a cross-sectional view of a display module according to an embodiment of the present disclosure.

FIG. 3 is a cross-sectional view of the display module DM according to an embodiment of the present disclosure.

Referring to FIG. 3, the display module DM may include the display panel DP, the input sensing unit ISP, and an anti-reflection layer ARL.

The display panel DP according to an embodiment may be an emissive display panel and the configuration of the display panel DP is not particularly limited. For example, the display panel DP may be an organic light emitting display panel or an inorganic light emitting display panel. An emissive layer of the organic light emitting display panel may include an organic light emitting material. An emissive layer of the inorganic light emitting display panel may include quantum dots, quantum rods, and the like. Hereinafter, it will be exemplified that the display panel DP is an organic light emitting display panel.

The display panel DP may include a base substrate SUB, a circuit element layer CL, a display element layer OL, and a thin film encapsulation layer TFE.

The base substrate SUB may provide a base surface on which the circuit element layer CL is disposed. The base substrate SUB may be a rigid substrate, or a flexible substrate that can be bent, folded, or rolled. The base substrate SUB may be a glass substrate, a metal substrate, or a polymer substrate. However, embodiments are not limited thereto, and the base substrate SUB may be an inorganic layer, an organic layer, or a composite layer.

The base substrate SUB may have a multi-layer structure. For example, the base substrate SUB may include synthetic resin layers and a single inorganic layer or multiple inorganic layers disposed between the synthetic resin layers. Each of the synthetic resin layers may include an acrylate-based resin, a methacrylate-based resin, a polyisoprene-based resin, a vinyl-based resin, an epoxy-based resin, a urethane-based resin, a celluose-based resin, a siloxane-based resin, a polyamide-based resin, or a perylene-based resin, but is not particularly limited.

The circuit element layer CL may be disposed on the base substrate SUB. The circuit element layer CL may include an insulating layer, a semiconductor pattern, and a conductive pattern. The insulating layer, the semiconductor pattern, and the conductive pattern included in the circuit element layer CL may form drive elements, signal lines, and pads in the circuit element layer CL.

The display element layer OL may be disposed on the circuit element layer CL. The display element layer OL may include light emitting elements disposed in the display region DA. The light emitting elements may include an organic light emitting element, an inorganic light emitting element, a micro LED, or a nano LED, but are not particularly limited. The light emitting elements of the display element layer OL may be electrically connected to the drive elements of the circuit element layer CL and may generate light in the display region DA depending on signals provided by the drive elements.

The thin film encapsulation layer TFE may be disposed on the display element layer OL and may seal the light emitting elements. The thin film encapsulation layer TFE may include at least one thin film for improving the optical efficiency of the display element layer OL or protecting the display element layer OL. The thin film encapsulation layer TFE may include at least one of an inorganic film and an organic film.

The input sensing unit ISP may be disposed on the display panel DP. The input sensing unit ISP may be formed through a continuous process on a base surface provided by the display panel DP. The input sensing unit ISP may be directly disposed on the display panel DP without an additional adhesive layer. However, without being limited thereto, the input sensing unit ISP may be coupled to the display panel DP through an adhesive layer.

The input sensing unit ISP may include sensing electrodes for sensing the first input (e.g., the touch of the user US, refer to FIG. 1A) in a capacitive type. The input sensing unit ISP may include pen sensing electrodes for sensing the second input (e.g., the input by the pen PN, refer to FIG. 1A) in an electromagnetic type (or an electromagnetic resonance type). The input sensing unit ISP may be provided as an integrated sensing panel that senses the first and second inputs different from each other.

The anti-reflection layer ARL may be disposed on the input sensing unit ISP. The anti-reflection layer ARL may be directly disposed on the input sensing unit ISP. However, without being limited thereto, the anti-reflection layer ARL may be coupled with the input sensing unit ISP through an adhesive layer. The anti-reflection layer ARL may decrease the reflectance of external light incident from outside the display device DD (refer to FIG. 2).

In an embodiment, the anti-reflection layer ARL may include a phase retarder and/or a polarizer. The phase retarder and the polarizer may be provided in a film type or a liquid crystal coating type. Alternatively, the phase retarder and the polarizer may be provided in the form of one polarizer film.

In an embodiment, the anti-reflection layer ARL may include color filters. The color filters may be disposed to correspond to the arrangement and light emission colors of pixels included in the display panel DP. The color filters may filter light incident from the outside in the same colors as the light emission colors of the pixels. The anti-reflection layer ARL may further include a light blocking pattern disposed adjacent to the color filters.

Meanwhile, although FIG. 3 illustrates the embodiment in which the input sensing unit ISP and the anti-reflection layer ARL are sequentially disposed on the display panel DP, embodiments are not limited thereto. For example, the order in which the anti-reflection layer ARL and the input sensing unit ISP are stacked may be changed.

Figure 4:
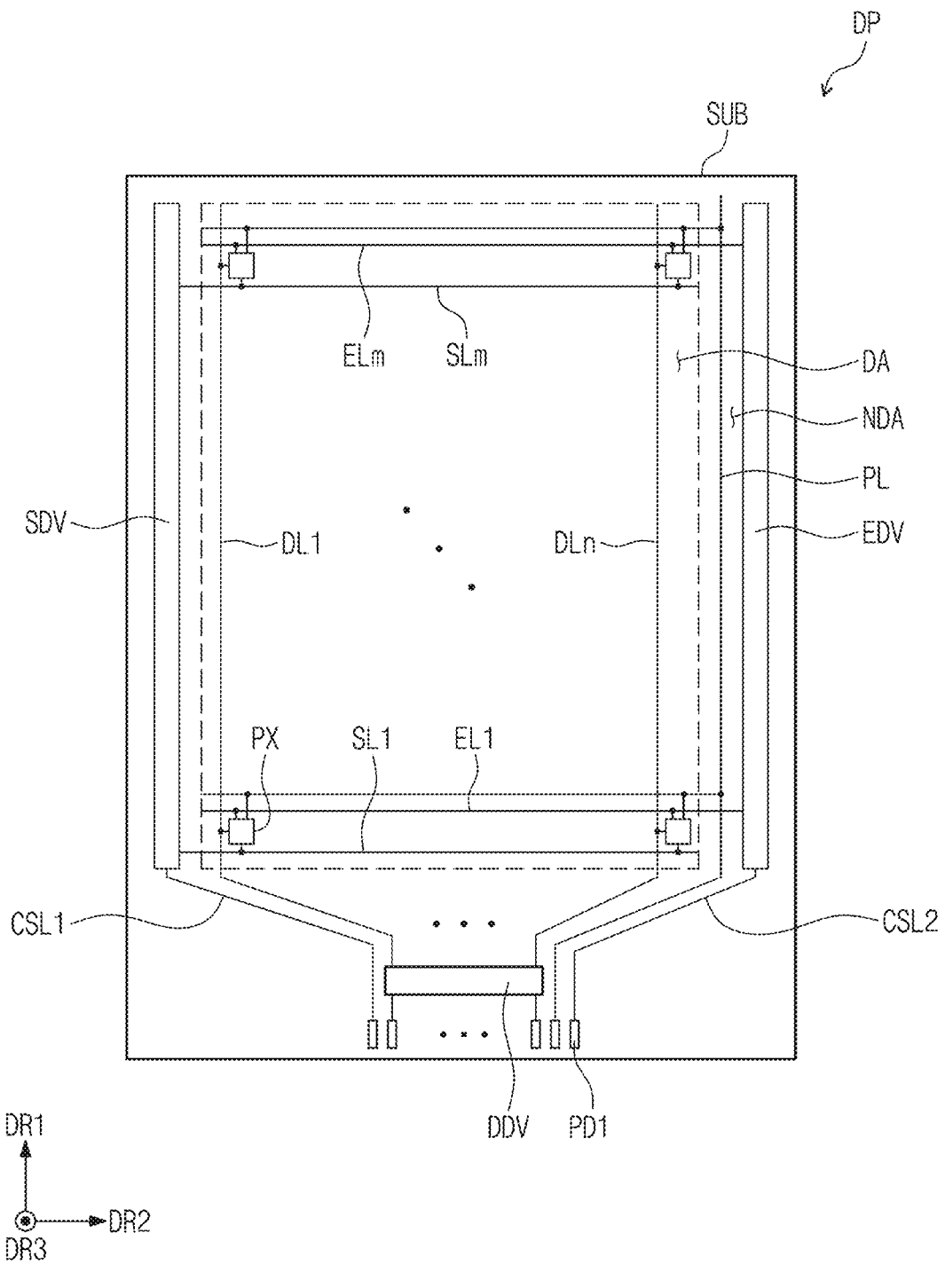
FIG. 4 is a plan view of a display panel according to an embodiment of the present disclosure.

FIG. 4 is a plan view of the display panel DP according to an embodiment of the present disclosure.

Referring to FIG. 4, the display panel DP may include the base substrate SUB, pixels PX, signal lines SL1 to SLm, DL1 to DLn, EL1 to ELm, CSL1, CSL2, and PL electrically connected to the pixels PX, a scan driver SDV, a data driver DDV, and an emission driver EDV.

In a plan view parallel to the first direction DR1 and the second direction DR2, the base substrate SUB may provide a base surface on which elements and lines of the display panel DP are disposed. The base substrate SUB may include the display region DA and the non-display region NDA of the display panel DP described above.

The pixels PX may be disposed in the display region DA and may display an image. The non-display region NDA may be a region that is adjacent to the display region DA and on which an image is not displayed. The scan driver SDV, the data driver DDV, and the emission driver EDV for driving the pixels PX may be disposed in the non-display region NDA. However, to decrease the area of the non-display region NDA, at least one of the scan driver SDV, the data driver DDV, and the emission driver EDV may be disposed in the display region DA.

Each of the pixels PX may include a light emitting element and a pixel drive circuit that includes transistors (e.g., a switching transistor and a drive transistor) and at least one capacitor that are connected to the light emitting element. The pixels PX may emit light in response to electrical signals applied to the pixels PX and may display an image in the display region DA. Some of the pixels PX may include a transistor disposed in the non-display region NDA and are not limited to any one embodiment.

The signal lines SL1 to SLm, DL1 to DLn, EL1 to ELm, CSL1, CSL2, and PL may include the scan lines SL1 to SLm, the data lines DL1 to DLn, the emission lines EL1 to ELm, the first and second control lines CSL1 and CSL2, and the power line PL. Here, "m" and "n" are natural numbers of 1 or larger.

The data lines DL1 to DLn may be insulated from the scan lines SL1 to SLm and the emission lines EL1 to Elm, and may cross the scan lines SL1 to SLm and the emission lines EL1 to ELm. For example, the scan lines SL1 to SLm may extend in the second direction DR2 and may be electrically connected to the scan driver SDV. The data lines DL1 to DLn may extend in the first direction DR1 and may be electrically connected to the data driver DDV. The emission lines EL1 to ELm may extend in the second direction DR2 and may be electrically connected to the emission driver EDV.

The power line PL may include a portion extending in the first direction DR1 and a portion extending in the second portion DR2. The portion of the power line PL that extends in the first direction DR1 may be disposed in the non-display region NDA. The portion of the power line PL that extends in the second direction DR2 may be electrically connected to the pixels PX and the portion of the power line PL that extends in the first direction DR1. The portion of the power line PL that extends in the second direction DR2 may be disposed on a layer different from the portion extending in the first direction DR1 and may be connected to the portion extending in the first direction DR1 through a contact hole, or may be integrally formed with the portion extending in the first direction DR1 on the same layer.

The first control line CSL1 may be electrically connected to the scan driver SDV. The second control line CSL2 may be electrically connected to the emission driver EDV.

First pads PD1 may be disposed adjacent to a lower end of the non-display region NDA. The first pads PD1 may be disposed closer to the lower end of the display panel DP than the data driver DDV. The first pads PD1 may be spaced apart from each other in the second direction DR2.

The first pads PD1 may be defined as display pads electrically connected to the pixels PX. Each of the first pads PD1 may be connected to a corresponding signal line among the signal lines SL1 to SLm, DL1 to DLn, EL1 to ELm, CSL1, CSL2, and PL. For example, the first pads PD1 may be electrically connected to the power line PL, the first control line CSL1, the second control line CSL2, and the data lines DL1 to DLn.

The scan driver SDV may generate scan signals in response to a scan control signal. The scan signals may be applied to the pixels PX through the scan lines SL1 to SLm. The data driver DDV may generate data voltages corresponding to image signals in response to a data control signal. The data voltages may be applied to the pixels PX through the data lines DL1 to DLn. The emission driver EDV may generate emission signals in response to an emission control signal. The emission signals may be applied to the pixels PX through the emission lines EL1 to ELm.

The pixels PX may receive the data voltages in response to the scan signals. The pixels PX may display an image by emitting light having luminance corresponding to the data voltages in response to the emission signals. Light emission time of the pixels PX may be controlled by the emission signals.

Figure 5:
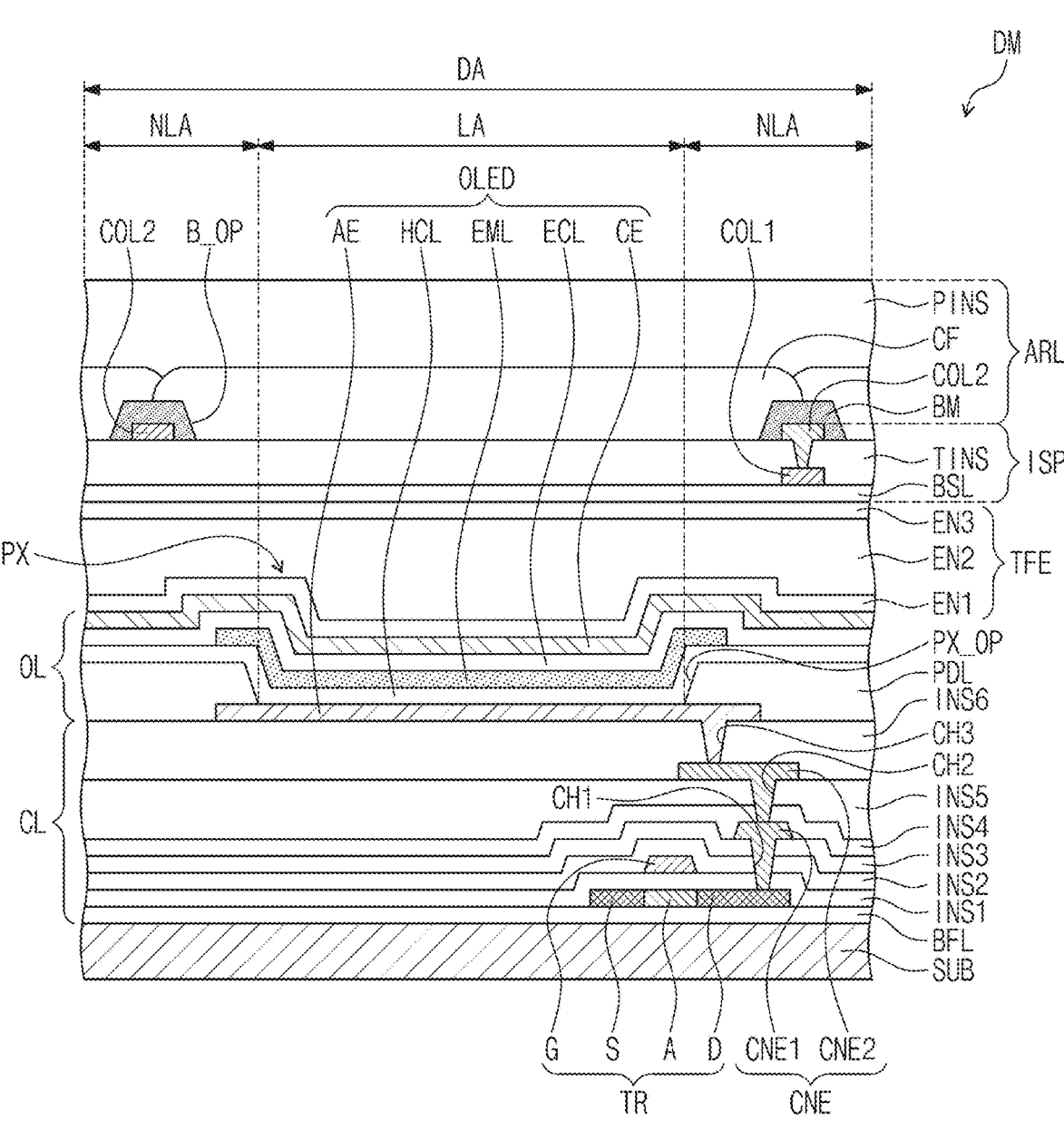
FIG. 5 is a cross-sectional view of the display module according to an embodiment of the present disclosure.

FIG. 5 is a cross-sectional view of the display module DM according to an embodiment of the present disclosure. FIG. 5 illustrates a section of the display module DM corresponding to any one pixel PX illustrated in FIG. 4.

Referring to FIG. 5, the pixel PX may include a transistor TR and a light emitting element OLED. The light emitting element OLED may include a first electrode AE (or, an anode), a second electrode CE (or, a cathode), a hole control layer HCL, an electron control layer ECL, and an emissive layer EML.

The transistor TR and the light emitting element OLED may be disposed on the base substrate SUB. Although FIG. 5 illustrates one transistor TR, the pixel PX may substantially include a plurality of transistors and at least one capacitor for driving the light emitting element OLED.

The buffer layer BFL may be disposed on the base substrate SUB. The buffer layer BFL may include an inorganic layer. The buffer layer BFL may improve an adhesion force between a semiconductor pattern disposed on the buffer layer BFL and the base substrate SUB.

The transistor TR may include a source S, an active region A, a drain D, and a gate G. The source S, the active region A, and the drain D of the transistor TR may be formed from the semiconductor pattern. The semiconductor pattern of the transistor TR may include poly silicon, amorphous silicon, or metal oxide and is not limited to any one as long as it has semiconductor properties.

The semiconductor pattern may include a plurality of regions distinguished depending on conductivity. A region of the semiconductor pattern that is doped with a dopant or in which metal oxide is reduced may have high conductivity and may substantially serve as a source electrode and a drain electrode of the transistor TR. The high-conductivity region of the semiconductor pattern may correspond to the source S and the drain D of the transistor TR. A low-conductivity region of the semiconductor pattern that is not doped or lightly doped or in which metal oxide is not reduced may correspond to the active region A (or, the channel) of the transistor TR.

A first insulating layer INS1 may be disposed on the buffer layer BFL and may cover the semiconductor pattern of the transistor TR. The gate G of the transistor TR may be disposed on the first insulating layer INS1. The gate G may overlap the active region A of the transistor TR. In an embodiment, the gate G may function as a self-aligned mask in a process of doping the semiconductor pattern of the transistor TR.

A second insulating layer INS2 may be disposed on the first insulating layer INS1 and may cover the gate G. A third insulating layer INS3 may be disposed on the second insulating layer INS2.

To connect the transistor TR and the light emitting element OLED, a connecting electrode CNE may include a first connecting electrode CNE1 and a second connecting electrode CNE2. The first connecting electrode CNE1 may be disposed on the third insulating layer INS3 and may be connected to the drain D through a first contact hole CH1 defined in the first to third insulating layers INS1 to INS3.

A fourth insulating layer INS4 may be disposed on the third insulating layer INS3 and may cover the first connecting electrode CNE1. A fifth insulating layer INS5 may be disposed on the fourth insulating layer INS4. The second connecting electrode CNE2 may be disposed on the fifth insulating layer INS5. The second connecting electrode CNE2 may be connected to the first connecting electrode CNE1 through a second contact hole CH2 defined in the fourth and fifth insulating layers INS4 and INS5.

A sixth insulating layer INS6 may be disposed on the second connecting electrode CNE2. The first to sixth insulating layers INS1 to INS6 may be inorganic layers or organic layers. The layers from the buffer layer BFL to the sixth insulating layer INS6 may be defined as the circuit element layer CL. However, the structure of the insulating layers stacked in the circuit element layer CL may be changed in various ways depending on a design of the display panel DP and a manufacturing process of the display panel DP and is not limited to the illustrated embodiment.

The first electrode AE may be disposed on the sixth insulating layer INS6. The first electrode AE may be connected to the second connecting electrode CNE2 through a third contact hole CH3 defined in the sixth insulating layer INS6. The first electrode AE may be electrically connected to the drain D of the transistor TR through the first and second connecting electrodes CNE1 and CNE2.

A pixel defining layer PDL may be disposed on the sixth insulating layer INS6 on the first electrode AE. The pixel defining layer PDL may have a light emitting opening PX_OP defined therein to expose a portion of the first electrode AE. The portion of the first electrode AE exposed by the light emitting opening PX_OP may correspond to an emissive region LA. The region in which the pixel defining layer PDL is disposed may correspond to a non-emissive region NLA. The non-emissive region NLA may surround the emissive region LA in the display region DA.

The hole control layer HCL may be disposed on the first electrode AE and the pixel defining layer PDL. The hole control layer HCL may be provided as a common layer that overlaps the emissive region LA and the non-emissive region NLA. The hole control layer HCL may include at least one of a hole transport layer, a hole injection layer, and an electron blocking layer.

The emissive layer EML may be disposed on the hole control layer HCL. The emissive layer EML may be disposed in a region corresponding to the light emitting opening PX_OP. However, embodiments are not necessarily limited thereto, and the emissive layer EML may be provided as a common layer. The emissive layer EML may include an organic material and/or an inorganic material. The emissive layer EML may generate one of red light, green light, and blue light.

The electron control layer ECL may be disposed on the emissive layer EML. The electron control layer ECL may be provided as a common layer that overlaps the emissive region LA and the non-emissive region NLA. The electron control layer ECL may include at least one of an electron transport layer, an electron injection layer, and a hole blocking layer.

The second electrode CE may be disposed on the electron control layer ECL. The second electrode CE may be commonly disposed on the pixels PX. The layer in which the light emitting element OLED and the pixel defining layer PDL are disposed may be defined as the display element layer OL.

The thin film encapsulation layer TFE may be disposed on the second electrode CE and may cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

In an embodiment, the first and third encapsulation layers EN1 and EN3 may include an inorganic film and may protect the pixel PX from moisture/oxygen. The second encapsulation layer EN2 may include an organic film and may protect the pixel PX from foreign matter such as dust particles. However, embodiments of the thin film encapsulation layer TFE are not necessarily limited thereto.

A first voltage may be applied to the first electrode AE through the transistor TR, and a second voltage having a lower level than the first voltage may be applied to the second electrode CE. Holes and electrons injected into the emissive layer EML may be combined to form excitons, and, as the excitons transition to a ground state, the light emitting element OLED may emit light.

The input sensing unit ISP may be disposed on the thin film encapsulation layer TFE. In an embodiment, the input sensing unit ISP may be directly formed on a base surface provided by the thin film encapsulation layer TFE. The input sensing unit ISP may include a base layer BSL, a first conductive layer COL1, an intermediate insulating layer TINS, and a second conductive layer COL2.

The base layer BSL may be disposed on the thin film encapsulation layer TFE. The base layer BSL may include at least one inorganic insulating layer. The base layer BSL may make contact with the thin film encapsulation layer TFE.

The first conductive layer COL1 may be disposed on the base layer BSL. The intermediate insulating layer TINS may be disposed on the base layer BSL to cover the first conductive layer COL1. The intermediate insulating layer TINS may include an inorganic insulating layer or an organic insulating layer. The second conductive layer COL2 may be disposed on the intermediate insulating layer TINS.

The first and second conductive layers COL1 and COL2 may include conductive patterns having a mesh shape that are disposed to correspond to the non-emissive region NLA. However, without being limited thereto, the first and second conductive layers COL1 and COL2 may include conductive patterns that have light transmittance and overlap the emissive region LA.

The first and second conductive layers COL1 and COL2 may include sensing electrodes SE1 and SE2 (refer to FIG. 6) and pen sensing electrodes PSE1 and PSE2 (refer to FIG. 6) of the input sensing unit ISP that will be described below. For example, the mesh-shaped patterns may be separated from one another in the first and second conductive layers COL1 and COL2 and may form the sensing electrodes SE1 and SE2 (refer to FIG. 6) and the pen sensing electrodes PSE1 and PSE2 (refer to FIG. 6). The anti-reflection layer ARL may be disposed on the second conductive layer COL2. However, without being limited thereto, the input sensing unit ISP may further include an upper insulating layer disposed on the intermediate insulating layer TINS, and the anti-reflection layer ARL may be disposed on the upper insulating layer.

The anti-reflection layer ARL may include a black matrix BM and color filters CF. The black matrix BM may overlap the non-emissive region NLA, and the color filters CF may overlap the emissive regions LA.

The black matrix BM may be disposed on the intermediate insulating layer TINS to cover the second conductive layer COL2 disposed to correspond to the non-emissive region NLA. A barrier opening B_OP overlapping the emissive region LA and the light emitting opening PX_OP may be defined in the black matrix BM. The width of the barrier opening B_OP may be greater than the width of the light emitting opening PX_OP. The black matrix BM may include a light absorbing material and may prevent light from being reflected in the non-emission region NLA.

The color filters CF may be disposed on the intermediate insulating layer TINS and the black matrix BM. The color filters CF may be disposed in the barrier openings B_OP, respectively. When external light incident toward the display panel DP is reflected from the display panel DP and provided back to the user, the user may visually recognize the external light as in a mirror. To prevent such a phenomenon, the color filters CF may filter the external light to display the same colors as those of the pixels PX corresponding thereto and may prevent the external light from being visible to the user.

The anti-reflection layer ARL may further include a planarization insulating layer PINS. The planarization insulating layer PINS may be disposed on the color filters CF. The planarization insulating layer PINS may cover steps between the color filters CF and may provide a flat upper surface. The planarization insulating layer PINS may include an organic insulating layer.

Figure 6:
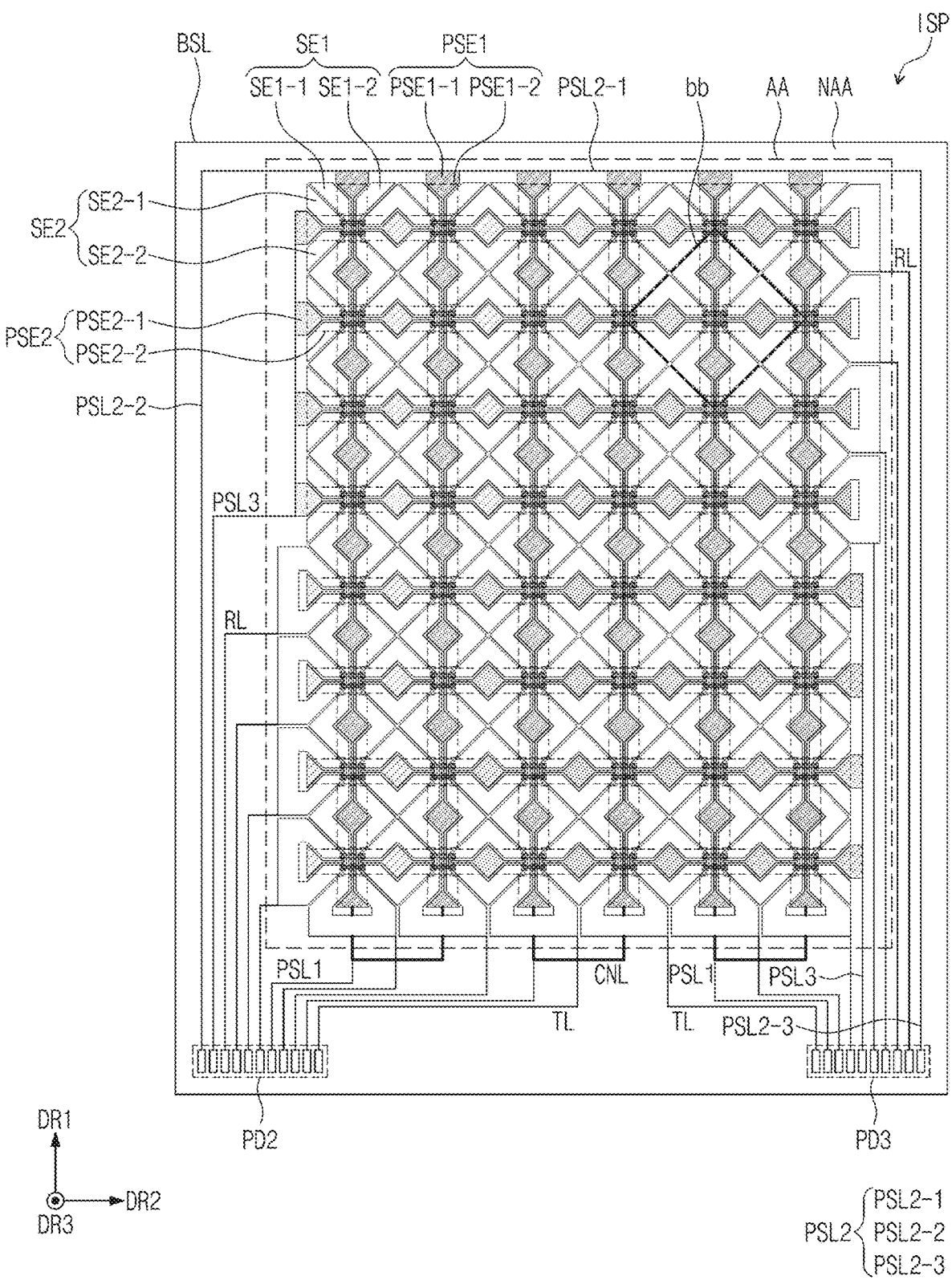
FIG. 6 is a plan view of an input sensing unit according to an embodiment of the present disclosure.

FIG. 6 is a plan view of the input sensing unit ISP according to an embodiment of the present disclosure. FIG. 6 schematically illustrates components of the input sensing unit ISP disposed on the base layer BSL.

Referring to FIG. 6, the base layer BSL may have long sides extending in the first direction DR1 and short sides extending in the second direction DR2 in a plan view. The base layer BSL may be disposed on the above-described thin film encapsulation layer TFE (refer to FIG. 5) of the display panel DP (refer to FIG. 5). However, without being limited thereto, the base layer BSL may be omitted in an embodiment, and electrodes and lines of the input sensing unit ISP may be directly disposed on the thin film encapsulation layer TFE (refer to FIG. 5).

The input sensing unit ISP may sense the first input (e.g., the touch of the user US, refer to FIG. 1A) in a capacitive method. The input sensing unit ISP may sense the second input (e.g., the input by the pen PN, refer to FIG. 1A) in an electromagnetic resonance method. The first input may be an input capable of changing capacitance and the second input may be an input providing a magnetic field signal.

The input sensing unit ISP may sense the first input and the second input through time division driving. A period in which the input sensing unit ISP operates in a first mode to sense the first input may be defined as a first operation period, and a period in which the input sensing unit ISP operates in a second mode to sense the second input may be defined as a second operation period. The input sensing unit ISP may be switched between the first mode and the second mode through selection by the user. Alternatively, one of the first mode and the second mode may be activated, or the input sensing unit ISP may be switched between the first mode and the second mode, by activation of a specific application. The input sensing unit ISP may be maintained in the first mode when the first input is sensed while the input sensing unit ISP alternately operates in the first mode and the second mode, or may be maintained in the second mode when the second input is sensed while the input sensing unit ISP alternately operates in the first mode and the second mode.

The input sensing unit ISP may include the sensing electrodes SE1 and SE2 for sensing the first input and the pen sensing electrodes PSE1 and PSE2 for sensing the second input. In addition, the input sensing unit ISP may include sensing lines TL and RL, pen sensing lines PSL1, PSL2, and PSL3, and second and third pads PD2 and PD3.

A planar region of the input sensing unit ISP may include an active region AA and an inactive region NAA adjacent to the active region AA. In a plan view, the active region AA may overlap the display region DA (refer to FIG. 4), and the inactive region NAA may overlap the non-display region NDA (refer to FIG. 4).

Meanwhile, in this embodiment, the input sensing unit ISP may include an upper portion and a lower portion with respect to the center in the first direction DR1 and may include a left portion and a right portion with respect to the center in the second direction DR2.

The second and third pads PD2 and PD3 may be disposed in the inactive region NAA. The second pads PD2 and the third pads PD3 may be adjacent to a lower end of the input sensing unit ISP in a plan view. For example, the second pads PD2 may be disposed adjacent to a left side of the input sensing unit ISP, and the third pads PD3 may be disposed adjacent to a right side of the input sensing unit ISP. The above-described first pads PD1 in FIG. 4 may be disposed between the second pads PD2 and the third pads PD3 in a plan view.

The second and third pads PD2 and PD3 may be defined as sensing unit pads electrically connected to the sensing electrodes SE1 and SE2 or the pen sensing electrodes PSE1 and PSE2. A sensing IC for controlling the input sensing unit ISP may be electrically connected to the second and third pads PD2 and PD3 through a printed circuit board.

The sensing electrodes SE1 and SE2 may be disposed in the active region AA. The sensing electrodes SE1 and SE2 may include the first sensing electrodes SE1 and the second sensing electrodes SE2. The first sensing electrodes SE1 may extend in the first direction DR1 and may be arranged in the second direction DR2. The second sensing electrodes SE2 may extend in the second direction DR2 and may be arranged in the first direction DR1. The first sensing electrodes SE1 and the second sensing electrodes SE2 may extend to cross each other in a plan view while being insulated from each other. The first sensing electrodes SE1 and the second sensing electrodes SE2 may be capacitively coupled.

The sensing lines TL and RL may extend to the inactive region NAA and may be electrically connected to the second and third pads PD2 and PD3. The sensing lines TL and RL may include the first sensing lines TL electrically connected to the first sensing electrodes SE1 and the second sensing lines RL electrically connected to the second sensing electrodes SE2.

The first sensing lines TL may be disposed in the inactive region NAA adjacent to a lower side of the active region AA. The first sensing lines TL may be electrically connected to lower ends of the first sensing electrodes SE1.

The second sensing lines RL may be disposed in the inactive regions NAA adjacent to left and right sides of the active region AA. The second sensing lines RL may be electrically connected to left or right ends of the second sensing electrodes SE2. The first sensing lines TL connected to the first sensing electrodes SE1 disposed on the left side of the input sensing unit ISP among the first sensing electrodes SE1 may be electrically connected to corresponding second pads PD2, respectively. The first sensing lines TL connected to the first sensing electrodes SE1 disposed on the right side of the input sensing unit ISP among the first sensing electrodes SE1 may be electrically connected to corresponding third pads PD3, respectively.

Some of the second sensing lines RL may be electrically connected to the left ends of the second sensing electrodes SE2 disposed in the lower portion of the input sensing unit ISP among the second sensing electrodes SE2. The some of the second sensing lines RL may be disposed in the inactive region NAA adjacent to the left side of the active region AA and may be electrically connected to corresponding second pads PD2, respectively.

The other second sensing lines RL may be electrically connected to the right ends of the second sensing electrodes SE2 disposed in the upper portion of the input sensing unit ISP among the second sensing electrodes SE2. The other second sensing lines RL may be disposed in the inactive region NAA adjacent to the right side of the active region AA and may be electrically connected to corresponding third pads PD3, respectively.

However, the positions of the first and second sensing lines TL and RL illustrated in FIG. 6 are illustrative, and the present disclosure is not limited to the illustrated embodiment.

Each of the first sensing electrodes SE1 may include a sensing electrode 1-1 SE1-1 and a sensing electrode 1-2 SE1-2 that extend in the first direction DR1 and that are spaced apart from each other in the second direction DR2. The sensing electrode 1-1 SE1-1 and the sensing electrode 1-2 SE1-2 may have shapes symmetrical to each other in the second direction DR2.

In each of the first sensing electrodes SE1, a lower end of the sensing electrode 1-1 SE1-1 and a lower end of the sensing electrode 1-2 SE1-2 may be connected to each other and may be connected to a corresponding first sensing line TL among the first sensing lines TL. In each of the first sensing electrodes SE1, an upper end of the sensing electrode 1-1 SE1-1 and an upper end of the sensing electrode 1-2 SE1-2 may not be connected to each other.

Each of the second sensing electrodes SE2 may include a sensing electrode 2-1 SE2-1 and a sensing electrode 2-2 SE2-2 that extend in the second direction DR2 and that are spaced apart from each other in the first direction DR1. The sensing electrode 2-1 SE2-1 and the sensing electrode 2-2 SE2-2 may have shapes symmetrical to each other in the first direction DR1.

In each of the second sensing electrodes SE2 disposed in the lower portion of the input sensing unit ISP, a left end of the sensing electrode 2-1 SE2-1 and a left end of the sensing electrode 2-2 SE2-2 may be connected to each other and may be connected to a corresponding second sensing line RL among the second sensing lines RL. In each of the second sensing electrodes SE2 disposed in the lower portion of the input sensing unit ISP, a right end of the sensing electrode 2-1 SE2-1 and a right end of the sensing electrode 2-2 SE2-2 may not be connected to each other.

In each of the second sensing electrodes SE2 disposed in the upper portion of the input sensing unit ISP, a right end of the sensing electrode 2-1 SE2-1 and a right end of the sensing electrode 2-2 SE2-2 may be connected to each other and may be connected to a corresponding second sensing line RL among the second sensing lines RL. In each of the second sensing electrodes SE2 disposed in the upper portion of the input sensing unit ISP, a left end of the sensing electrode 2-1 SE2-1 and a left end of the sensing electrode 2-2 SE2-2 may not be connected to each other.

The pen sensing electrodes PSE1 and PSE2 may be disposed in the active region AA. The pen sensing electrodes PSE1 and PSE2 may include the first pen sensing electrodes PSE1 and the second pen sensing electrodes PSE2. The first pen sensing electrodes PSE1 may extend in the first direction DR1 and may be arranged in the second direction DR2. The second pen sensing electrodes PSE2 may extend in the second direction DR2 and may be arranged in the first direction DR1.

The first pen sensing electrodes PSE1 and the second pen sensing electrodes PSE2 may extend to cross each other in a plan view while being insulated from each other. The first pen sensing electrodes PSE1 may extend to cross the second sensing electrodes SE2 in a plan view and may be insulated from the second sensing electrodes SE2. The second pen sensing electrodes PSE2 may extend to cross the first sensing electrodes SE1 in a plan view and may be insulated from the first sensing electrodes SE1.

Each of the first pen sensing electrodes PSE1 may include a pen sensing electrode 1-1 PSE1-1 and a pen sensing electrode 1-2 PSE1-2 overlapping each other in a plan view. The pen sensing electrode 1-1 PSE1-1 and the pen sensing electrode 1-2 PSE1-2 may be disposed on different layers and may be electrically connected to each other through a contact hole. For example, the pen sensing electrodes 1-1 PSE1-1 may be disposed on the same layer as the first sensing electrodes SE1, and the pen sensing electrodes 1-2 PSE1-2 may be disposed under the pen sensing electrodes 1-1 PSE1-1. Since the first pen sensing electrodes PSE1 have a double layer structure, the resistances of the first pen sensing electrodes PSE1 may be lowered. However, without being limited thereto, one of the pen sensing electrodes 1-1 PSE1-1 and the pen sensing electrodes 1-2 PSE1-2 may be omitted. The pen sensing electrodes 1-2 PSE1-2 may be disposed to overlap the sensing electrode 1-1 SE1-1 and the sensing electrode 1-2 SE1-2 in a plan view.

The pen sensing electrodes 1-1 PSE1-1 may be disposed adjacent to the first sensing electrodes SE1. The pen sensing electrodes 1-1 PSE1-1 may be spaced apart from the first sensing electrodes SE1 and may be insulated from the first sensing electrodes SE1. For example, each of the pen sensing electrodes 1-1 PSE1-1 may be disposed between a sensing electrode 1-1 SE1-1 and a sensing electrode 1-2 SE1-2 of a corresponding first sensing electrode SE1 among the first sensing electrodes SE1, may extend substantially in the same direction as the sensing electrode 1-1 SE1-1 and the sensing electrode 1-2 SE1-2 of the corresponding first sensing electrode SE1, and may be spaced apart from the sensing electrode 1-1 SE1-1 and the sensing electrode 1-2 SE1-2.

Each of the second pen sensing electrodes PSE2 may include a pen sensing electrode 2-1 PSE2-1 and a pen sensing electrode 2-2 PSE2-2 overlapping each other in a plan view. The pen sensing electrode 2-1 PSE2-1 and the pen sensing electrode 2-2 PSE2-2 may be disposed on different layers and may be electrically connected to each other through a contact hole. For example, the pen sensing electrodes 2-1 PSE2-1 may be disposed on the same layer as the second sensing electrodes SE2, and the pen sensing electrodes 2-2 PSE2-2 may be disposed under the pen sensing electrodes 2-1 PSE2-1. Since the second pen sensing electrodes PSE2 have a double layer structure, the resistances of the second pen sensing electrodes PSE2 may be lowered. However, without being limited thereto, one of the pen sensing electrodes 2-1 PSE2-1 and the pen sensing electrodes 2-2 PSE2-2 may be omitted. The pen sensing electrodes 2-2 PSE2-2 may be disposed to overlap the sensing electrode 2-1 SE2-1 and the sensing electrode 2-2 SE2-2 in a plan view.

The pen sensing electrodes 2-1 PSE2-1 may be disposed adjacent to the second sensing electrodes SE2. The pen sensing electrodes 2-1 PSE2-1 may be spaced apart from the second sensing electrodes SE2 and may be insulated from the second sensing electrodes SE2. For example, each of the pen sensing electrodes 2-1 PSE2-1 may be disposed between a sensing electrode 2-1 SE2-1 and a sensing electrode 2-2 SE2-2 of a corresponding second sensing electrode SE2 among the second sensing electrodes SE2, may extend substantially in the same direction as the sensing electrode 2-1 SE2-1 and the sensing electrode 2-2 SE2-2 of the corresponding second sensing electrode SE2, and may be spaced apart from the sensing electrode 2-1 SE2-1 and the sensing electrode 2-2 SE2-2.

The pen sensing lines PSL1, PSL2, and PSL3 may extend to the inactive region NAA and may be electrically connected to the second and third pads PD2 and PD3. The pen sensing lines PSL1, PSL2, and PSL3 may include the first and second pen sensing lines PSL1 and PSL2 electrically connected to the first pen sensing electrodes SE1 and the third pen sensing lines PSL3 electrically connected to the second pen sensing electrodes PSE2. The second pen sensing lines PSL2 may include a line 2-1 PSL2-1, a line 2-2 PSL2-2, and a line 2-3 PSL2-3.

Upper ends of the first pen sensing electrodes PSE1 may be connected to each other. For example, upper ends of the pen sensing electrodes 1-1 PSE1-1 may be connected to the same pen sensing line, for example, PSL2-1. Lower ends of the first pen sensing electrodes PSE1 disposed adjacent to each other may be connected to the same pen sensing electrode, for example, the PSL1. For example, lower ends of two first pen sensing electrodes PSE1 adjacent to each other in the second direction DR2 may be connected to the same pen sensing line, PSL1. Six first pen sensing electrodes PSE1 illustrated in FIG. 6 may constitute three pen sensing pairs and each of the three pen sensing pairs is connected to corresponding pen sensing line.

The lower ends of the first pen sensing electrodes PSE1 disposed adjacent to each other may be electrically connected to a corresponding connecting line CNL among connecting lines CNL. For example, each of the connecting lines CNL may be electrically connected to a pair of corresponding pen sensing electrodes 1-1 PSE1-1 or a pair of corresponding pen sensing electrodes 1-2 PSE1-2.

A pair of first pen sensing electrodes PSE1 connected with each other at lower ends thereof through a connecting line CNL may be electrically connected to a corresponding first pen sensing line PSL1 among the first pen sensing lines PSL1. The first pen sensing lines PSL1 may be disposed on the same layer as the connecting lines CNL and may extend from the corresponding connecting lines CNL. The first pen sensing lines PSL1 may be electrically connected to corresponding pads among the second and third pads PD2 and PD3.

The upper ends of the pen sensing electrodes 1-1 PSE1-1 arranged in the second direction DR2 may be electrically connected to the line 2-1 PSL2-1 extending in the second direction DR2. The line 2-2 PSL2-2 and the line 2-3 PSL2-3 may be connected to one end and an opposite end of the line 2-1 PSL2-1, respectively, and may extend in the first direction DR1. The line 2-2 PSL2-2 may be disposed in the left portion of the input sensing unit ISP and may be electrically connected to a corresponding second pad PD2. The line 2-3 PSL2-3 may be disposed in the right portion of the input sensing unit ISP and may be electrically connected to a corresponding third pad PD3.

Left ends of the second pen sensing electrodes PSE2 disposed in the upper portion of the input sensing unit ISP may be connected to the same pen sensing line, for example PSL3 disposed on the left side of the input sensing unit ISP. For example, left ends of the pen sensing electrodes 2-1 PSE2-1 disposed in the upper portion of the input sensing unit ISP may be connected to the same pen sensing line, the PSL3. Right ends of the second pen sensing electrodes PSE2 disposed in the upper portion of the input sensing unit ISP may not be connected to any pen sensing line.

Right ends of the second pen sensing electrodes PSE2 disposed in the lower portion of the input sensing unit ISP may be connected to the same pen sensing line, for example, PSL3 disposed on the right side of the input sensing unit ISP. For example, right ends of the pen sensing electrodes 2-1 PSE2-1 disposed in the lower portion of the input sensing unit ISP may be connected to the same pen sensing line, the PSL3. Left ends of the second pen sensing electrodes PSE2 disposed in the lower portion of the input sensing unit ISP may not be connected to any pen sensing line.

The left ends of the second pen sensing electrodes PSE2 disposed in the upper portion of the input sensing unit ISP may be electrically connected to a corresponding third pen sensing line PSL3 among the third pen sensing lines PSL3. The third pen sensing line PSL3 electrically connected to the second pen sensing electrodes PSE2 disposed in the upper portion of the input sensing unit ISP may be electrically connected to a corresponding second pad PD2 disposed on the left side of the input sensing unit ISP.

The right ends of the second pen sensing electrodes PSE2 disposed in the lower portion of the input sensing unit ISP may be electrically connected to a corresponding third pen sensing line PSL3 among the third pen sensing lines PSL3. The third pen sensing line PSL3 electrically connected to the second pen sensing electrodes PSE2 disposed in the lower portion of the input sensing unit ISP may be electrically connected to a corresponding third pad PD3 disposed on the right side of the input sensing unit ISP.

However, the positions of the pen sensing lines PSL1, PSL2, and PSL3 illustrated in FIG. 6 are illustrative, and the present disclosure is not limited to the illustrated embodiment.

Meanwhile, each of the sensing electrodes 1-1 SE1-1 and 1-2 SE1-2, the sensing electrodes 2-1 SE2-1 and 2-2 SE2-2, the pen sensing electrodes 1-1 PSE1-1 and 1-2 PSE1-2, and the pen sensing electrodes 2-1 PSE2-1 and 2-2 PSE2-2 may include a sensing pattern and a connecting pattern (or, a bridge pattern) that are provided as an integrated sensing pattern or disposed on different layers and electrically connected to each other. Various embodiments of the sensing electrodes SE1 and SE2 and the pen sensing electrodes PSE1 and PSE2 will be described below in detail.

Although FIG. 6 illustrates six first sensing electrodes SE1 and eight second sensing electrodes SE2, the numbers of sensing electrodes SE1 and SE2 included in the input sensing unit ISP are not limited thereto. Although FIG. 6 illustrates six first pen sensing electrodes PSE1 and eight second pen sensing electrodes PSE2, the numbers of pen sensing electrodes PSE1 and PSE2 included in the input sensing unit ISP are not limited thereto.

A drive circuit of the input sensing unit ISP may provide a drive signal to one of the first sensing electrodes SE1 and the second sensing electrodes SE2, and a sensing circuit of the input sensing unit ISP may measure a change in the capacitance of a mutual capacitor formed between the first sensing electrodes SE1 and the second sensing electrodes S2 through the other one of the first sensing electrodes SE1 and the second sensing electrodes SE2.

A resonance circuit of the pen PN (refer to FIG. 1A) may be charged through at least one of the first pen sensing electrodes PSE1 and the second pen sensing electrodes PSE2, and a magnetic field signal output from the pen PN (refer to FIGS. 1A) may be sensed through the first pen sensing electrodes PSE1 and the second pen sensing electrodes PSE2. The drive circuit of the input sensing unit ISP may provide a drive signal to at least one of the first pen sensing electrodes PSE1 and the second pen sensing electrodes PSE2, and the sensing circuit of the input sensing unit ISP may sense electromagnetically induced currents formed in the first pen sensing electrodes PSE1 and the second pen sensing electrodes PSE2.

Figure 7A:
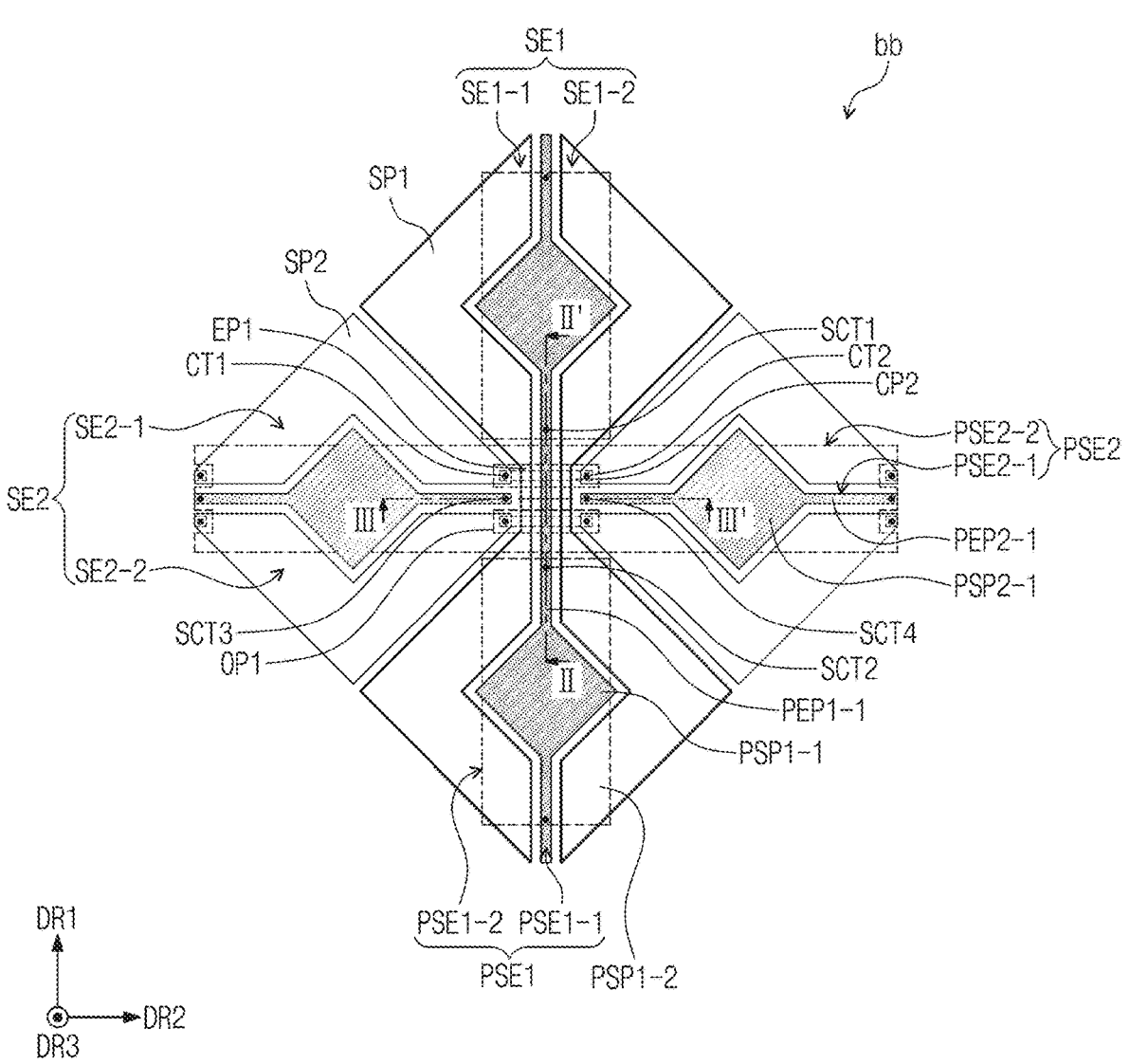
FIG. 7A is an enlarged plan view of the input sensing unit corresponding to region bb of FIG. 6.
Figure 7B:
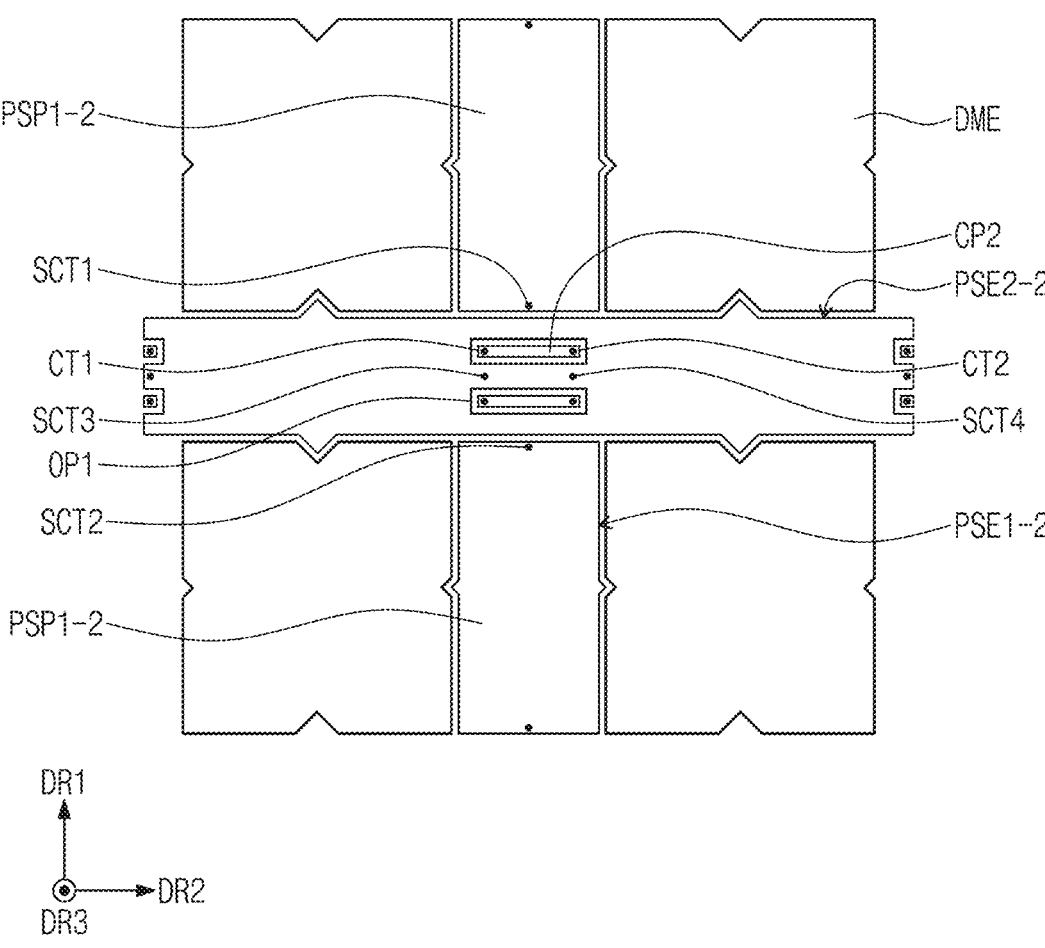
FIG. 7B is an enlarged plan view illustrating some components of the input sensing unit of FIG. 7A.
Figure 7C:
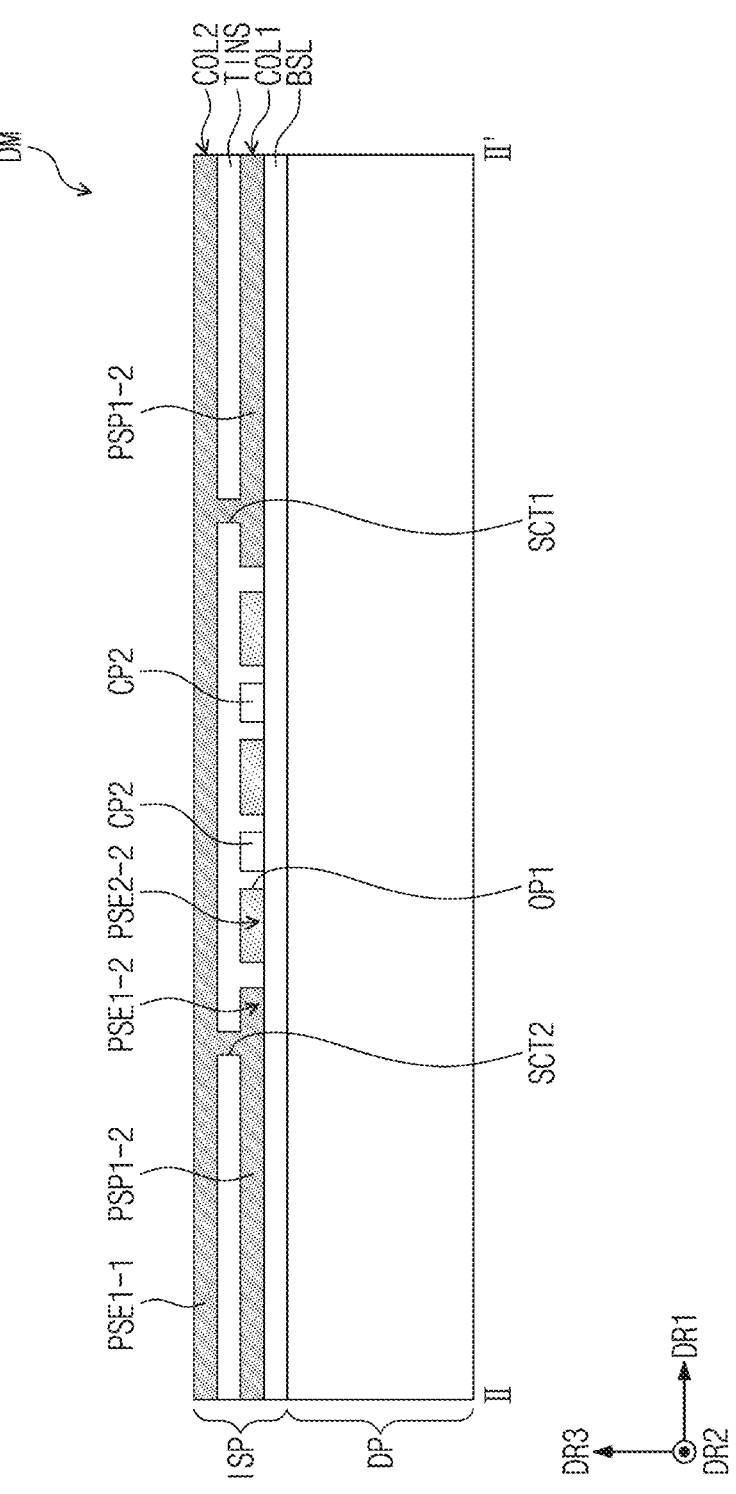
FIG. 7C is a cross-sectional view of the display module corresponding to line II-II' of FIG. 7A.
Figure 7D:
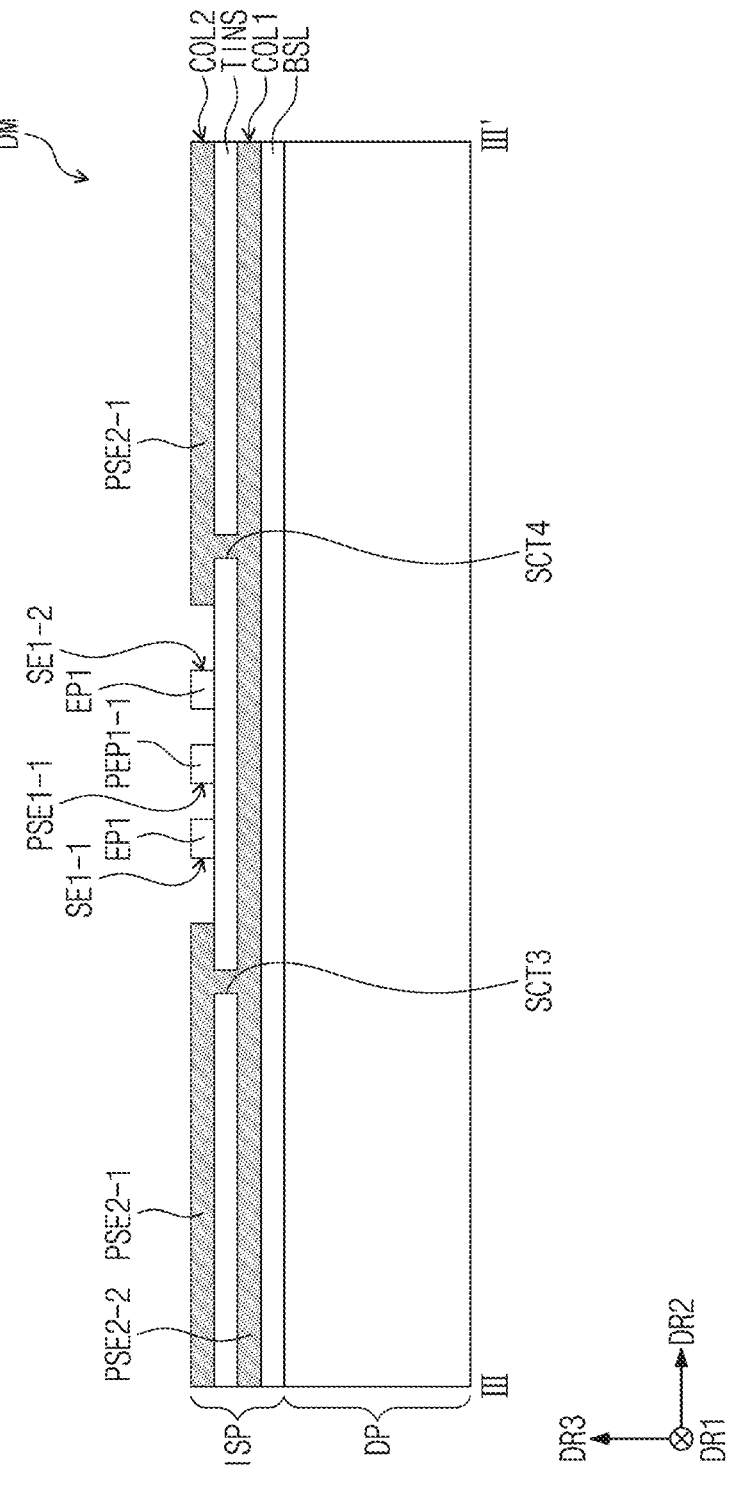
FIG. 7D is a sectional view of the display module corresponding to line III-III' of FIG. 7A.
Figure 7E:
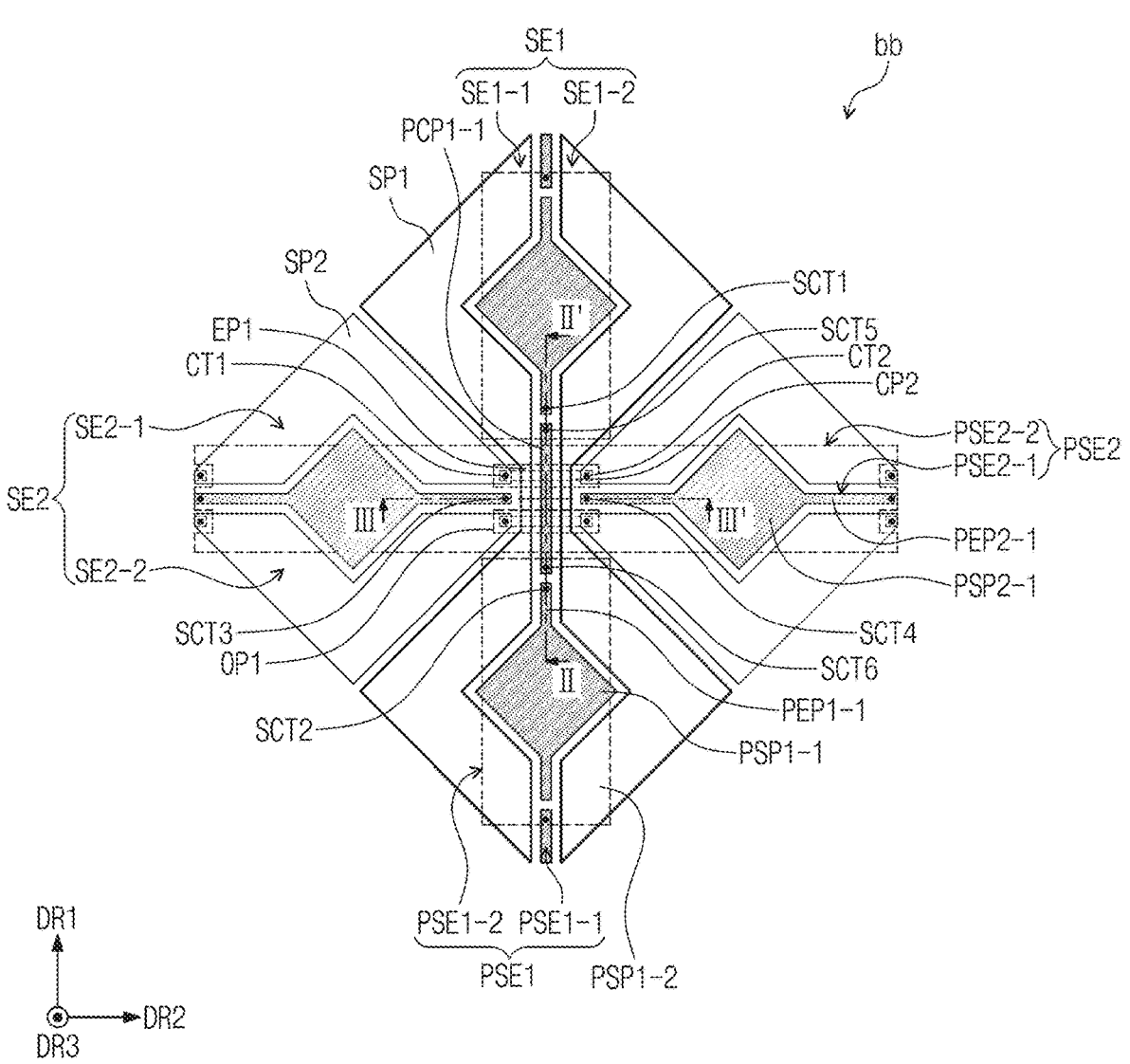
FIG. 7E is an enlarged plan view of the input sensing unit corresponding to region bb of FIG. 6.

FIGS. 7A and 7E are enlarged plan views of the input sensing unit ISP corresponding to region bb of FIG. 6. FIG. 7B is an enlarged plan view illustrating some components of the input sensing unit ISP illustrated in FIG. 7A. FIG. 7C is a sectional view of the display module DM corresponding to line II-II' of FIG. 7A. FIG. 7D is a sectional view of the display module DM corresponding to line III-III' of FIG. 7A.

Referring to FIG. 7A, the first sensing electrode SE1 may include the sensing electrode 1-1 SE1-1 and the sensing electrode 1-2 SE1-2 extending in the first direction DR1 and arranged in the second direction DR2. The sensing electrode 1-1 SE1-1 and the sensing electrode 1-2 SE1-2 may have shapes symmetrical to each other in the second direction DR2.

Each of the sensing electrode 1-1 SE1-1 and the sensing electrode 1-2 SE1-2 may include first sensing patterns SP1 and a first extending pattern EP1. The first sensing patterns SP1 of the sensing electrode 1-1 SE1-1 may be arranged in the first direction DR1. The first sensing patterns SP1 of the sensing electrode 1-2 SE1-2 may be arranged in the first direction DR1.

The first sensing patterns SP1 may have a shape, such as "<" or ">", which is bent toward the left or right side. However, the shapes of the first sensing patterns SP1 are not limited to the illustrated embodiment.

The first extending pattern EP1 may connect the first sensing patterns SP1 adjacent to each other in the first direction DR1. The first extending pattern EP1 may extend from the first sensing patterns SP1 in the first direction DR1. The first extending pattern EP1 may be formed of the same material and formed at the same time with the first sensing patterns SP1.

Referring to FIGS. 7A and 7B, the second sensing electrode SE2 may include the sensing electrode 2-1 SE2-1 and the sensing electrode 2-2 SE2-2 arranged in the first direction DR1. The sensing electrode 2-1 SE2-1 and the sensing electrode 2-2 SE2-2 may have shapes symmetrical to each other in the first direction DR1.

Each of the sensing electrode 2-1 SE2-1 and the sensing electrode 2-2 SE2-2 may include second sensing patterns SP2 and a second connecting pattern CP2. The second sensing patterns SP2 may be arranged in the second direction DR2. The second sensing patterns SP2 may be spaced apart from each other on the same layer.

The second sensing patterns SP2 may have a shape, such as "158" or "159", which is bent toward the upper or lower side. However, the shapes of the second sensing patterns SP2 are not limited to the illustrated embodiment.

The second connecting pattern CP2 may be disposed on a layer different from the second sensing patterns SP2. For example, the second connecting pattern CP2 may be disposed below the second sensing patterns SP2. The second connecting pattern CP2 may overlap the second sensing patterns SP2 adjacent to each other in the second direction DR2 in a plan view. The second connecting pattern CP2 may extend in the second direction DR2 and may electrically connect the second sensing patterns SP2 that are disposed adjacent to each other in the second direction DR2 and overlap the second connecting pattern CP2.

The second sensing pattern SP2 overlapping one end of the second connecting pattern CP2 may be connected to the second connecting pattern CP2 through a first contact hole CT1, and the second sensing pattern SP2 overlapping an opposite end of the second connecting pattern CP2 may be connected to the second connecting pattern CP2 through a second contact hole CT2. Accordingly, the second sensing patterns SP2 spaced apart from each other on the same layer may be electrically connected through the second connecting pattern CP2. The second connecting pattern CP2 that is disposed on the layer different from the second sensing patterns SP2 and that electrically connects the second sensing patterns SP2 spaced apart from each other may be defined as a bridge pattern.

The second connecting pattern CP2 may overlap the first sensing electrode SE1 in a plan view. The second connecting pattern CP2 may be insulated from the sensing electrode 1-1 SE1-1 and the sensing electrode 1-2 SE1-2 while crossing the sensing electrode 1-1 SE1-1 and the sensing electrode 1-2 SE1-2 in a plan view. For example, the second connecting pattern CP2 extending in the second direction DR2 and the first extending pattern EP1 extending in the first direction DR1 may cross each other in a plan view. The second connecting pattern CP2 and the first extending pattern EP1 may be disposed on different layers and may be spaced apart from each other in the third direction DR3 with an insulating layer disposed therebetween. The second connecting pattern CP2 and the first extending pattern EP1 may be electrically insulated from each other.

The first sensing patterns SP1 and the second sensing patterns SP2 may be disposed on the same layer. The first sensing patterns SP1 and the second sensing patterns SP2 may be spaced apart from each other without overlapping each other and may be alternately disposed. Capacitance may be formed by the first sensing patterns SP1 and the second sensing patterns SP2.

Referring to FIGS. 6 and 7A, the input sensing unit ISP may have long sides in the first direction DR1 and short sides in the second direction DR2 in a plan view. Accordingly, the first sensing electrodes SE1 extending in the first direction DR1 may be longer than the second sensing electrodes SE2 extending in the second direction DR2. Furthermore, the first pen sensing electrodes PSE1 extending in the first direction DR1 may be longer than the second pen sensing electrodes PSE2 extending in the second direction DR2.

Resistance may be proportional to the length of a conductor. The resistance depending on the length of the conductor may be defined as line resistance. Accordingly, the line resistance of the first sensing electrodes SE1 may be higher than the line resistance of the second sensing electrodes SE2, and the line resistance of the first pen sensing electrodes PSE1 may be higher than the line resistance of the second pen sensing electrodes PSE2.

Conductors connected through contact holes by a bridge pattern disposed in a layer different from the conductors may have higher resistance than conductors that is formed in one piece.

The first sensing electrodes SE1 may include the first sensing patterns SP1 and the first extending patterns EP1 that is formed in one piece with the first sensing electrodes SE1 and that extends from the first sensing patterns SP1. That is, the first sensing electrodes SE1 may be formed in one piece with no connecting pattern connecting adjacent first sensing patterns SP1.

The second sensing electrodes SE2 may include the second sensing patterns SP2 and the second connecting patterns CP2 that are disposed on the layer different from the second sensing patterns SP2 and connected to the second sensing patterns SP2. Since the second sensing electrodes SE2 shorter than the first sensing electrodes SE1 have relatively low line resistance, the second connecting patterns CP2 may be used to connect adjacent second sensing patterns SP2 without increasing a difference in total resistance between the first sensing electrode SE1 and the second sensing electrode SE2. Accordingly, the difference in resistance between the first sensing electrodes SE1 and the second sensing electrodes SE2 may be reduced. However, embodiments are not necessarily limited thereto.

Referring to FIGS. 7A and 7B, the first pen sensing electrode PSE1 may include the pen sensing electrode 1-1 PSE1-1 and the pen sensing electrode 1-2 PSE1-2 overlapping each other in a plan view. The pen sensing electrode 1-1 PSE1-1 and the pen sensing electrode 1-2 PSE1-2 may be disposed on different layers. For example, the pen sensing electrode 1-1 PSE1-1 may be disposed over the pen sensing electrode 1-2 PSE1-2. The pen sensing electrode 1-1 PSE1-1 and the pen sensing electrode 1-2 PSE1-2 disposed on the different layers may be electrically connected to each other through contacts SCT1 and SCT2 formed through the insulating layer disposed between the pen sensing electrode 1-1 PSE1-1 and the pen sensing electrode 1-2 PSE1-2.

The pen sensing electrode 1-1 PSE1-1 may be disposed on the same layer as the first sensing patterns SP1, the first extending pattern EP1 of the first sensing electrode SE1, and the second sensing patterns SP2. The pen sensing electrode 1-1 PSE1-1 may include pen sensing patterns 1-1 PSP1-1 and extending patterns 1-1 PEP1-1.

The pen sensing patterns 1-1 PSP1-1 may extend in the first direction DR1. Each of the pen sensing patterns 1-1 PSP1-1 may be disposed between the first sensing pattern SP1 of the sensing electrode 1-1 SE1-1 and the first sensing pattern SP1 of the sensing electrode 1-2 SE1-2 arranged in the second direction DR2 in a plan view. The pen sensing patterns 1-1 PSP1-1 may be electrically insulated from the first sensing electrode SE1. That is, the pen sensing patterns 1-1 PSP1-1 may be disposed between the first sensing patterns SP1 disposed adjacent to each other in the second direction DR2 and may be spaced apart from the first sensing patterns SP1.

The pen sensing patterns 1-1 PSP1-1 may have a rhombic shape in a plan view. However, the shapes of the pen sensing patterns 1-1 PSP1-1 are not limited to the illustrated embodiment.

Each of the extending patterns 1-1 PEP1-1 may connect the pen sensing patterns 1-1 PSP1-1 disposed adjacent to each other in the first direction DR1. The extending patterns 1-1 PEP1-1 may extend from the pen sensing patterns 1-1 PSP1-1 in the first direction DR1. The extending patterns 1-1 PEP1-1 may be formed of the same material and formed at the same time with the pen sensing patterns 1-1 PSP1-1.

The extending patterns 1-1 PEP1-1 may be disposed between the first extending pattern EP1 of the sensing electrode 1-1 SE1-1 and the first extending pattern EP1 of the sensing electrode 1-2 SE1-2. The extending patterns 1-1 PEP1-1 may be spaced apart from the first extending patterns EP1 which are disposed on the same layer.

The extending patterns 1-1 PEP1-1 may be insulated from the second connecting patterns CP2 while crossing the second connecting patterns CP2 in a plan view. For example, the extending patterns 1-1 PEP1-1 extending in the first direction DR1 and the second connecting patterns CP2 extending in the second direction DR2 may cross each other in a plan view. The extending patterns 1-1 PEP1-1 and the second connecting patterns CP2 may be disposed on different layers and may be spaced apart from each other in the third direction DR3 with an insulating layer disposed therebetween. The extending patterns 1-1 PEP1-1 and the second connecting patterns CP2 may be electrically insulated from each other.

The pen sensing electrode 1-2 PSE1-2 may be disposed on a layer different from the first sensing patterns SP1 and the first extending pattern EP1 of the first sensing electrode SE1. The pen sensing electrode 1-2 PSE1-2 may include pen sensing patterns 1-2 PSP1-2.

The pen sensing patterns 1-2 PSP1-2 may extend in the first direction DR1 and may be arranged in the first direction DR1. The pen sensing patterns 1-2 PSP1-2 may be spaced apart from each other on the same layer. The pen sensing patterns 1-2 PSP1-2 may be disposed on the same layer as the second connecting patterns CP2 and may be spaced apart from each other with the second connecting patterns CP2 disposed therebetween.

Each of the pen sensing patterns 1-2 PSP1-2 may overlap the pen sensing electrode 1-1 PSE1-1 in a plan view. For example, the pen sensing patterns 1-2 PSP1-2 may partially overlap the pen sensing patterns 1-1 PSP1-1 and the extending patterns 1-1 PEP1-1 of the pen sensing electrode 1-1 PSE1-1. In an embodiment, the pen sensing patterns 1-2 PSP1-2 may partially overlap the first sensing patterns SP1 in a plan view.

Each of the pen sensing patterns 1-2 PSP1-2 may be connected to the pen sensing electrode 1-1 PSE1-1 through the first contact SCT1 and the second contact SCT2. For example, each of the pen sensing patterns 1-2 PSP1-2 may be connected to the extending patterns 1-1 PEP1-1 of the pen sensing electrode 1-1 PSE1-1 through the first contact SCT1 and the second contact SCT2. The pen sensing patterns 1-2 PSP1-2 spaced apart from each other and disposed adjacent to each other may be electrically connected through the pen sensing electrode 1-1 PSE1-1.

The pen sensing electrode 1-1 PSE1-1 and the pen sensing electrode 1-2 PSE1-2 disposed on the different layers and electrically connected to each other may constitute the first pen sensing electrode PSE1. That is, the first pen sensing electrode PSE1 may include the pen sensing electrodes PSE1-1 and PSE1-2 formed in a double layer structure. The pen sensing electrode 1-1 PSE1-1 and the pen sensing electrode 1-2 PSE1-2 may include the pen sensing patterns PSP1-1 and PSP1-2 having predetermined planar areas, respectively. Since the first pen sensing electrode PSE1 has a predetermined planar area and is formed in a double layer structure, the resistance of the first pen sensing electrode PSE1 may be lowered.

The second pen sensing electrode PSE2 may include the pen sensing electrode 2-1 PSE2-1 and the pen sensing electrode 2-2 PSE2-2 overlapping each other in a plan view. The pen sensing electrode 2-1 PSE2-1 and the pen sensing electrode 2-2 PSE2-2 may be disposed on different layers. For example, the pen sensing electrode 2-1 PSE2-1 may be disposed over the pen sensing electrode 2-2 PSE2-2. The pen sensing electrode 2-1 PSE2-1 and the pen sensing electrode 2-2 PSE2-2 disposed on the different layers may be electrically connected with each other through contacts SCT3 and SCT4 formed through an insulating layer.

The pen sensing electrode 2-1 PSE2-1 may be disposed on the same layer as the second sensing patterns SP2 of the second sensing electrode SE2 and the pen sensing electrode 1-1 PSE1-1. The pen sensing electrode 2-1 PSE2-1 may include pen sensing patterns 2-1 PSP2-1 and extending patterns 2-1 PEP2-1.

The pen sensing patterns 2-1 PSP2-1 may be arranged in the second direction DR2. Each of the pen sensing patterns 2-1 PSP2-1 may be disposed between the second sensing pattern SP2 of the sensing electrode 2-1 SE2-1 and the second sensing pattern SP2 of the sensing electrode 2-2 SE2-2 arranged in the first direction DR1 in a plan view. The pen sensing patterns 2-1 PSP2-1 may be electrically insulated from the second sensing electrode SE2. That is, the pen sensing patterns 2-1 PSP2-1 may be disposed between adjacent second sensing patterns SP2 arranged in the first direction DR1 and may be spaced apart from the second sensing patterns SP2.

The pen sensing patterns 2-1 PSP2-1 may have a rhombic shape in a plan view. However, the shapes of the pen sensing patterns 2-1 PSP2-1 are not limited to the illustrated embodiment.

The extending patterns 2-1 PEP2-1 may extend from a corresponding pen sensing pattern 2-1 PSP2-1 among the pen sensing patterns 2-1 PSP2-1. The extending patterns 2-1 PEP2-1 may be formed of the same material and formed at the same time with the pen sensing patterns 2-1 PSP2-1. The extending patterns 2-1 PEP2-1 may extend from the pen sensing patterns 2-1 PSP2-1 in the second direction DR2. For example, extending patterns 2-1 PEP2-1 connected to one pen sensing pattern 2-1 PSP2-1 may extend from the pen sensing pattern 2-1 PSP2-1 parallel to the second direction DR2 in opposite directions. However, the shape in which the extending patterns 2-1 PEP2-1 extend is not limited thereto.

The extending patterns 2-1 PEP2-1 extending from the pen sensing patterns 2-1 PSP2-1 adjacent to each other in the second direction DR2 may be spaced apart from each other with the first extending patterns EP1 of the first sensing electrode SE1 and the extending pattern 1-1 PEP1-1 of the first pen sensing electrode PSE1 disposed therebetween.

The pen sensing electrode 2-2 PSE2-2 may be disposed on a layer different from the second sensing patterns SP2 of the second sensing electrode SE2. The pen sensing electrode 2-2 PSE2-2 may be formed of the same material and formed at the same time with the second connecting patterns CP2.

A first opening OP1 may be defined in the pen sensing electrode 2-2 PSE2-2. A plurality of first openings OP1 may be defined in the pen sensing electrode 2-2 PSE2-2. The first opening OP1 may be formed to completely surround the second connecting pattern CP2 in a plan view. That is, the second connecting pattern CP2 may be disposed in the first opening OP1. Since the second connecting pattern CP2 is disposed in the first opening OP1 of the pen sensing electrode 2-2 PSE2-2, the second connecting pattern CP2 may be spaced apart from the pen sensing electrode 2-2 PSE2-2 which is formed of the same material and formed at the same time with the second connecting pattern CP2 and may be electrically insulated from the pen sensing electrode 2-2 PSE2-2.

The pen sensing electrode 2-2 PSE2-2 may extend in the second direction DR2. The pen sensing electrode 2-2 PSE2-2 may extend across the pen sensing patterns 1-2 PSP1-2 disposed on the same layer. The pen sensing electrode 2-2 PSE2-2 may overlap the first extending patterns EP1 of the first sensing electrode SE1 and the extending pattern 1-1 PEP1-1 of the first pen sensing electrode PSE1 in a plan view.

The pen sensing electrode 2-2 PSE2-2 may overlap the pen sensing patterns 2-1 PSP2-1 and the extending patterns 2-1 PEP2-1 of the pen sensing electrode 2-1 PSE2-1 spaced apart from each other.

The pen sensing electrodes 2-1 PSE2-1 formed of separated patterns may be connected to the integrated pen sensing electrode 2-2 PSE2-2 through the third contact SCT3 and the fourth contact SCT4. For example, extending patterns 2-1 PEP2-1 that extend from a corresponding pen sensing pattern 2-1 PSP2-1 and that are spaced apart from each other in the second direction DR2 may be connected to the pen sensing electrode 2-2 PSE2-2 through the third contact SCT3 and the fourth contact SCT4. The pen sensing patterns 2-1 PSP2-1 spaced apart from each other may be electrically connected through the pen sensing electrode 2-2 PSE2-2.

The pen sensing electrode 2-1 PSE2-1 and the pen sensing electrode 2-2 PSE2-2 disposed on the different layers and electrically connected to each other may constitute the second pen sensing electrode PSE2. That is, the second pen sensing electrode PSE2 may include the pen sensing electrodes PSE2-1 and PSE2-2 formed in a double layer structure. The pen sensing electrode 2-1 PSE2-1 and the pen sensing electrode 2-2 PSE2-2 may have predetermined planar areas. Since the second pen sensing electrode PSE2 has a predetermined planar area and is formed in a double layer structure, the resistance of the second pen sensing electrode PSE2 may be lowered.

FIG. 7B schematically illustrates the components disposed below the sensing electrodes SE1 and SE2 and the pen sensing electrodes PSE1 and PSE2 illustrated in FIG. 7A.

Referring to FIG. 7B, the pen sensing patterns 1-2 PSP1-2 of the pen sensing electrode 1-2 PSE1-2, the pen sensing electrode 2-2 PSE2-2, and the second connecting patterns CP2 may be disposed on the same layer. The input sensing unit ISP may further include dummy patterns DME disposed on the same layer as the pen sensing patterns 1-2 PSP1-2, the pen sensing electrode 2-2 PSE2-2, and the second connecting patterns CP2.

The dummy patterns DME may be spaced apart from the pen sensing patterns 1-2 PSP1-2, the pen sensing electrode 2-2 PSE2-2, and the second connecting patterns CP2. The dummy patterns DME may be a floating electrode. The dummy patterns DME may be disposed around the pen sensing patterns 1-2 PSP1-2 and the pen sensing electrode 2-2 PSE2-2. The dummy patterns DME may overlap a portion of the first sensing electrode SE1 and a portion of the second sensing electrode SE2 in a plan view.

In a case in which the dummy patterns DME are not disposed, a difference in light reflectivity between the region in which the pen sensing patterns 1-2 PSP1-2 and the pen sensing electrode 2-2 PSE2-2 are disposed and the region in which the pen sensing patterns 1-2 PSP1-2 and the pen sensing electrode 2-2 PSE2-2 are not disposed may occur. Due to this, the shapes of the pen sensing electrode 1-2 PSE1-2 and the pen sensing electrode 2-2 PSE2-2 may be visually recognized well from the outside.

However, since the dummy patterns DME are disposed adjacent to the pen sensing patterns 1-2 PSP1-2 and the pen sensing electrode 2-2 PSE2-2, the difference in light reflectivity between the regions may be reduced, and thus the shapes of the pen sensing electrode 1-2 PSE1-2 and the pen sensing electrode 2-2 PSE2-2 may be prevented from being visually recognized from the outside.

Referring to FIGS. 7C and 7D, as described above, the input sensing unit ISP may include the base layer BSL, the first conductive layer COL1, the intermediate insulating layer TINS, and the second conductive layer COL2 disposed on the display panel DP. In some embodiments, the input sensing unit ISP may further include an upper insulating layer disposed on the second conductive layer COL2.

Referring to FIG. 7C, the first conductive layer COL1 may include the pen sensing electrode 1-2 PSE1-2, the pen sensing patterns 1-2 PSP1-2, the pen sensing electrode 2-2 PSE2-2, and the second connecting patterns CP2. The pen sensing patterns 1-2 PSP1-2, the pen sensing electrode 2-2 PSE2-2, and the second connecting patterns CP2 may be disposed on the same base layer BSL.

The intermediate insulating layer TINS may be disposed on the first conductive layer COL1. The intermediate insulating layer TINS may cover the pen sensing patterns 1-2 PSP1-2, the pen sensing electrode 2-2 PSE2-2, and the second connecting patterns CP2.

The second conductive layer COL2 may be disposed on the intermediate insulating layer TINS. The second conductive layer COL2 may include the pen sensing electrode 1-1 PSE1-1. The pen sensing electrode 1-1 PSE1-1 may overlap the pen sensing patterns 1-2 PSP1-2, the pen sensing electrode 2-2 PSE2-2, and the second connecting patterns CP2.

The second connecting patterns CP2 may be disposed in the first openings OP1 of the pen sensing electrode 2-2 PSE2-2, respectively. The second connecting patterns CP2 may be spaced apart from the pen sensing electrode 2-2 PSE2-2 on the base layer BSL and may be electrically insulated from the pen sensing electrode 2-2 PSE2-2.

The pen sensing patterns 1-2 PSP1-2 may be spaced apart from each other on the base layer BSL with the pen sensing electrode 2-2 PSE2-2 and the second connecting patterns CP2 disposed therebetween. One of the pen sensing patterns 1-2 PSP1-2 may be connected to the pen sensing electrode 1-1 PSE1-1 through the second contact SCT2 formed through the intermediate insulating layer TINS. The other one of the pen sensing patterns 1-2 PSP1-2 may be connected to the pen sensing electrode 1-1 PSE1-1 through the first contact SCT1 formed through the intermediate insulating layer TINS. The pen sensing patterns 1-2 PSP1-2 spaced apart from each other may be electrically connected through the pen sensing electrode 1-1 PSE1-1 and may constitute one first pen sensing electrode PSE1 (refer to FIG. 7A).

Referring to FIG. 7D, the first conductive layer COL1 may include the pen sensing electrode 2-2 PSE2-2. The intermediate insulating layer TINS may be disposed on the first conductive layer COL1 and may cover the pen sensing electrode 2-2 PSE2-2.

The second conductive layer COL2 may be disposed on the intermediate insulating layer TINS. The second conductive layer COL2 may include the pen sensing electrodes 2-1 PSE2-1, the first extending pattern EP1 of the sensing electrode 1-1 SE1-1, the first extending pattern EP1 of the sensing electrode 1-2 SE1-2, and the extending pattern 1-1 PEP1-1 of the pen sensing electrode 1-1 PSE1-1. The pen sensing electrode 2-2 PSE2-2 may overlap the pen sensing electrodes 2-1 PSE2-1, the first extending patterns EP1, and the extending pattern 1-1 PEP1-1.

On the intermediate insulating layer TINS, the pen sensing electrodes PSE2-1 may be spaced apart from each other with the first extending patterns EP1 of the connecting electrodes 1-1 SE1-1 and 1-2 SE1-2 and the extending pattern 1-1 PEP1-1 of the pen sensing electrode 1-1 PSE1-1 disposed therebetween. One of the pen sensing electrodes 2-1 PSE2-1 may be connected to the pen sensing electrode 2-2 PSE2-2 through the third contact SCT3 formed through the intermediate insulating layer TINS. The other one of the pen sensing electrodes 2-1 PSE2-1 may be connected to the pen sensing electrode 2-2 PSE2-2 through the fourth contact SCT4 formed through the intermediate insulating layer TINS. The pen sensing patterns 2-1 PSE2-1 spaced apart from each other may be electrically connected through the pen sensing electrode 2-2 PSE2-2 and may constitute one second pen sensing electrode PSE2 (refer to FIG. 7A).

FIG. 7E illustrates an embodiment that includes substantially the same components as the embodiment of FIGS. 7A and 7B, but differs from the embodiment of FIGS. 7A and 7B in terms of some components of the pen sensing electrode 1-1 PSE1-1. The above description may be applied to the same components, and the following description will be focused on the difference.

Referring to FIG. 7E, the pen sensing electrode 1-1 PSE1-1 may include the pen sensing patterns 1-1 PSP1-1, the extending patterns 1-1 PEP1-1, and connecting patterns 1-1 PCP1-1. The pen sensing patterns 1-1 PSP1-1, the extending patterns 1-1 PEP1-1, and the connecting patterns 1-1 PCP1-1 may be disposed on the same layer as the first sensing patterns SP1 and the first extending pattern EP1.

The pen sensing patterns 1-1 PSP1-1 may be arranged in the first direction DR1. Each of the pen sensing patterns 1-1 PSP1-1 may be disposed between the first sensing pattern SP1 of the sensing electrode 1-1 SE1-1 and the first sensing pattern SP1 of the sensing electrode 1-2 SE1-2 arranged in the second direction DR2 in a plan view. The pen sensing patterns 1-1 PSP1-1 may be spaced apart from the first sensing patterns SP1 and may be electrically insulated from the first sensing electrode SE1.

The extending patterns 1-1 PEP1-1 may extend in the first direction DR1 from a corresponding pen sensing pattern 1-1 PSP1-1 among the pen sensing patterns 1-1 PSP1-1. The extending patterns 1-1 PEP1-1 may be formed of the same material and fromed at the same time with the corresponding pen sensing pattern 1-1 PSP1-1. Extending patterns 1-1 PEP1-1 connected to one pen sensing pattern 1-1 PSP1-1 may extend from the pen sensing pattern 1-1 PSP1-1 parallel to the first direction DR1 in opposite directions. However, the shape in which the extending patterns 1-1 PEP1-1 extend is not limited thereto.

The connecting patterns 1-1 PCP1-1 may be formed of the same material and formed at the same time with the pen sensing patterns 1-1 PSP1-1 and the extending patterns 1-1 PEP1-1. The connecting patterns 1-1 PCP1-1 may be spaced apart from the pen sensing patterns PSP1-1 and the extending patterns 1-1 PEP1-1 formed in one piece.

The connecting patterns 1-1 PCP1-1 may be disposed to alternate with the pen sensing patterns PSP1-1 and the extending patterns 1-1 PEP1-1, which are formed in the one piece, in the first direction DR1. Specifically, a connecting pattern 1-1 PCP1-1 may be disposed between an extending pattern 1-1 PEP1-1 extending from one pen sensing pattern 1-1 PSP1-1 and an extending pattern 1-1 PEP1-1 extending from another pen sensing pattern 1-1 PSP1-1 disposed adjacent to the extending pattern 1-1 PEP1-1 extending from one pen sensing pattern 1-1 PSP1-1 and may be separated therefrom.

The connecting pattern 1-1 PCP1-1 may be disposed between the sensing electrode 1-1 SE1-1 and the sensing electrode 1-2 SE1-2 in a plan view. For example, the connecting patterns 1-1 PCP1-1 may be disposed between the first extending pattern EP1 of the sensing electrode 1-1 SE1-1 and the first extending pattern EP1 of the sensing electrode 1-2 SE1-2 in the second direction DR2.

The connecting pattern 1-1 PCP1-1 may extend in the first direction DR1. The connecting pattern 1-1 PCP1-1 may overlap the pen sensing electrode 2-2 PSE2-2 and the second connecting patterns CP2 in a plan view. The connecting pattern 1-1 PCP1-1, which extends in the first direction DR1, may cross the pen sensing electrode 2-2 PSE2-2 and the second connecting patterns CP2, which extend in the second direction DR2, in a plan view. The connecting pattern 1-1 PCP1-1 may be spaced apart from the pen sensing electrode 2-2 PSE2-2 and the second connecting patterns CP2 with an insulating layer disposed therebetween in the thickness direction (or the third direction DR3) and may be electrically insulated therefrom.

Each of the pen sensing patterns 1-2 PSP1-2 may overlap the pen sensing pattern 1-1 PSP1-1, the extending pattern 1-1 PEP1-1, and the connecting pattern 1-1 PCP1-1.

One pen sensing pattern 1-2 PSP1-2 among the pen sensing patterns 1-2 PSP1-2 spaced apart from each other in the first direction DR1 may be connected, through the first contact SCT1, with the pen sensing pattern 1-1 PSP1-1 and the extending pattern 1-1 PEP1-1 that overlap the one pen sensing pattern 1-2 PSP1-2. Another pen sensing pattern 1-2 PSP1-2 among the pen sensing patterns 1-2 PSP1-2 spaced apart from each other in the first direction DR1 may be connected, through the second contact SCT2, with the pen sensing pattern 1-1 PSP1-1 and the extending pattern 1-1 PEP1-1 that overlap the other pen sensing pattern 1-2 PSP1-2. That is, the pen sensing patterns 1-1 PSP1-1 may be electrically connected to the pen sensing patterns 1-2 PSP1-2, respectively.

The pen sensing patterns 1-2 PSP1-2 spaced apart from each other in the first direction DR1 and disposed adjacent to each other may overlap one connecting pattern 1-1 PCP1-1. The pen sensing pattern 1-2 PSP1-2 overlapping one end of the connecting pattern 1-1 PCP1-1 may be connected to the connecting pattern 1-1 PCP1-1 through a fifth contact SCT5. The pen sensing pattern 1-2 PSP1-2 overlapping an opposite end of the connecting pattern 1-1 PCP1-1 may be connected to the connecting pattern 1-1 PCP1-1 through a sixth contact SCT6. The pen sensing patterns 1-2 PSP1-2 spaced apart from each other may be electrically connected through the connecting pattern 1-1 PCP1-1 disposed on a layer different from the pen sensing patterns 1-2 PSP1-2. The connecting pattern 1-1 PCP1-1 may be defined as a bridge pattern that electrically connects the pen sensing patterns 1-2 PSP1-2 spaced apart from each other and disposed on a layer different from the connecting pattern 1-1 PCP1-1.

The pen sensing patterns 1-1 PSP1-1 and the pen sensing patterns 1-2 PSP1-2 disposed on different layers and connected while overlapping each other may be spaced apart from each other in the first direction DR1 and may be electrically connected together through the connecting pattern 1-1 PCP1-1. The first pen sensing electrode PSE1 may include the pen sensing electrodes 1-1 PSE1-1 and 1-2 PSE1-2 electrically connected with each other and formed in a double layer structure, and the resistance of the first pen sensing electrode PSE1 may be lowered.

Figure 8:
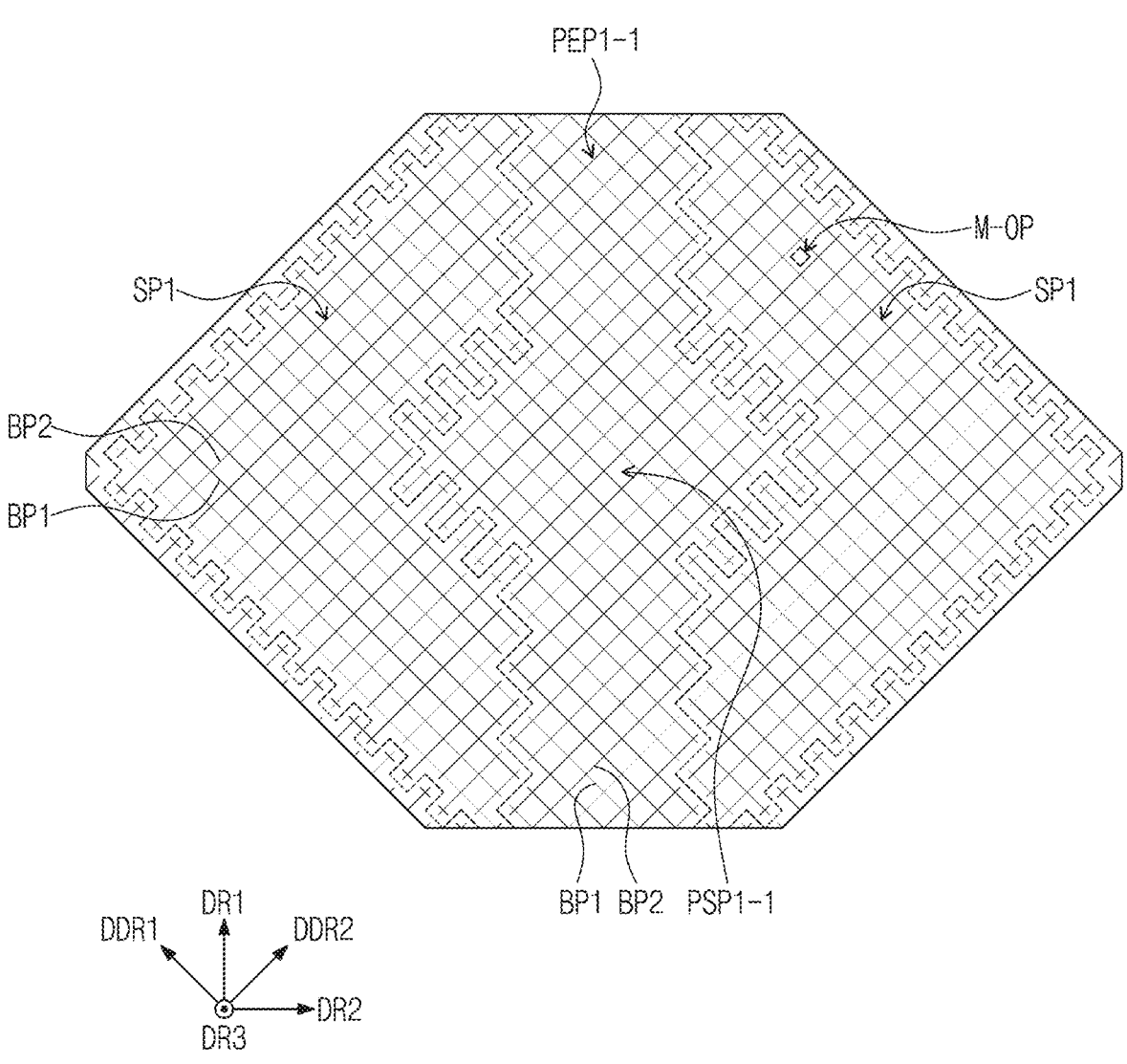
FIG. 8 is an enlarged plan view illustrating a portion of a first sensing electrode and a portion of a first pen sensing electrode of FIG. 7A.

FIG. 8 is an enlarged plan view illustrating a portion of the first sensing electrode SE1 and a portion of the first pen sensing electrode PSE1 of FIG. 7A. FIG. 8 schematically illustrates the first sensing patterns SP1, the pen sensing pattern 1-1 PSP1-1, and a portion of the extending pattern 1-1 PEP1-1 disposed on the same layer.

Referring to FIG. 8, the first sensing patterns SP1 of the first sensing electrode SE1, the pen sensing pattern 1-1 PSP1-1 adjacent to the first sensing patterns SP1, and the extending pattern 1-1 PEP1-1 may have a mesh shape. Each of the first sensing patterns SP1, the pen sensing pattern 1-1 PSP1-1, and the extending pattern 1-1 PEP1-1 may include first conductive lines BP1 extending in a first crossing direction DDR1 and second conductive lines BP2 extending in a second crossing direction DDR2.

In this embodiment, each of the first crossing direction DDR1 and the second crossing direction DDR2 may be defined as a direction that crosses the first direction DR1 and the second direction DR2 in a plan view defined by the first direction DR1 and the second direction DR2. In addition, the first crossing direction DDR1 and the second crossing direction DDR2 may cross each other in a plan view.

The first conductive lines BP1 and the second conductive lines BP2 may be formed of the same material, formed at the same time, and formed through the same process. The first sensing patterns SP1, the pen sensing pattern 1-1 PSP1-1, and the extending pattern 1-1 PEP1-1 may be formed by cutting or patterning a mesh-type sheet formed of the first conductive lines BP1 and the second conductive lines BP2.

Mesh openings M-OP having a rhombic shape may be defined by the first conductive lines BP1 and the second conductive lines BP2. The mesh openings M-OP may overlap the emissive region LA of FIG. 5. That is, the first conductive lines BP1 and the second conductive lines BP2 may overlap the non-emissive region NLA (refer to FIG. 5) and may not overlap the emissive region LA (refer to FIG. 5). Since the components of the input sensing unit ISP (refer to FIG. 5) have a mesh shape, the light emission efficiency of the display panel DP (refer to FIG. 5) may not be affected by the input sensing unit ISP (refer to FIG. 5).

The boundaries between the first sensing patterns SP1 and the pen sensing pattern 1-1 PSP1-1 and the boundaries between the first sensing patterns SP1 and the extending pattern 1-1 PEP1-1 may be formed in a zigzag form. For example, the boundaries between the first sensing patterns SP1 and the pen sensing pattern 1-1 PSP1-1 and the boundaries between the first sensing patterns SP1 and the extending pattern 1-1 PEP1-1 are illustrated by dotted lines in FIG. 8. The dotted lines, which are regions where the electrodes are not substantially disposed, may be virtual dotted lines indicating the boundaries between the electrodes.

The first sensing patterns SP1 and the pen sensing pattern 1-1 PSP1-1 may be spaced apart from each other in the zigzag form illustrated by the dotted lines, and the first sensing patterns SP1 and the extending pattern 1-1 PEP1-1 may be spaced apart from each other in the zigzag form illustrated by the dotted lines. That is, the boundaries between the first sensing patterns SP1 and the pen sensing pattern 1-1 PSP1-1, and the boundaries between the first sensing patterns SP1 and the extending pattern 1-1 PEP1-1 may have a zigzag form. In a case in which the boundaries between the first sensing patterns SP1 and the pen sensing pattern 1-1 PSP1-1, and the boundaries between the first sensing patterns SP1 and the extending pattern 1-1 PEP1-1 are formed in a straight line, the boundaries between the patterns may be easily visible from the outside. Since the boundaries between the first sensing patterns SP1 and the pen sensing pattern 1-1 PSP1-1, and the boundaries between the first sensing patterns SP1 and the extending pattern 1-1

PEP1-1 are formed in a zigzag form, the boundaries between the patterns may be prevented from being visible from the outside.

As described above, the patterns constituting the first sensing electrode SE1, the second sensing electrode SE2, the first pen sensing electrode PSE1, and the second pen sensing electrode PSE2 may have a mesh shape, and the boundaries therebetween may be formed in a zigzag form.

Figure 9A:
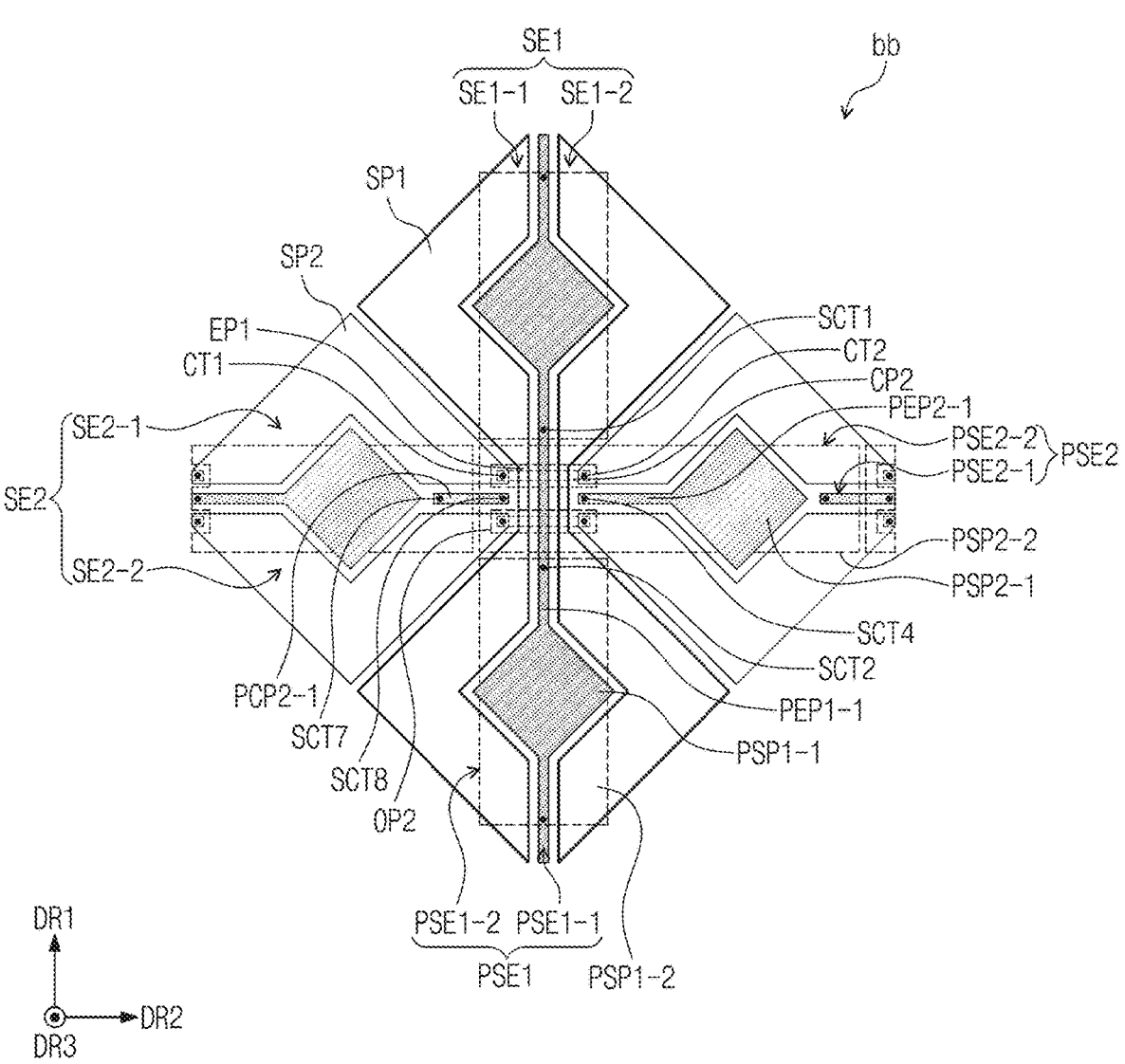
FIG. 9A is an enlarged plan view of the input sensing unit corresponding to region bb of FIG. 6.
Figure 9B:
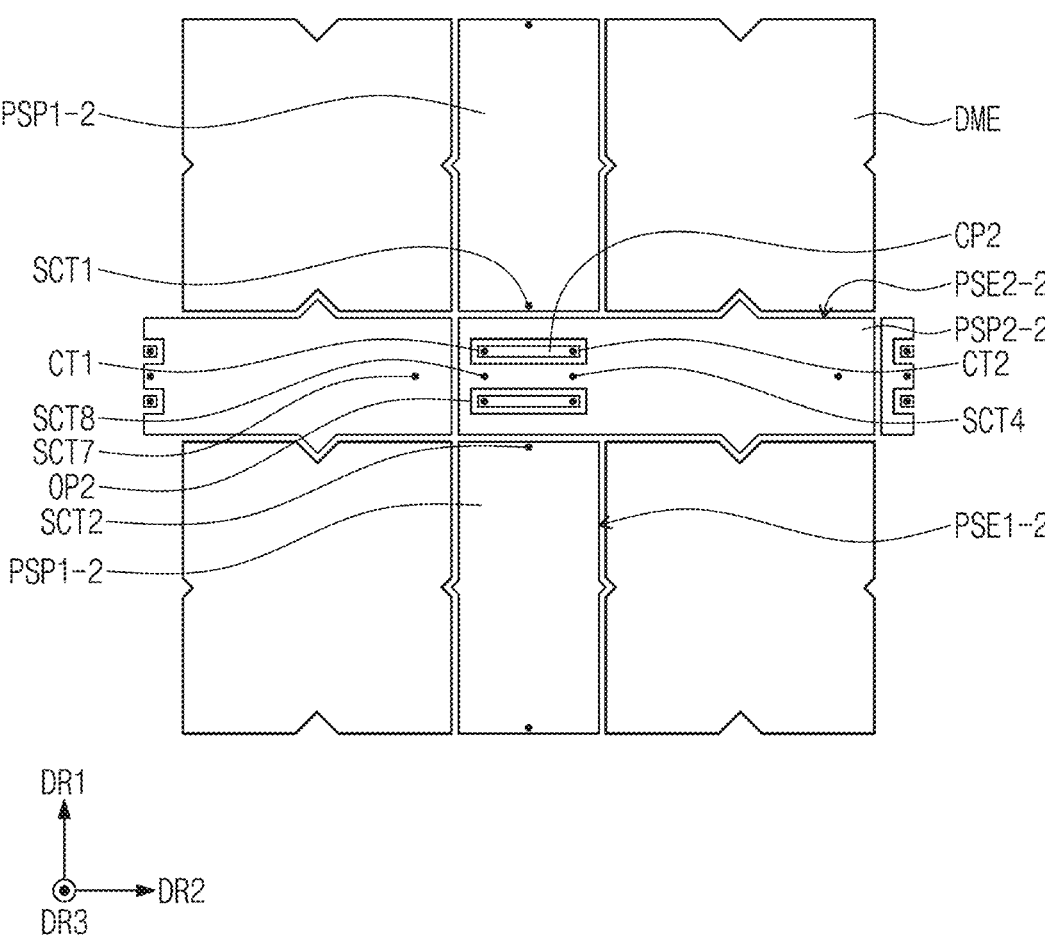
FIG. 9B is an enlarged plan view illustrating some components of the input sensing unit of FIG. 9A.
Figure 9C:
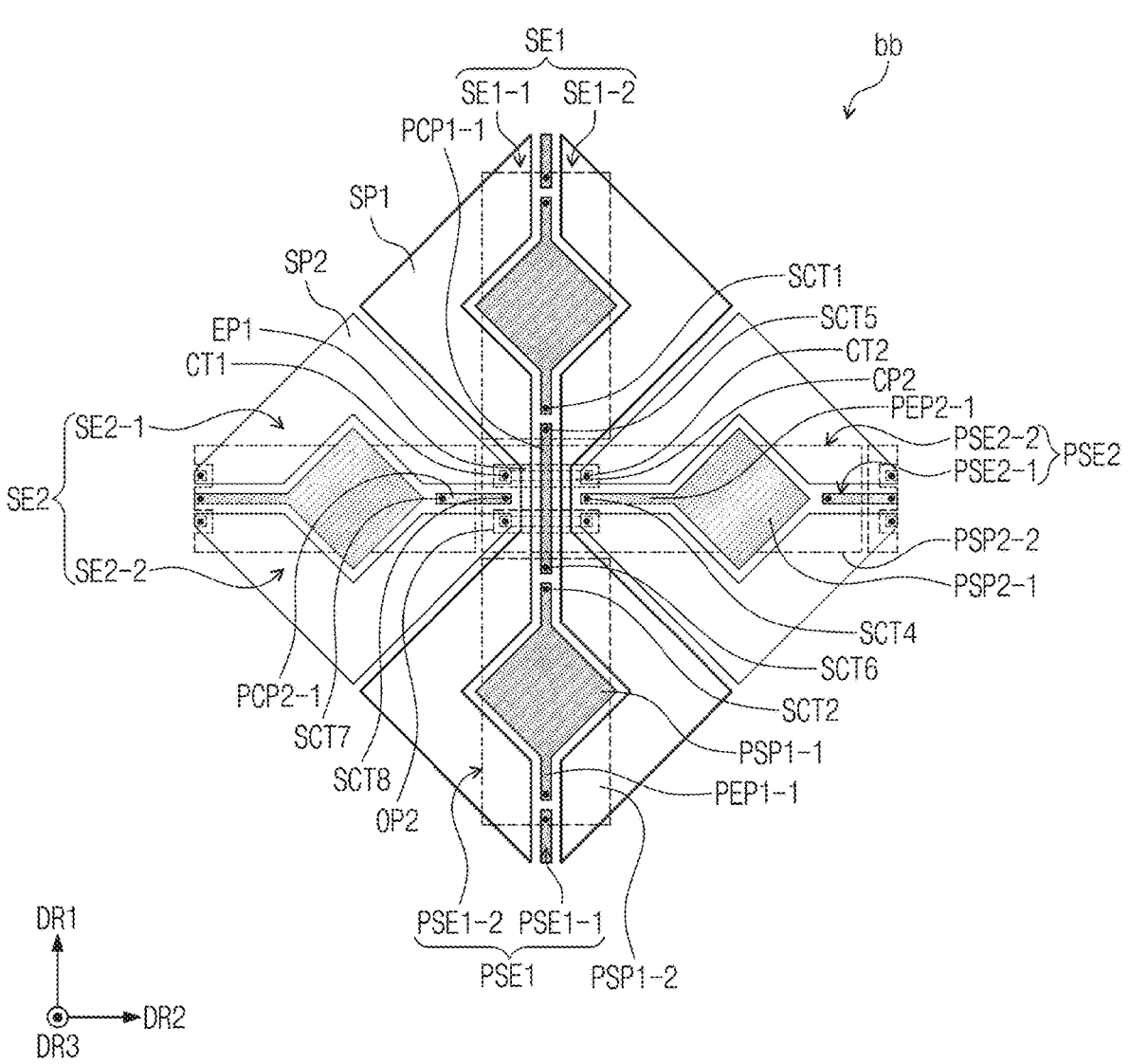
FIG. 9C is an enlarged plan view of the input sensing unit corresponding to region bb of FIG. 6.

FIGS. 9A and 9C are enlarged plan views corresponding to region bb of FIG. 6. FIG. 9B is an enlarged plan view illustrating some components of the input sensing unit ISP illustrated in FIG. 9A.

Referring to FIGS. 9A and 9B, the first sensing electrode SE1 may include the sensing electrode 1-1 SE1-1 and the sensing electrode 1-2 SE1-2 arranged in the second direction DR2. The second sensing electrode SE2 may include the sensing electrode 2-1 SE2-1 and the sensing electrode 2-2 SE2-2 arranged in the first direction DR1. The description of the first sensing electrode SE1 and the second sensing electrode SE2 of FIGS. 7A to 7D may be applied to the first sensing electrode SE1 and the second sensing electrode SE2, and description thereabout will be omitted.

The first pen sensing electrode PSE1 may include the pen sensing electrode 1-1 PSE1-1 and the pen sensing electrode 1-2 PSE1-2 overlapping each other in a plan view. The description of the first pen sensing electrode PSE1 of FIGS. 7A to 7D may be applied to the first pen sensing electrode PSE1, and description thereabout will be omitted.

The second pen sensing electrode PSE2 may include the pen sensing electrode 2-1 PSE2-1 and the pen sensing electrode 2-2 PSE2-2 overlapping each other in a plan view. The pen sensing electrode 2-1 PSE2-1 and the pen sensing electrode 2-2 PSE2-2 may be disposed on different layers and may be electrically connected with each other through contacts SCT4, SCT7, and SCT8 formed through an insulating layer.

The pen sensing electrode 2-1 PSE2-1 may be disposed on the same layer as the second sensing patterns SP2 of the second sensing electrode SE2 and the pen sensing electrode 1-1 PSE1-1. The pen sensing electrode 2-1 PSE2-1 may include the pen sensing patterns 2-1 PSP2-1, the extending patterns 2-1 PEP2-1, and connecting patterns 2-1 PCP2-1.

The pen sensing patterns 2-1 PSP2-1 may be arranged in the second direction DR2. Each of the pen sensing patterns 2-1 PSP2-1 may be disposed between the second sensing pattern SP2 of the sensing electrode 2-1 SE2-1 and the second sensing pattern SP2 of the sensing electrode 2-2 SE2-2 arranged in the first direction DR1 in a plan view. The pen sensing patterns 2-1 PSP2-1 may be spaced apart from the second sensing patterns SP2 and may be electrically insulated from the second sensing electrode SE2.

The pen sensing patterns 2-1 PSP2-1 may have a rhombic shape in a plan view. However, the shapes of the pen sensing patterns 2-1 PSP2-1 are not limited to the illustrated embodiment.

The extending patterns 2-1 PEP2-1 may extend in the second direction DR2 from a corresponding pen sensing pattern 2-1 PSP2-1 among the pen sensing patterns 2-1 PSP2-1. The extending patterns 2-1 PEP2-1 may be disposed on the same layer as the pen sensing patterns 2-1 PSP2-1 and may be formed of the same material and formed at the same time with the corresponding pen sensing pattern 2-1 PSP2-1. One extending pattern 2-1 PEP2-1 may extend from one pen sensing pattern 2-1 PSP2-1. However, the shape in which the extending patterns 2-1 PEP2-1 extend is not limited thereto.

The connecting pattern 2-1 PCP2-1 may be disposed on the same layer as the pen sensing patterns 2-1 PSP2-1 and the extending patterns 2-1 PEP2-1. The connecting pattern 2-1 PCP2-1 may be spaced apart from the pen sensing pattern 2-1 PSP2-1 and the extending pattern 2-1 PEP2-1 which are formed of the same material and formed at the same time.

The connecting patterns 2-1 PCP2-1 may be disposed to alternate with the pen sensing patterns 2-1 PSP2-1 and the extending patterns 2-1 PEP2-1, which are formed of the same material and formed at the same time, in the second direction DR2. Specifically, a connecting pattern 2-1 PCP2-1 may be disposed between an extending pattern 2-1 PEP2-1 extending from one pen sensing pattern 2-1 PSP2-1 and another pen sensing pattern 2-1 PSP2-1 and may be separated therefrom.

Each of the connecting patterns 2-1 PCP2-1 may extend in the second direction DR2. The connecting patterns 2-1 PCP2-1 may overlap pen sensing patterns 2-2 PSP2-2 spaced apart from each other in the second direction DR2.

The pen sensing electrode 2-2 PSE2-2 may be disposed on a layer different from the second sensing patterns SP2 of the second sensing electrode SE2. The pen sensing electrode 2-2 PSE2-2 may be disposed on the same layer as the second connecting patterns CP2.

The pen sensing electrode 2-2 PSE2-2 may include the pen sensing patterns 2-2 PSP2-2 spaced apart from each other. Each of the pen sensing patterns 2-2 PSP2-2 may extend in the second direction DR2. The pen sensing patterns 2-2 PSP2-2 may be arranged in the second direction DR2.

A second opening OP2 may be defined in each of the pen sensing patterns PSP2-2. A plurality of second openings OP2 may be defined in the pen sensing electrode 2-2 PSP2-2. The second connecting pattern CP2 may be disposed in the second opening OP2. Since the second connecting pattern CP2 is disposed in the second opening OP2 of the pen sensing pattern 2-2 PSP2-2, the second connecting pattern CP2 may be electrically insulated from the pen sensing electrode 2-2 PSE2-2 disposed on the same layer.

The pen sensing patterns 2-2 PSP2-2 may be disposed on the same layer as the pen sensing patterns 1-2 PSP1-2. Each of the pen sensing patterns 2-2 PSP2-2 may be disposed between the pen sensing patterns 1-2 PSP1-2 spaced apart from each other in the first direction DR1. The pen sensing patterns 2-2 PSP2-2 may overlap the first extending patterns EP1 of the first sensing electrode SE1 and the extending pattern 1-1 PEP1-1 of the first pen sensing electrode PSE1 in a plan view.

Each of the pen sensing patterns 2-2 PSP2-2 may overlap the pen sensing pattern 2-1 PSP2-1, the extending pattern 2-1 PEP2-1, and the connecting pattern 2-1 PCP2-1.

Each of the pen sensing patterns 2-2 PSP2-2 may be connected, through the fourth contact SCT4, to the pen sensing pattern 2-1 PSP2-1 and the extending pattern 2-1 PEP2-1 that overlap the pen sensing pattern 2-2 PSP2-2, among the pen sensing patterns 2-1 PSP2-1 and the extending patterns 2-1 PEP2-1. The pen sensing patterns 2-2 PSP2-2 may be electrically connected to the pen sensing patterns 2-1 PSP2-1, respectively.

The pen sensing patterns 2-2 PSP2-2 spaced apart from each other in the second direction DR2 and disposed adjacent to each other may overlap one connecting pattern 2-1 PCP2-1. The pen sensing pattern 2-2 PSP2-2 overlapping one end of the connecting pattern 2-1 PCP2-1 may be connected to the connecting pattern 2-1 PCP2-1 through the seventh contact SCT7. The pen sensing pattern 2-2 PSP2-2 overlapping an opposite end of the connecting pattern 2-1 PCP2-1 may be connected to the connecting pattern 2-1 PCP2-1 through the eighth contact SCT8. The pen sensing patterns 2-2 PSP2-2 spaced apart from each other may be electrically connected through the connecting pattern 2-1 PCP2-1 disposed on a layer different from the pen sensing patterns 2-2 PSP2-2. The connecting pattern 2-1 PCP2-1 may be defined as a bridge pattern that electrically connects the pen sensing patterns 2-2 PSP2-2 spaced apart from each other and disposed on a layer different from the connecting pattern 2-1 PCP2-1.

The pen sensing patterns 2-1 PSP2-1 and the pen sensing patterns 2-2 PSP2-2 disposed on different layers and connected while overlapping each other may be spaced apart from each other in the second direction DR2 and may be electrically connected together through the connecting pattern 2-1 PCP2-1. The second pen sensing electrode PSE2 may include the pen sensing electrodes 2-1 PSE2-1 and 2-2 PSE2-2 electrically connected with each other and formed in a double layer structure, and the resistance of the second pen sensing electrode PSE2 may be lowered.

FIG. 9B schematically illustrates the components disposed below among the components of the sensing electrodes SE1 and SE2 and the pen sensing electrodes PSE1 and PSE2 illustrated in FIG. 9A.

Referring to FIG. 9B, the pen sensing patterns 1-2 PSP1-2 of the pen sensing electrode 1-2 PSE1-2, the pen sensing patterns 2-2 PSP2-2 of the pen sensing electrode 2-2 PSE2-2, and the second connecting patterns CP2 may be disposed on the same layer. The input sensing unit ISP may further include the dummy patterns DME disposed on the same layer as the pen sensing patterns 1-2 PSP1-2, the pen sensing patterns 2-2 PSP2-2, and the second connecting patterns CP2.

The dummy patterns DME may be disposed around the pen sensing patterns 1-2 PSP1-2 and the pen sensing patterns 2-2 PSP2-2 so as to be separated therefrom. The dummy patterns DME may overlap a portion of the first sensing electrode SE1 and a portion of the second sensing electrode SE2 in a plan view. The dummy patterns DME may prevent the shapes of the pen sensing electrode 1-2 PSE1-2 and the pen sensing electrode 2-2 PSE2-2 from being visible from the outside.

FIG. 9C illustrates an embodiment that includes substantially the same components as the embodiment of FIGS. 9A and 9B, but differs from the embodiment of FIGS. 9A and 9B in terms of some components of the pen sensing electrode 1-1 PSE1-1. The above description may be applied to the same components.

Referring to FIG. 9C, the pen sensing electrode 1-1 PSE1-1 may include the pen sensing patterns 1-1 PSP1-1, the extending patterns 1-1 PEP1-1, and the connecting patterns 1-1 PCP1-1. The description of the pen sensing electrode 1-1 PSE1-1 of FIG. 7E may be applied to the pen sensing patterns 1-1 PSP1-1, the extending patterns 1-1 PEP1-1, and the connecting patterns 1-1 PCP1-1 of the pen sensing electrode 1-1 PSE1-1, and repetitive description thereabout will be omitted.

The connecting pattern 1-1 PCP1-1 may extend in the first direction DR1 and may overlap the pen sensing pattern 2-2 PSP2-2 and the second connecting patterns CP2 in a plan view. The connecting pattern 1-1 PCP1-1, which extends in the first direction DR1, may cross the pen sensing pattern 2-2 PSP2-2 and the second connecting patterns CP2, which extend in the second direction DR2, in a plan view. The connecting pattern 1-1 PCP1-1 may be spaced apart from the pen sensing pattern 2-2 PSP2-2 and the second connecting patterns CP2 with an insulating layer disposed therebetween in the thickness direction (or the third direction DR3) and may be electrically insulated therefrom.

Figure 10A:
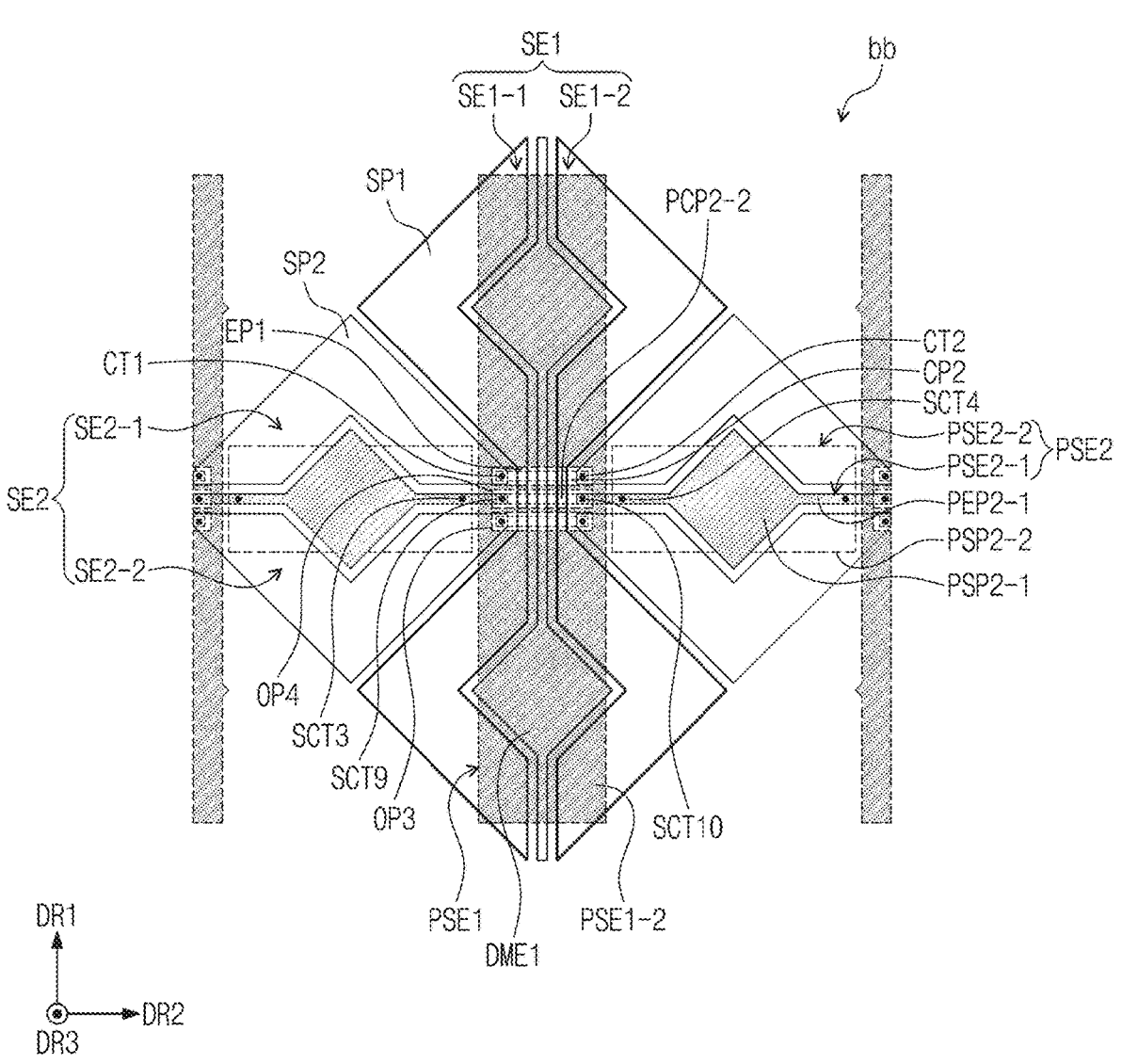
FIG. 10A is an enlarged plan view of the input sensing unit corresponding to region bb of FIG. 6.
Figure 10B:
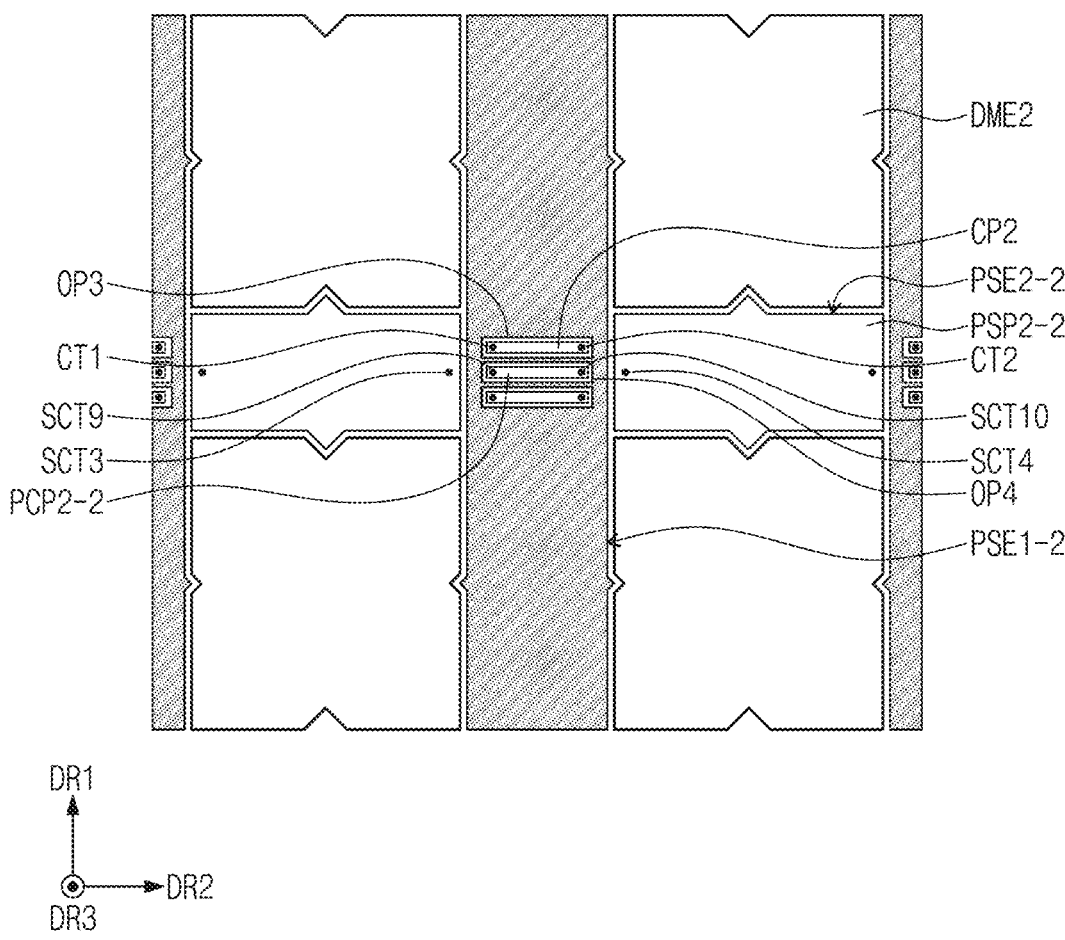
FIG. 10B is an enlarged plan view illustrating some components of the input sensing unit of FIG. 10A.

FIG. 10A is an enlarged plan view corresponding to region bb of FIG. 6. FIG. 10B is an enlarged plan view illustrating some components of the input sensing unit ISP illustrated in FIG. 10A.

Referring to FIGS. 10A and 10B, the first sensing electrode SE1 may include the sensing electrode 1-1 SE1-1 and the sensing electrode 1-2 SE1-2 arranged in the second direction DR2. The second sensing electrode SE2 may include the sensing electrode 2-1 SE2-1 and the sensing electrode 2-2 SE2-2 arranged in the first direction DR1. The description of the first sensing electrode SE1 and the second sensing electrode SE2 of FIGS. 7A to 7D may be applied to the first sensing electrode SE1 and the second sensing electrode SE2, and description thereabout will be omitted.

One of the first pen sensing electrode PSE1 and the second pen sensing electrode PSE2 may be provided as a single-layer pen sensing electrode. For example, as in the embodiment illustrated in FIGS. 10A and 10B, the first pen sensing electrode PSE1 may be provided as a single-layer pen sensing electrode, and the second pen sensing electrode PSE2 may be provided as a double-layer pen sensing electrode. However, without being limited thereto, the second pen sensing electrode PSE2 may be provided as a single-layer pen sensing electrode.

Referring to FIGS. 10A and 10B, the first pen sensing electrode PSE1 may include the pen sensing electrode 1-2 PSE1-2. In an embodiment, the above-described pen sensing electrode 1-1 PSE1-1 (refer to FIG. 7A) may be omitted. However, without being limited thereto, the first pen sensing electrode PSE1 may include pen sensing electrode 1-1 PSE1-1 (refer to FIG. 7A), and the pen sensing electrode 1-2 PSE1-2 may be omitted.

The pen sensing electrode PSE1-2 may have an integrated shape without a bridge pattern. Accordingly, a decrease in the resistance of the first pen sensing electrode PSE1, which is provided as a single layer, may be minimized.

The pen sensing electrode 1-2 PSE1-2 may be disposed on a layer different from the first sensing patterns SP1, the second sensing patterns SP2, and the pen sensing patterns 2-1 PSP2-1. For example, the pen sensing electrode 1-2 PSE1-2 may be disposed below the first sensing patterns SP1, the second sensing patterns SP2, and the pen sensing patterns 2-1 PSP2-1.

The pen sensing electrode 1-2 PSE1-2 may extend in the first direction DR1. The pen sensing electrode 1-2 PSE1-2 may partially overlap the first sensing patterns SP1 that extend in the first direction DR1 and are arranged in the second direction DR2 in a plan view.

The pen sensing electrode 1-2 PSE1-2 may be disposed on the same layer as the pen sensing patterns 2-2 PSP2-2 and connecting patterns 2-2 PCP2-2. The pen sensing electrode 1-2 PSE1-2 may extend in the first direction DR1 and may be disposed to cross the pen sensing patterns 2-2 PSP2-2 spaced apart from each other in the second direction DR2.

The pen sensing electrode 1-2 PSE1-2 may have a third opening OP3 and a fourth opening OP4 defined therein. A plurality of third openings OP3 may be defined in the pen sensing electrode 1-2 PSE1-2. The third opening OP3 may overlap the second connecting pattern CP2 in a plan view. That is, the second connecting pattern CP2 may be disposed in the third opening OP3. Since the second connecting pattern CP2 is disposed in the third opening OP3 of the pen sensing electrode 1-2 PSE1-2, the second connecting pattern CP2 may be spaced apart from the pen sensing electrode 1-2

PSE1-2 and may be electrically insulated from the pen sensing electrode 1-2 PSE1-2.

The fourth opening OP4 may overlap the connecting pattern 2-2 PCP2-2, which will be described below, in a plan view. That is, the connecting pattern 2-2 PCP2-2 may be disposed in the fourth opening OP4. Since the connecting pattern 2-2 PCP2-2 is disposed in the fourth opening OP4 of the pen sensing electrode 1-2 PSE1-2, the connecting pattern 2-2 PCP2-2 may be spaced apart from the pen sensing electrode 1-2 PSE1-2 and may be electrically insulated from the pen sensing electrode 1-2 PSE1-2.

The second pen sensing electrode PSE2 may include the pen sensing electrode 2-1 PSE2-1 and the pen sensing electrode 2-2 PSE2-2 overlapping each other in a plan view. The pen sensing electrode 2-1 PSE2-1 and the pen sensing electrode 2-2 PSE2-2 may be disposed on different layers and may be electrically connected with each other through contacts SCT3, SCT4, SCT9, and SCT10 formed through an insulating layer.

The pen sensing electrode 2-1 PSE2-1 may include the pen sensing patterns 2-1 PSP2-1 and the extending patterns 2-1 PEP2-1. The description of the pen sensing electrode 2-1 PSE2-1 of FIGS. 7A to 7D may be applied to the pen sensing electrode 2-1 PSE2-1. Hereinafter, description of the pen sensing electrode 2-1 PSE2-1 will be omitted.

The pen sensing electrode 2-2 PSE2-2 may include the pen sensing patterns 2-2 PSP2-2 and the connecting patterns 2-2 PCP2-2. The pen sensing patterns 2-2 PSP2-2 and the connecting patterns 2-2 PCP2-2 may be alternately disposed in the second direction DR2. Each of the connecting patterns 2-2 PCP2-2 may be disposed between the pen sensing patterns 2-2 PSP2-2.

Each of the pen sensing patterns 2-2 PSP2-2 may overlap a corresponding pen sensing pattern 2-1 PSP2-1 among the pen sensing patterns 2-1 PSP2-1 and a corresponding extending pattern 2-1 PEP2-1 among the extending patterns 2-1 PEP2-1. The pen sensing patterns 2-2 PSP2-2 may be connected, through the contacts SCT3 and SCT4, to the pen sensing pattern 2-1 PSP2-1 and the extending pattern 2-1 PEP2-1 that overlap the pen sensing patterns 2-2 PSP2-2.

The connecting patterns 2-2 PCP2-2 may be disposed on the same layer as the pen sensing electrode 1-2 PSE1-2 and the second connecting patterns CP2. The connecting patterns 2-2 PCP2-2 may be disposed in the fourth opening OP4 of the pen sensing electrode 1-2 PSE1-2.

In a plan view, the connecting pattern 2-2 PCP2-2 may overlap an extending pattern 2-1 PEP2-1 extending from one pen sensing pattern 2-1 PSP2-1 among the pen sensing patterns 2-1 PSP2-1 and an extending pattern 2-1 PEP2-1 extending from another pen sensing pattern 2-1 PSP2-1. The extending pattern 2-1 PEP2-1 extending from the one pen sensing pattern 2-1 PSP2-1 and overlapping one end of the connecting pattern 2-2 PCP2-2 may be connected to the connecting pattern 2-2 PCP2-2 through the ninth contact SCT9. The extending pattern 2-1 PEP2-1 extending from the other one pen sensing pattern 2-1 PSP2-1 and overlapping an opposite end of the connecting pattern 2-2 PCP2-2 may be connected to the connecting pattern 2-2 PCP2-2 through the tenth contact SCT10.

The extending patterns 2-1 PEP2-1 may be spaced apart from each other with the first extending patterns EP1 disposed therebetween. The extending patterns 2-1 PEP2-1 extending from the pen sensing patterns 2-1 PSP2-1 spaced apart from each other in the second direction DR2 may be spaced apart from each other and may be electrically connected through the connecting pattern 2-2 PCP2-2 disposed in a layer different from the extending patterns 2-1 PEP2-1.

The connecting pattern 2-2 PCP2-2 may be defined as a bridge pattern that electrically connects the extending patterns 2-1 PEP2-1 disposed on a layer different from the connecting pattern 2-2 PCP2-2 and spaced apart from each other.

The input sensing unit ISP may further include a first dummy pattern DME1. The first dummy pattern DME1 may be disposed on the same layer as the first sensing electrode SE1, the second sensing patterns SP2 of the second sensing electrode SE2, and the pen sensing electrode 2-1 PSE2-1.

The first dummy pattern DME1 may overlap the pen sensing electrode 1-2 PSE1-2 in a plan view. The first dummy pattern DME1 may be spaced apart from the pen sensing electrode 1-2 PSE1-2 in the thickness direction (or the third direction DR3) with an insulating layer disposed therebetween and may be electrically insulated from the pen sensing electrode 1-2 PSE1-2.

The first dummy pattern DME1 may extend in the first direction DR1. The first dummy pattern DME1 may be disposed between the sensing electrode 1-1 SE1-1 and the sensing electrode 1-2 SE1-2 in a plan view and may be separated therefrom. The first dummy pattern DME1 may be a floating electrode.

The first dummy pattern DME1 may be disposed between the sensing electrode 1-1 SE1-1 and the sensing electrode 1-2 SE1-2. The first dummy pattern DME1 may decrease a difference in light reflectivity between a region in which the sensing electrode 1-1 SE1-1 and the sensing electrode 1-2 SE1-2 are not disposed and a region in which the sensing electrode 1-1 SE1-1 and the sensing electrode 1-2 SE1-2 are disposed. Accordingly, the first dummy pattern DME1 may prevent the shape of the first sensing electrode SE1 from being visible from the outside.

FIG. 10B schematically illustrates the components disposed below the sensing electrodes SE1 and SE2 and the pen sensing electrodes PSE1 and PSE2 illustrated in FIG. 10A.

Referring to FIG. 10B, the pen sensing electrodes 1-2 PSE1-2, the pen sensing patterns 2-2 PSP2-2 and the connecting patterns 2-2 PCP2-2 of the pen sensing electrode 2-2 PSE2-2, and the second connecting patterns CP2 may be disposed on the same layer. The input sensing unit ISP may further include second dummy patterns DME2 disposed on the same layer as the pen sensing electrodes 1-2 PSE1-2, the pen sensing patterns 2-2 PSP2-2, the connecting patterns 2-2 PCP2-2, and the second connecting patterns CP2.

The second dummy patterns DME2 may be disposed around the pen sensing electrode 1-2 PSE1-2 and the pen sensing patterns 2-2 PSP2-2 and may be separated therefrom. The second dummy patterns DME2 may prevent the shapes of the pen sensing electrode 1-2 PSE1-2 and the pen sensing electrode 2-2 PSE2-2 from being visible from the outside. The descriptions of the dummy patterns DME of FIGS. 7B and 9B may be applied to the second dummy patterns DME2. Hereinafter, description of the second dummy patterns DME2 will be omitted.

Figure 11A:
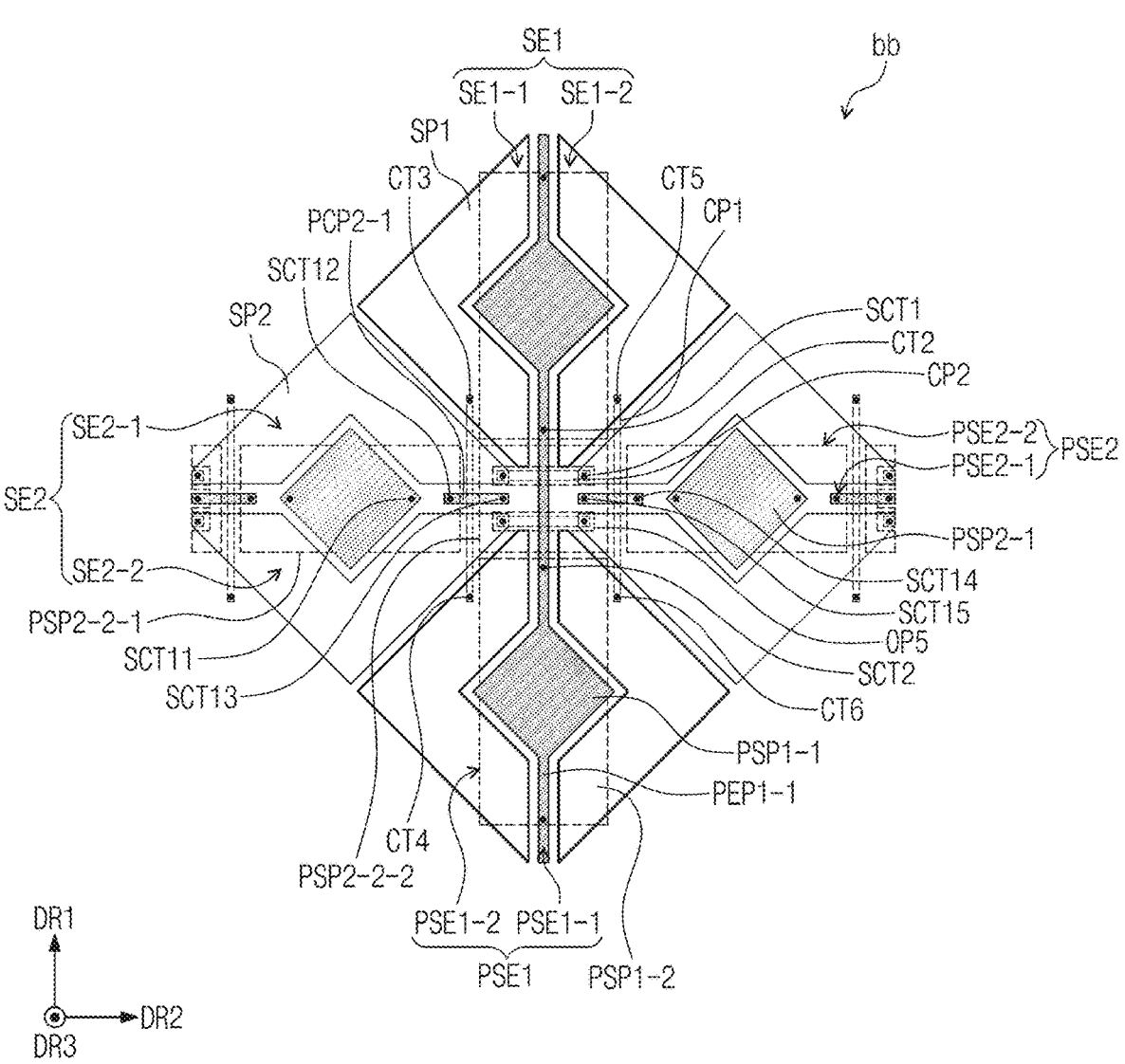
FIG. 11A is an enlarged plan view of the input sensing unit corresponding to region bb of FIG. 6.
Figure 11B:
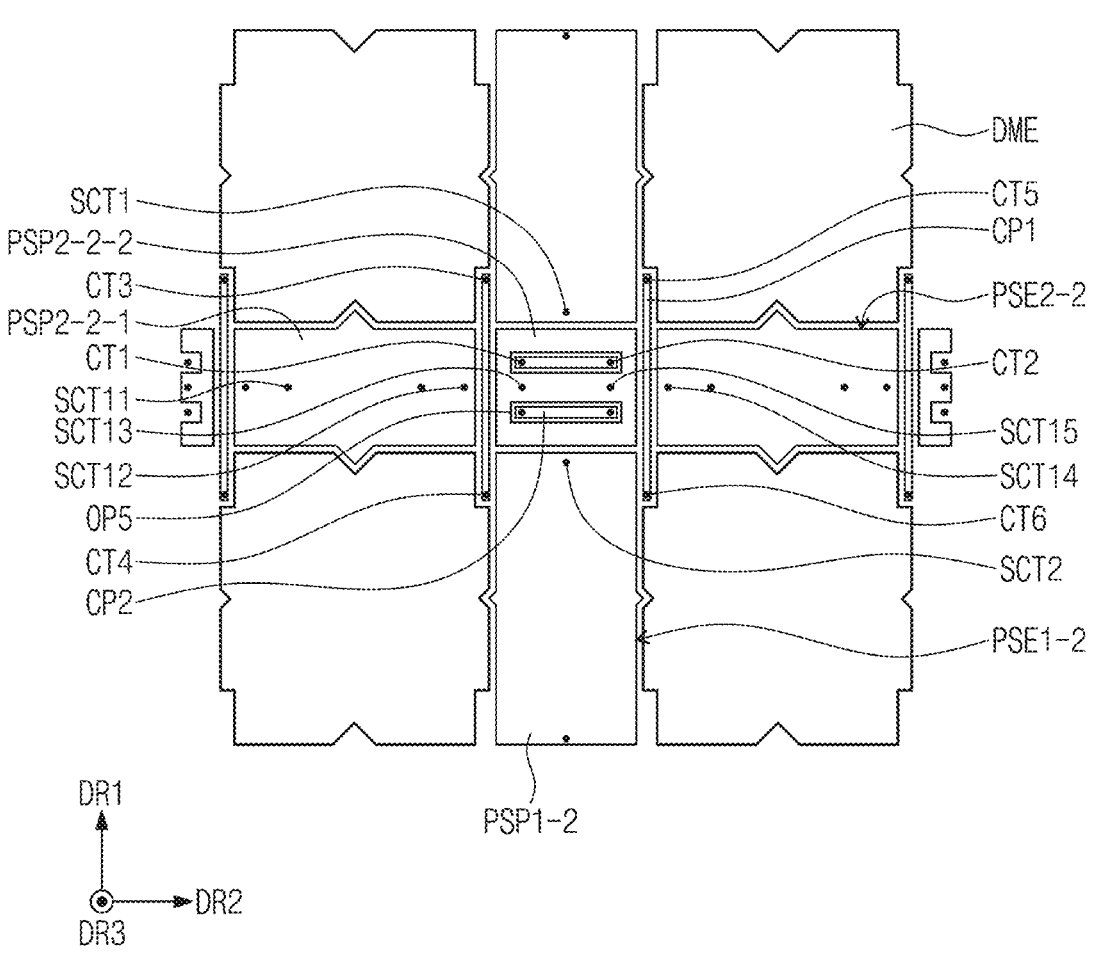
FIG. 11B is an enlarged plan view illustrating some components of the input sensing unit of FIG. 11A.
Figure 11C:
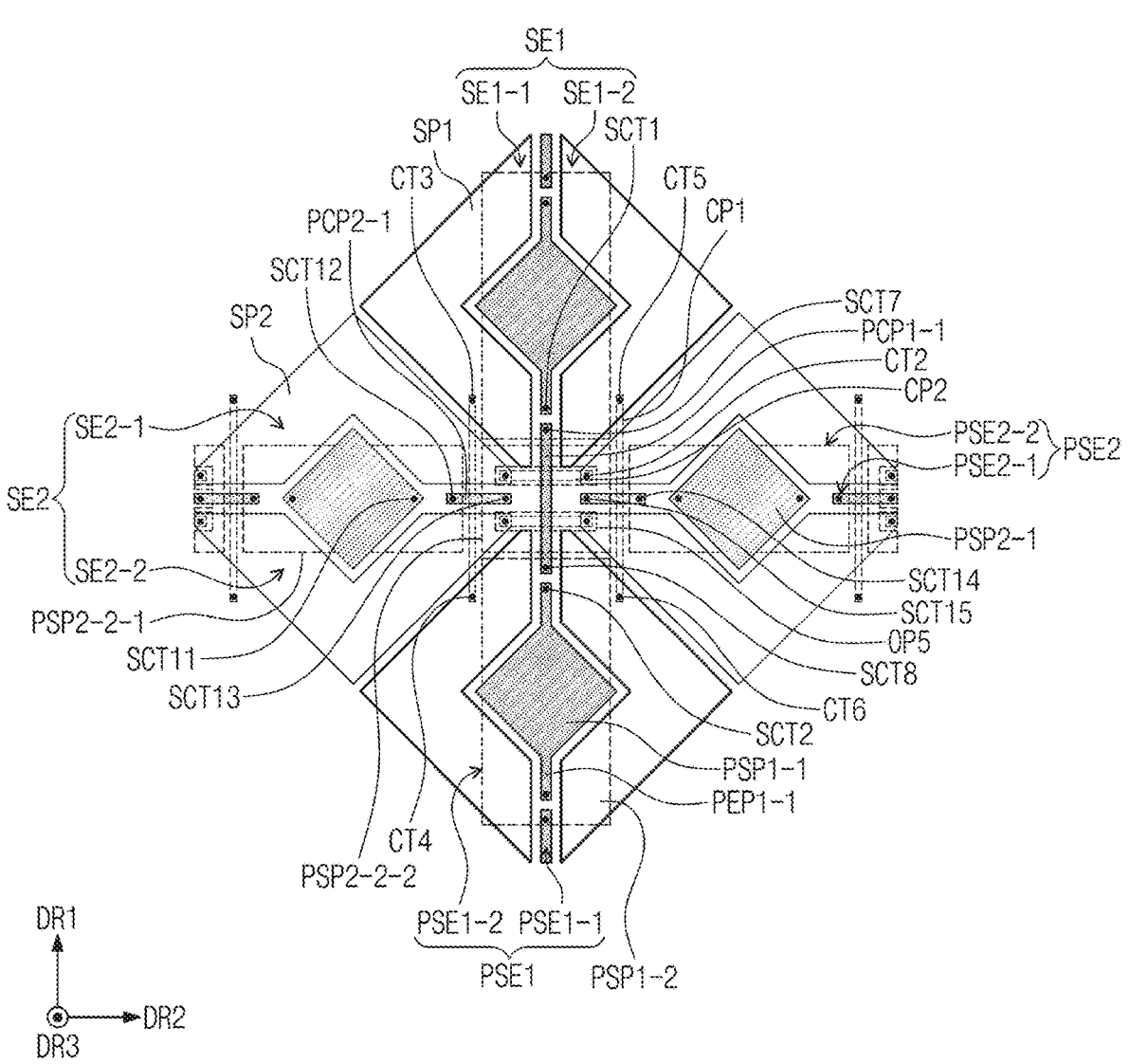
FIG. 11C is an enlarged plan view of the input sensing unit corresponding to region bb of FIG. 6.

FIGS. 11A and 11C are enlarged plan views corresponding to region bb of FIG. 6. FIG. 11B is an enlarged plan view illustrating some components of the input sensing unit ISP illustrated in FIG. 11A.

Referring to FIGS. 11A and 11B, the second sensing electrode SE2 may include the sensing electrode 2-1 SE2-1 and the sensing electrode 2-2 SE2-2 arranged in the first direction DR1. The description of the second sensing electrode SE2 of FIGS. 7A to 7D may be applied to the second sensing electrode SE2, and description thereabout will be omitted.

The first sensing electrode SE1 may include the sensing electrode 1-1 SE1-1 and the sensing electrode 1-2 SE1-2 arranged in the second direction DR2. Each of the sensing electrode 1-1 SE1-1 and the sensing electrode 1-2 SE1-2 may include the first sensing patterns SP1 and the first connecting patterns CP1.

The first sensing patterns SP1 of the sensing electrode 1-1 SE1-1 may be arranged in the first direction DR1. The first sensing patterns SP1 of the sensing electrode 1-1 SE1-1 may be spaced apart from each other in the first direction DR1. The first sensing patterns SP1 of the sensing electrode 1-2 SE1-2 may also be arranged so as to be spaced apart from each other in the first direction DR1.

The first sensing patterns SP1 of the sensing electrode 1-1 SE1-1 and the first sensing patterns SP1 of the sensing electrode 1-2 SE1-2 may be arranged in the second direction DR2. The first sensing patterns SP1 of the sensing electrode 1-1 SE1-1 and the first sensing patterns SP1 of the sensing electrode 1-2 SE1-2 may be disposed with the pen sensing electrode 1-1 PSE1-1 disposed therebetween in a plan view.

The first connecting patterns CP1 may be disposed on a layer different from the first sensing patterns SP1. For example, the first connecting patterns CP1 may be disposed under the first sensing patterns SP1. The first connecting patterns CP1 may be disposed on the same layer as the second connecting patterns CP2, the pen sensing electrode 1-2 PSE1-2, and the pen sensing electrode 2-2 PSE2-2.

The first connecting patterns CP1 may overlap the first sensing patterns SP1 adjacent to each other in the first direction DR1 in a plan view. Each of the first connecting patterns CP1 may extend in the first direction DR1 and may electrically connect the first sensing patterns SP1 that overlap the first connecting pattern CP1.

Based on the sensing electrode 1-1 SE1-1, the first sensing pattern SP1 overlapping one end of the first connecting pattern CP1 may be connected to the first connecting pattern CP1 through the third contact hole CT3, and the first sensing pattern SP1 overlapping an opposite end of the first connecting pattern CP1 may be connected to the first connecting pattern CP1 through the fourth contact hole CT4. The first connecting pattern CP1 may electrically connect the first sensing patterns SP1 of the sensing electrode 1-1 SE1-1 spaced apart from each other in the first direction DR1. The first sensing patterns SP1 and the first connecting patterns CP1 arranged in the first direction DR1 and electrically connected together may form the sensing electrode 1-1 SE1-1.

Based on the sensing electrode 1-2 SE1-2, the first sensing pattern SP1 overlapping the one end of the first connecting pattern CP1 may be connected to the first connecting pattern CP1 through the fifth contact hole CT5, and the first sensing pattern SP1 overlapping the opposite end of the first connecting pattern CP1 may be connected to the first connecting pattern CP1 through the sixth contact hole CT6. The first connecting pattern CP1 may electrically connect the first sensing patterns SP1 of the sensing electrode 1-2 SE1-2 spaced apart from each other in the first direction DR1. The first sensing patterns SP1 and the first connecting patterns CP1 arranged in the first direction DR1 and electrically connected together may form the sensing electrode 1-2 SE1-2.

The first connecting pattern CP1 may be defined as a bridge pattern that electrically connects the first sensing patterns SP1 disposed on a layer different from the first connecting pattern CP1 and spaced apart from each other.

The first pen sensing electrode PSE1 may include the pen sensing electrode 1-1 PSE1-1 and the pen sensing electrode 1-2 PSE1-2 overlapping each other in a plan view. The description of the first pen sensing electrode PSE1 of FIGS. 7A to 7D may be applied to the first pen sensing electrode PSE1, and description thereabout will be omitted.

The second pen sensing electrode PSE2 may include the pen sensing electrode 2-1 PSE2-1 and the pen sensing electrode 2-2 PSE2-2 overlapping each other in a plan view. The pen sensing electrode 2-1 PSE2-1 and the pen sensing electrode 2-2 PSE2-2 may be disposed on different layers and may be electrically connected with each other through contacts SCT11, SCT12, SCT13, SCT14, and SCT15 formed through an insulating layer.

The pen sensing electrode 2-1 PSE2-1 may be disposed on the same layer as the second sensing patterns SP2 of the second sensing electrode SE2 and the pen sensing electrode 1-1 PSE1-1. The pen sensing electrode 2-1 PSE2-1 may include the pen sensing patterns 2-1 PSP2-1 and the connecting patterns 2-1 PCP2-1.

The pen sensing electrode 2-2 PSE2-2 may be disposed on a layer different from the second sensing patterns SP2 of the second sensing electrode SE2. The pen sensing electrode 2-2 PSE2-2 may be disposed on the same layer as the first connecting patterns CP1 and the second connecting patterns CP2.

The pen sensing electrode 2-2 PSE2-2 may include pen sensing patterns 2-2-1 PSP2-2-1 and pen sensing patterns 2-2-2 PSP2-2-2 spaced apart from each other. The pen sensing patterns 2-2-1 PSP2-2-1 and the pen sensing patterns 2-2-2 PSP2-2-2 may be alternately disposed in the second direction DR2.

The pen sensing patterns 2-1 PSP2-1 may be arranged in the second direction DR2. Each of the pen sensing patterns 2-1 PSP2-1 may be disposed between the second sensing pattern SP2 of the sensing electrode 2-1 SE2-1 and the second sensing pattern SP2 of the sensing electrode 2-2 SE2-2 arranged in the first direction DR1 in a plan view. The pen sensing patterns 2-1 PSP2-1 may be spaced apart from the second sensing patterns SP2 and may be electrically insulated from the second sensing electrode SE2.

The pen sensing patterns 2-1 PSP2-1 may have a rhombic shape in a plan view. However, the shapes of the pen sensing patterns 2-1 PSP2-1 are not limited to the illustrated embodiment.

The pen sensing patterns 2-1 PSP2-1 may overlap the pen sensing patterns 2-2-1 PSP2-2-1 in a plan view, respectively. Each of the pen sensing patterns 2-1 PSP2-1 may be connected to a corresponding pen sensing pattern 2-2-1 PSP2-2-1 through the eleventh contact SCT11.

The connecting patterns 2-1 PCP2-1 may be disposed on the same layer as the pen sensing patterns 2-1 PSP2-1. The connecting patterns 2-1 PCP2-1 may be spaced apart from the pen sensing patterns 2-1 PSP2-1. Each of the pen sensing patterns 2-1 PSP2-1 may be disposed between the connecting patterns 2-1 PCP2-1.

Each of the connecting patterns 2-1 PCP2-1 may extend in the second direction DR2. The connecting patterns 2-1 PCP2-1 may be spaced apart from each other with the extending pattern 1-1 PEP1-1 disposed on the same layer therebetween. The connecting patterns 2-1 PCP2-1 may overlap the pen sensing pattern 2-2-1 PSP2-2-1 and the pen sensing pattern 2-2-2 PSP2-2-2 spaced apart from each other in the second direction DR2.

Each of the pen sensing patterns 2-2-1 PSP2-2-1 may extend in the second direction DR2. The pen sensing patterns 2-2-1 PSP2-2-1 may overlap the pen sensing patterns 2-1 PSP2-1 and the connecting patterns 2-1 PCP2-1 in a plan view, respectively. The pen sensing pattern 2-2-1 PSP2-2-1 may overlap ends of the connecting patterns 2-1 PCP2-1 spaced apart from each other with the pen sensing pattern 2-1 PSP2-1 disposed therebetween.

Each of the pen sensing patterns 2-2-2 PSP2-2-2 may overlap the connecting patterns 2-1 PCP2-1 adjacent to each other in the second direction DR2 in a plan view. The pen sensing patterns 2-2-2 PSP2-2-2 may overlap the pen sensing electrode 1-1 PSE1-1 in a plan view. For example, the pen sensing patterns 2-2-2 PSP2-2-2 may overlap the extending pattern 1-1 PEP1-1. The pen sensing patterns 2-2-2 PSP2-2-2 may be disposed between the pen sensing patterns 1-2 PSP1-2 spaced apart from each other in the first direction DR1 in a plan view.

A fifth opening OP5 may be defined in the pen sensing patterns 2-2-2 PSP2-2-2. A plurality of fifth openings OP5 may be defined in the pen sensing pattern 2-2-2 PSP2-2-2. The fifth opening OP5 may overlap the second connecting pattern CP2 in a plan view. That is, the second connecting pattern CP2 may be disposed in the fifth opening OP5. Since the second connecting pattern CP2 is disposed in the fifth opening OP5 of the pen sensing patterns 2-2-2 PSP2-2-2, the second connecting pattern CP2 may be spaced apart from the pen sensing electrode 2-2 PSE2-2 and may be electrically insulated from the pen sensing electrode 2-2 PSE2-2.

The pen sensing pattern 2-2-1 PSP2-2-1 and the pen sensing pattern 2-2-2 PSP2-2-2 disposed on the left side of the pen sensing pattern 2-2-2 PSP2-2-2 in the second direction DR2 may be connected to the same connecting pattern 2-1 PCP2-1 through the twelfth contact SCT12 and the thirteenth contact SCT13. The pen sensing pattern 2-2-1 PSP2-2-1 and the pen sensing pattern 2-2-2 PSP2-2-2 disposed on the right side of the pen sensing pattern 2-2-2 PSP2-2-2 in the second direction DR2 may be connected to the same connecting pattern 2-1 PCP2-1 through the fourteenth contact SCT14 and the fifteenth contact SCT15.

The pen sensing pattern 2-1 PSP2-1 and the connecting pattern 2-1 PCP2-1 spaced apart from each other may be electrically connected through the same pen sensing pattern 2-2-1 PSP2-2-1. The pen sensing pattern 2-2-1 PSP2-2-1 and the pen sensing pattern 2-2-2 PSP2-2-2 spaced apart from each other may be electrically connected through the same connecting pattern 2-1 PCP2-1. The connecting patterns 2-1 PCP2-1 spaced apart from each other may be electrically connected through the same pen sensing pattern 2-2-2 PSE2-2-2. The pen sensing patterns 2-1 PSP2-1, the pen sensing patterns 2-2-1 PSP2-2-1, the pen sensing patterns 2-2-2 PSP2-2-2, and the connecting patterns 2-1 PCP2-1 electrically connected together may form the second pen sensing electrode PSE2 having a double layer structure.

FIG. 11B schematically illustrates the components disposed below the sensing electrodes SE1 and SE2 and the pen sensing electrodes PSE1 and PSE2 illustrated in FIG. 11A.

Referring to FIG. 11B, the pen sensing patterns 1-2 PSP1-2 of the pen sensing electrode 1-2 PSE1-2, the pen sensing patterns 2-2-1 PSP2-2-1 and the pen sensing patterns 2-2-2 PSP2-2-2 of the pen sensing electrode 2-2 PSE2-2, the first connecting patterns CP1, and the second connecting patterns CP2 may be disposed on the same layer. The input sensing unit ISP may further include the dummy patterns DME disposed on the same layer as the pen sensing patterns 1-2 PSP1-2, the pen sensing patterns 2-2-1 PSP2-2-1, the pen sensing patterns 2-2-2 PSP2-2-2, the first connecting patterns CP1, and the second connecting patterns CP2.

The dummy patterns DME may be disposed around the pen sensing patterns 1-2 PSP1-2, the pen sensing patterns 2-2-1 PSE2-2-1, and the first connecting patterns CP1 and may be separated therefrom. The dummy patterns DME may be a floating electrode. The dummy patterns DME may prevent the shapes of the pen sensing electrode 1-2 PSE1-2 and the pen sensing electrode 2-2 PSE2-2 from being visible from the outside.

FIG. 11C illustrates an embodiment that includes substantially the same components as the embodiment of FIGS. 11A and 11B, but differs from the embodiment of FIGS. 11A and 11B in terms of some components of the pen sensing electrode 1-1 PSE1-1. The above description may be applied to the same components.

Referring to FIG. 11C, the pen sensing electrode 1-1 PSE1-1 may include the pen sensing patterns 1-1 PSP1-1, the extending patterns 1-1 PEP1-1, and the connecting patterns 1-1 PCP1-1. The description of the pen sensing electrode 1-1 PSE1-1 of FIG. 7E may be applied to the pen sensing electrode 1-1 PSE1-1 of FIG. 11C, and repetitive description thereabout will be omitted.

The connecting pattern 1-1 PCP1-1 may extend in the first direction DR1 and may overlap the pen sensing pattern 2-2-2 PSP2-2-2 and the second connecting patterns CP2 In a plan view. The connecting pattern 1-1 PCP1-1, which extends in the first direction DR1, may cross the second connecting patterns CP2, which extend in the second direction DR2, in a plan view. The connecting pattern 1-1 PCP1-1 may be spaced apart from the pen sensing pattern 2-2-2 PSP2-2-2 and the second connecting patterns CP2 with an insulating layer disposed therebetween in the thickness direction (or the third direction DR3) and may be electrically insulated therefrom.

Figure 12A:
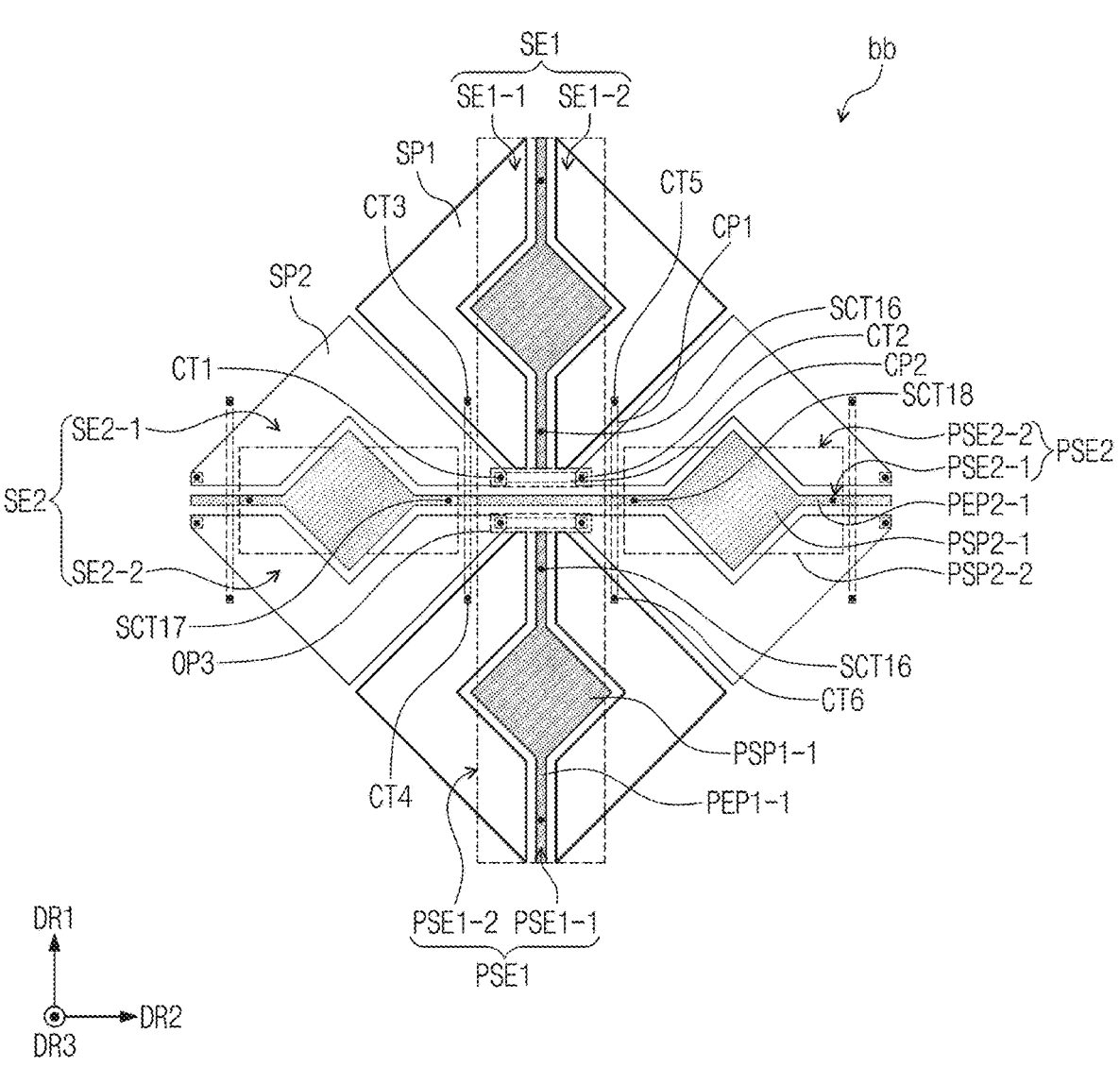
FIG. 12A is an enlarged plan view of the input sensing unit corresponding to region bb of FIG. 6.
Figure 12B:
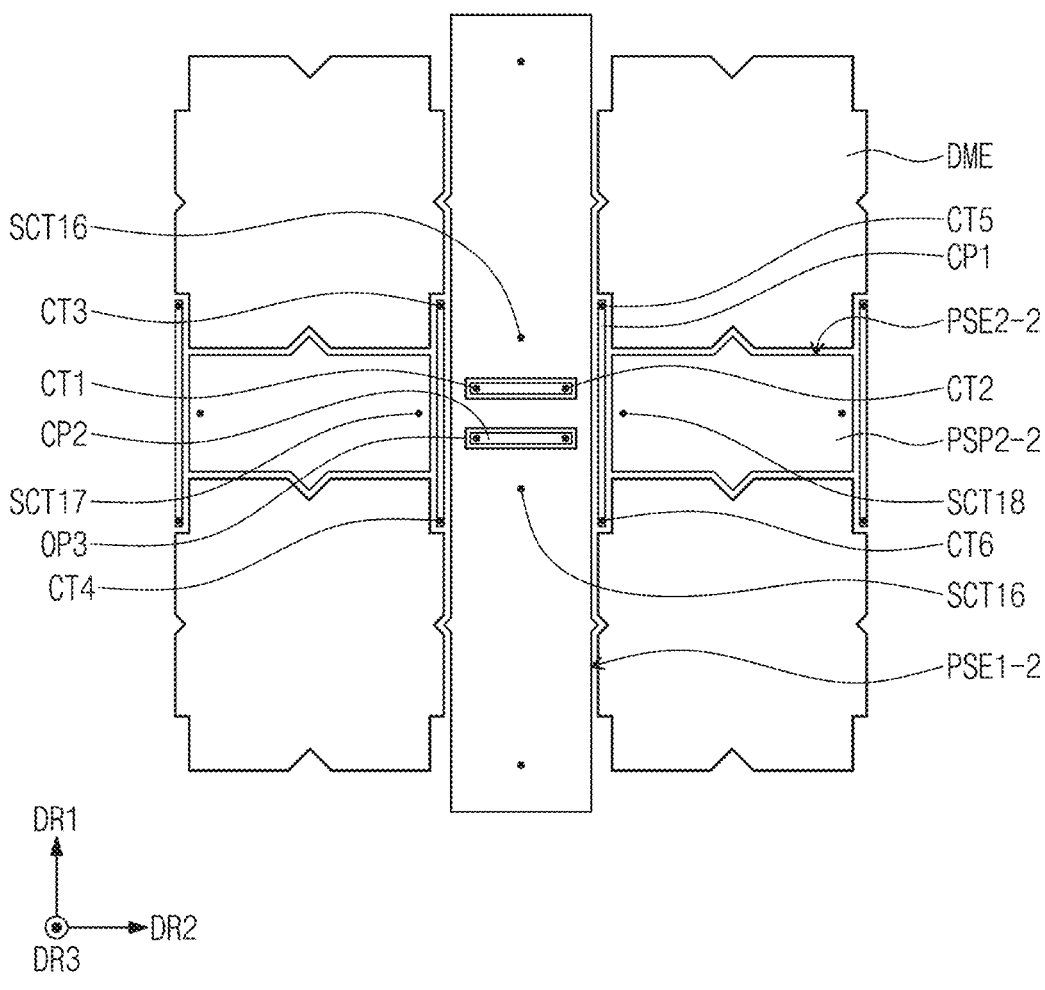
FIG. 12B is an enlarged plan view illustrating some components of the input sensing unit of FIG. 12A.

FIG. 12A is an enlarged plan view corresponding to region bb of FIG. 6. FIG. 12B is an enlarged plan view illustrating some components of the input sensing unit ISP illustrated in FIG. 12A.

Referring to FIGS. 12A and 12B, the first sensing electrode SE1 may include the sensing electrode 1-1 SE1-1 and the sensing electrode 1-2 SE1-2 arranged in the second direction DR2. Each of the sensing electrode 1-1 SE1-1 and the sensing electrode 1-2 SE1-2 may include the first sensing patterns SP1 and the first connecting patterns CP1. The description of the first sensing electrode SE1 of FIGS. 11A and 11B may be applied to the first sensing electrode SE1, and description thereabout will be omitted.

The second sensing electrode SE2 may include the sensing electrode 2-1 SE2-1 and the sensing electrode 2-2 SE2-2 arranged in the first direction DR1. The description of the second sensing electrode SE2 of FIGS. 7A to 7D may be applied to the second sensing electrode SE2, and description thereabout will be omitted.

The first pen sensing electrode PSE1 may include the pen sensing electrode 1-1 PSE1-1 and the pen sensing electrode 1-2 PSE1-2 overlapping each other in a plan view. The pen sensing electrode 1-1 PSE1-1 and the pen sensing electrode 1-2 PSE1-2 may be disposed on different layers. The pen sensing electrode 1-1 PSE1-1 and the pen sensing electrode 1-2 PSE1-2 disposed on the different layers may be electrically connected with each other through contacts SCT16 formed through an insulating layer.

The pen sensing electrode 1-1 PSE1-1 may be disposed on the same layer as the first sensing patterns SP1 of the first sensing electrode SE1. The pen sensing electrode 1-1 PSE1-1 may include the pen sensing patterns 1-1 PSP1-1 and the extending patterns 1-1 PEP1-1.

The pen sensing patterns 1-1 PSP1-1 may be arranged in the first direction DR1. Each of the pen sensing patterns 1-1 PSP1-1 may be disposed between the first sensing pattern SP1 of the sensing electrode 1-1 SE1-1 and the first sensing pattern SP1 of the sensing electrode 1-2 SE1-2 arranged in the second direction DR2 in a plan view. The pen sensing patterns 1-1 PSP1-1 may be spaced apart from the first sensing patterns SP1 and may be electrically insulated from the first sensing electrode SE1.

The pen sensing patterns 1-1 PSP1-1 may have a rhombic shape in a plan view. However, the shapes of the pen sensing patterns 1-1 PSP1-1 are not limited to the illustrated embodiment.

Each of the extending patterns 1-1 PEP1-1 may extend from a corresponding pen sensing pattern 1-1 PSP1-1 in the first direction DR1. The extending patterns 1-1 PEP1-1 may be formed of the same material and formed at the same time with the corresponding pen sensing pattern 1-1 PSP1-1. Extending patterns 1-1 PEP1-1 connected to one pen sensing pattern 1-1 PSP1-1 may extend from the pen sensing pattern 1-1 PSP1-1 parallel to the first direction DR1 in opposite directions. However, the shape in which the extending patterns 1-1 PEP1-1 extend is not limited thereto.

The extending patterns 1-1 PEP1-1 extending from the pen sensing patterns 1-1 PSP1-1 adjacent to each other in the first direction DR1 may be spaced apart from each other with the pen sensing electrode 2-1 PSE2-1 disposed therebetween.

The pen sensing electrode 1-2 PSE1-2 may be disposed on a layer different from the first sensing patterns SP1, the second sensing patterns SP2, and the pen sensing electrode 2-1 PSE2-1. For example, the pen sensing electrode 1-2 PSE1-2 may be disposed below the first sensing patterns SP1, the second sensing patterns SP2, and the pen sensing electrode 2-1 PSE2-1.

The pen sensing electrode 1-2 PSE1-2 may extend in the first direction DR1. The pen sensing electrode 1-2 PSE1-2 may have an integrated shape. The pen sensing electrode 1-2 PSE1-2 may partially overlap the first sensing patterns SP1 arranged in the first direction DR1 in a plan view.

The pen sensing electrode 1-2 PSE1-2 may be disposed on the same layer as the pen sensing patterns 2-2 PSP2-2, the first connecting patterns CP1, and the second connecting patterns CP2. The pen sensing electrode 1-2 PSE1-2 may extend in the first direction DR1 and may be disposed to cross the pen sensing patterns 2-2 PSP2-2 spaced apart from each other in the second direction DR2. The pen sensing electrode 1-2 PSE1-2 may be spaced apart from the pen sensing patterns 2-2 PSP2-2 with the first connecting pattern CP1 disposed therebetween in the second direction DR2.

The third opening OP3 may be defined in the pen sensing electrode 1-2 PSE1-2. A plurality of third openings OP3 may be defined in the pen sensing electrode 1-2 PSE1-2. The third opening OP3 may overlap the second connecting pattern CP2 in a plan view. That is, the second connecting pattern CP2 may be disposed in the third opening OP3. Since the second connecting pattern CP2 is disposed in the third opening OP3 of the pen sensing electrode 1-2 PSE1-2, the second connecting pattern CP2 may be spaced apart from the pen sensing electrode 2-2 PSE2-2 and may be electrically insulated from the pen sensing electrode 1-2 PSE1-2.

The pen sensing electrode 1-2 PSE1-2 may overlap the pen sensing patterns 1-1 PSP1-1 and the extending patterns 1-1 PEP1-1 in a plan view. The extending patterns 1-1 PEP1-1 extending from the pen sensing patterns 1-1 PSP1-1 spaced apart from each other in the first direction DR1 may be connected to the same pen sensing electrode 1-2 PSE1-2 through the sixteenth contacts SCT16.

The second pen sensing electrode PSE2 may include the pen sensing electrode 2-1 PSE2-1 and the pen sensing electrode 2-2 PSE2-2 overlapping each other in a plan view. The pen sensing electrode 2-1 PSE2-1 and the pen sensing electrode 2-2 PSE2-2 may be disposed on different layers. The pen sensing electrode 2-1 PSE2-1 and the pen sensing electrode 2-2 PSE2-2 disposed on the different layers may be electrically connected to each other through contacts SCT17 and SCT18 penetrating an insulating layer.

The pen sensing electrode 2-1 PSE1-1 may be disposed on the same layer as the second sensing patterns SP2 of the second sensing electrode SE2. The pen sensing electrode 2-1 PSE2-1 may include the pen sensing patterns 2-1 PSP2-1 and the extending patterns 2-1 PEP2-1.

The pen sensing patterns 2-1 PSP2-1 may be arranged in the second direction DR2. Each of the pen sensing patterns 2-1 PSP2-1 may be disposed between the second sensing pattern SP2 of the sensing electrode 2-1 SE2-1 and the second sensing pattern SP2 of the sensing electrode 2-2 SE2-2 arranged in the first direction DR1 in a plan view. The pen sensing patterns 2-1 PSP2-1 may be spaced apart from the second sensing patterns SP2 and may be electrically insulated from the second sensing electrode SE2.

The pen sensing patterns 2-1 PSP2-1 may have a rhombic shape in a plan view. However, the shapes of the pen sensing patterns 2-1 PSP2-1 are not limited to the illustrated embodiment.

Each of the extending patterns 2-1 PEP1-1 may connect the pen sensing patterns 2-1 PSP1-1 disposed adjacent to each other in the second direction DR2. The extending patterns 2-1 PEP2-1 may extend from the pen sensing patterns 2-1 PSP2-1 in the second direction DR2. The extending patterns 2-1 PEP2-1 may be formed of the same material and formed at the same time with the pen sensing patterns 2-1 PSP2-1. That is, the pen sensing electrode 2-1 PSE2-1 may be formed in one piece.

The extending patterns 2-1 PEP2-1 may be spaced apart from the pen sensing electrode 1-1 PSE1-1. For example, the extending patterns 2-1 PEP2-1 may be spaced apart from the extending patterns 1-1 PEP1-1. The extending patterns 2-1 PEP2-1 may extend in the second direction DR2 and may be disposed to cross between the extending patterns 1-1 PEP1-1 spaced apart from each other in the first direction DR1.

The pen sensing electrode 2-2 PSE2-2 may be disposed on a layer different from the second sensing patterns SP2 of the second sensing electrode SE2. The pen sensing electrode 2-2 PSE2-2 may include the pen sensing patterns 2-2 PSP2-2.

The pen sensing patterns 2-2 PSP2-2 may extend in the second direction DR2 and may be arranged in the second direction DR2. The pen sensing patterns 2-2 PSP2-2 may be spaced apart from each other. The pen sensing patterns 2-2 PSP2-2 may be disposed on the same layer as the pen sensing electrode 1-2 PSE1-2, the first connecting patterns CP1, and the second connecting patterns CP2. The pen sensing patterns 2-2 PSP2-2 may be spaced apart from each other with the pen sensing electrode 1-2 PSE1-2 and the first connecting patterns CP1 disposed therebetween.

Each of the pen sensing patterns 2-2 PSP2-2 may overlap the pen sensing electrode 2-1 PSE2-1 in a plan view. For example, the pen sensing patterns 2-2 PSP2-2 may partially overlap the pen sensing patterns 2-1 PSP2-1 and the extending patterns 2-1 PEP2-1 of the pen sensing electrode 2-1 PSE2-1. In an embodiment, the pen sensing patterns 2-2 PSP2-2 may partially overlap the second sensing patterns SP2 in a plan view.

Each of the pen sensing patterns 2-2 PSP2-2 may be connected to the pen sensing electrode 2-1 PSE2-1 through the seventeenth contact SCT17 and the eighteenth contact SCT18. For example, each of the pen sensing patterns 2-2 PSP2-2 may be connected to the extending pattern 2-1 PEP2-1 of the pen sensing electrode 2-1 PSE2-1 through the seventeenth contact SCT17 and the eighteenth contact SCT18. The pen sensing patterns 2-2 PSP2-2 spaced apart from each other may be electrically connected through the pen sensing electrode 2-1 PSE2-1.

FIG. 12B schematically illustrates the components disposed below the sensing electrodes SE1 and SE2 and the pen sensing electrodes PSE1 and PSE2 illustrated in FIG. 12A.

Referring to FIG. 12B, the pen sensing electrode 1-2 PSE1-2, the pen sensing patterns 2-2 PSP2-2 of the pen sensing electrode 2-2 PSE2-2, the first connecting patterns CP1, and the second connecting patterns CP2 may be disposed on the same layer. The input sensing unit ISP may further include the dummy patterns DME disposed on the same layer as the pen sensing electrode 1-2 PSE1-2, the pen sensing patterns 2-2 PSP2-2, the first connecting patterns CP1, and the second connecting patterns CP2.

The dummy patterns DME may be disposed around the pen sensing electrode 1-2 PSE1-2, the pen sensing patterns 2-2 PSP2-2, and the first connecting patterns CP1 and may be separated therefrom. The dummy patterns DME may be a floating electrode. The dummy patterns DME may prevent the shapes of the pen sensing electrode 1-2 PSE1-2 and the pen sensing electrode 2-2 PSE2-2 from being visible from the outside.

Figure 13:
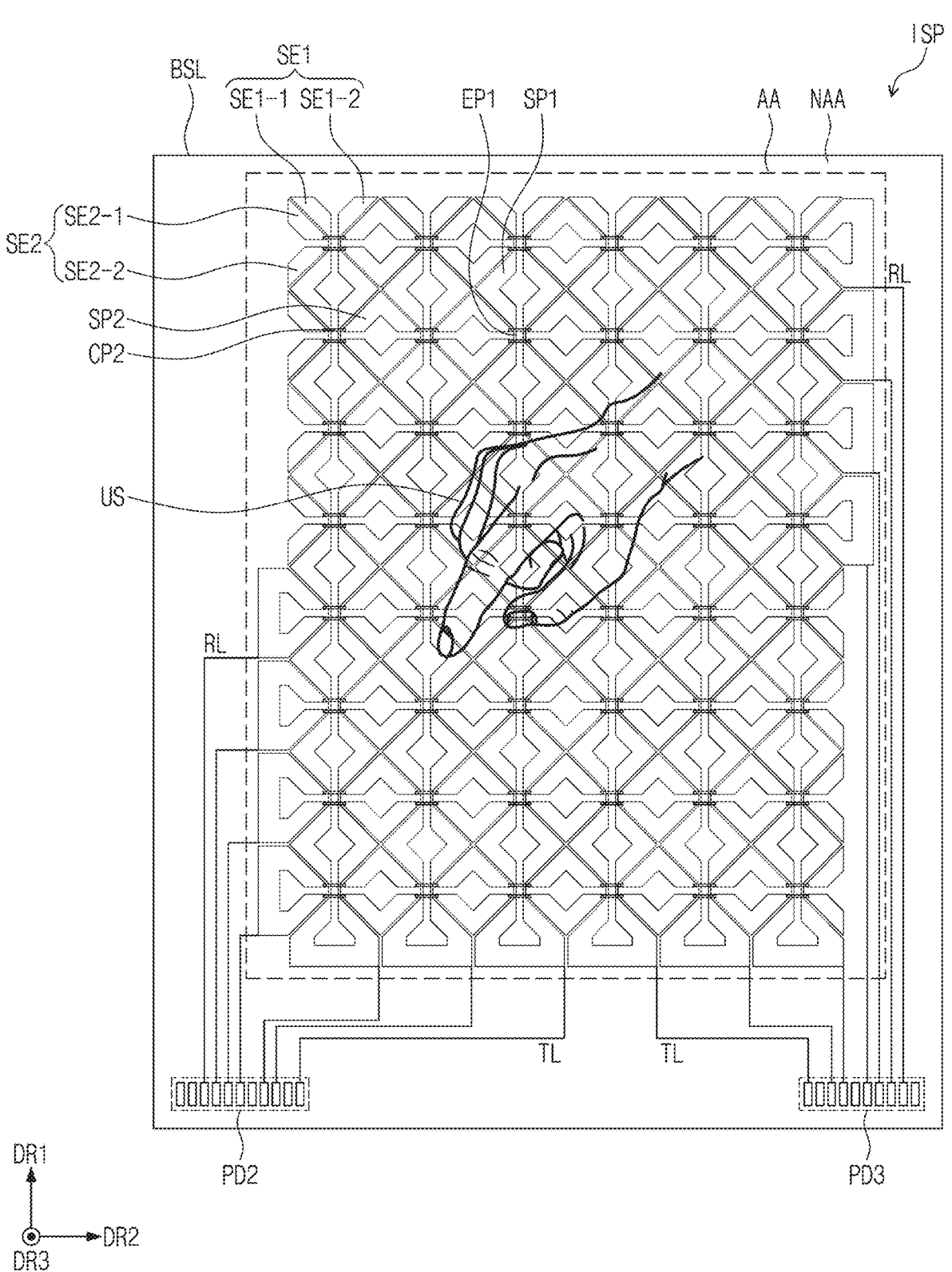
FIG. 13 is a plan view for explaining driving of the first and second sensing electrodes of FIG. 6.

FIG. 13 is a plan view for explaining driving of the first and second sensing electrodes SE1 and SE2 illustrated in FIG. 6.

During the first operation period, the pen sensing electrodes PSE1 and PSE2 of FIG. 6 do not participate in an operation of the input sensing unit ISP. That is, during the first operation period, a drive signal is not provided to the pen sensing electrodes PSE1 and PSE2, and a signal is not sensed through the pen sensing electrodes PSE1 and PSE2. For simplicity of illustration, the pen sensing electrodes PSE1 and PSE2 of FIG. 6 are omitted in FIG. 13.

Referring to FIG. 13, during the first operation period, the drive circuit of the input sensing unit ISP provides drive signals to the first sensing electrodes SE1 or the second sensing electrodes SE2. That is, the drive circuit of the input sensing unit ISP may scan the first sensing electrodes SE1 or the second sensing electrodes SE2. For example, the drive circuit may sequentially provide the drive signals to the first sensing electrodes SE1 through the first sensing lines TL. Activation periods of the drive signals applied to the first sensing electrodes SE1 may differ from one another. The drive signals may include a plurality of pulse waves or a plurality of sine waves within the activation periods.

Current paths travelling from the electrodes receiving the drive signals among the first sensing electrodes SE1 to the second electrodes SE2 may be formed. The current paths may pass through a mutual capacitor formed between the first sensing electrodes SE1 and the second sensing electrodes SE2, and the amount of change in the capacitance of the mutual capacitor may be detected through the second sensing electrodes SE2. The sensing circuit of the input sensing unit ISP may measure currents through the second sensing electrodes SE2 and may calculate the amount of change in the capacitance through the measured currents. For example, current measured through an electrode where an input by a part of the user's body occurs among the second sensing electrodes SE2 may be different from currents measured through other electrodes.

Figure 14A:
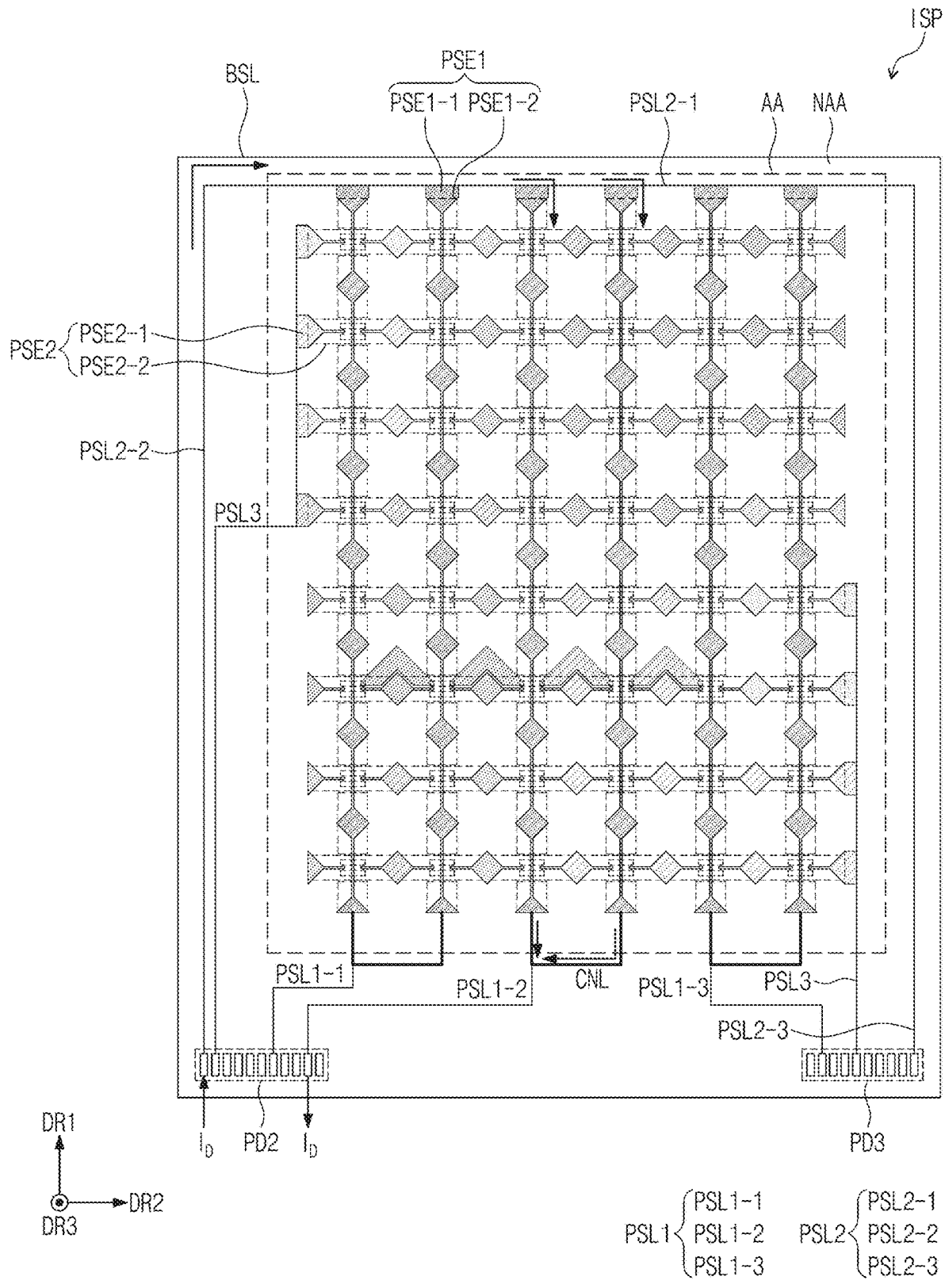
FIGS. 14A, 14B and 14C are plan views for explaining driving of pen sensing electrodes of FIG. 6.
Figure 14B:
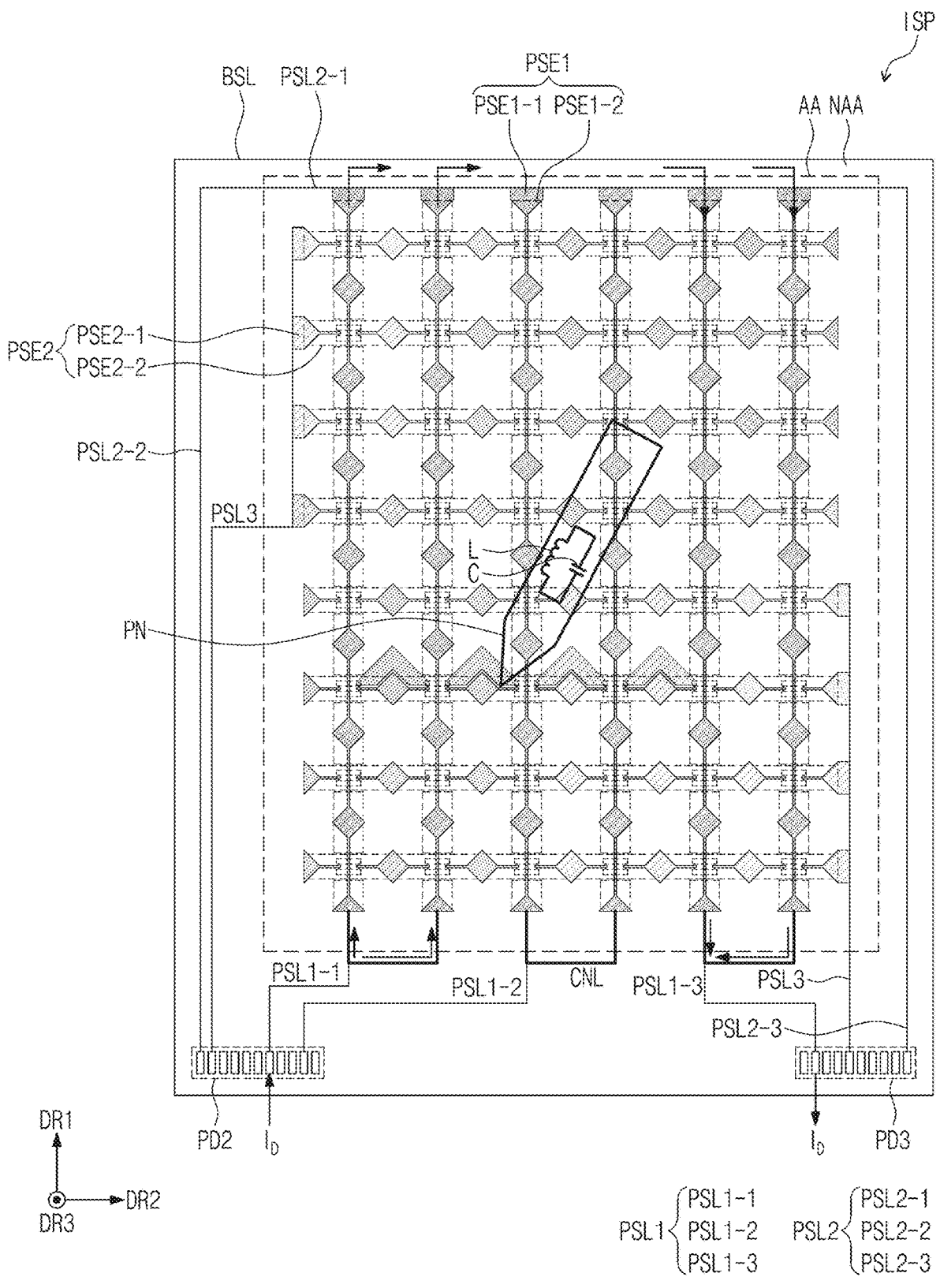
Figure 14C:
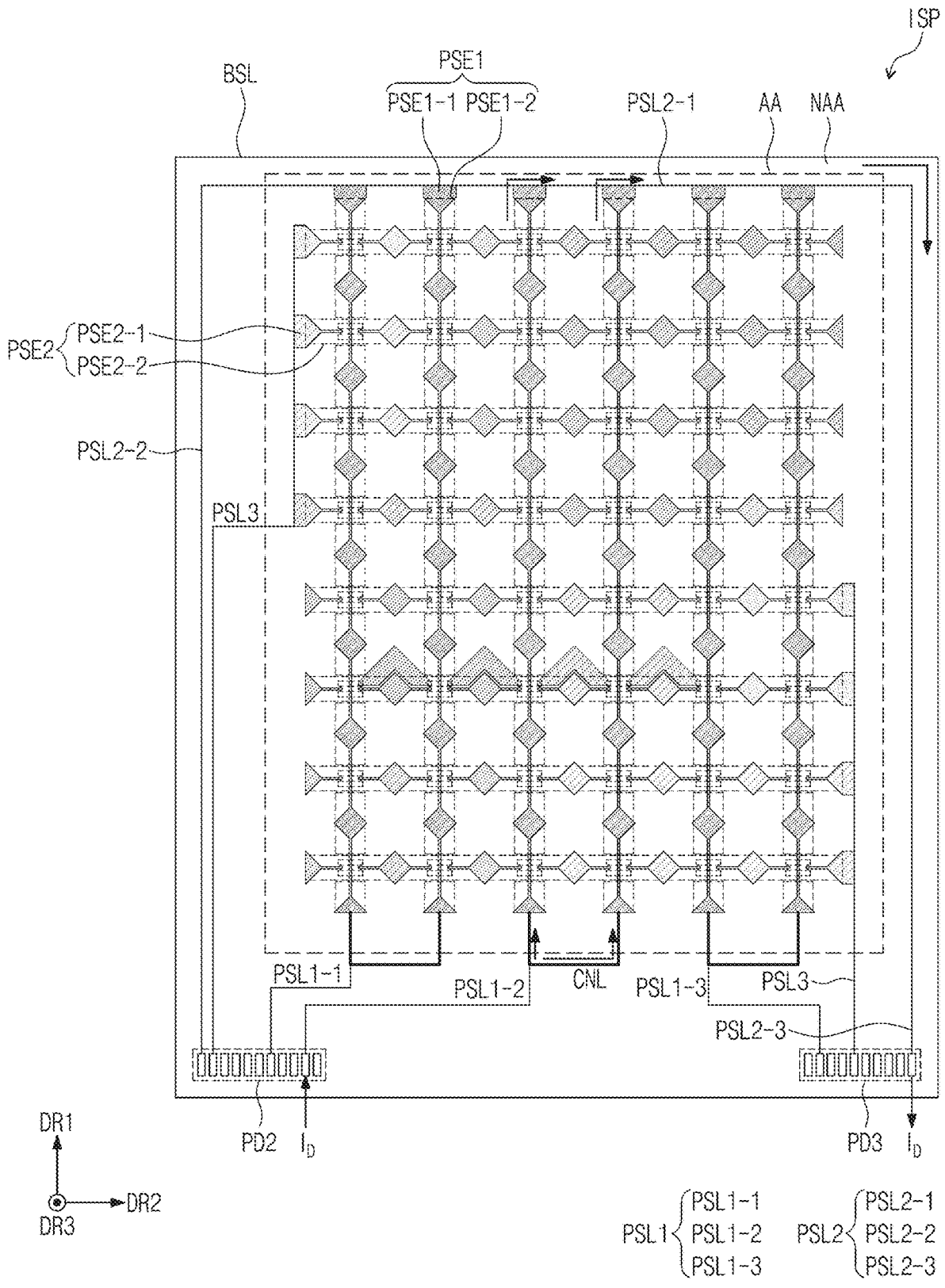

FIGS. 14A to 14C are plan views for explaining driving of the pen sensing electrodes PSE1 and PSE2 illustrated in FIG. 6.

An operation period may include a charging period and a pen sensing period following the charging period. During the charging period of the second operation period, the first and second sensing electrodes SE1 and SE2 of FIG. 6 may not be involved in an operation of the input sensing unit ISP. That is, during the second operation period, a drive signal may not be provided to the first and second sensing electrodes SE1 and SE2. For simplicity of illustration, the first and second sensing electrodes SE1 and SE2 of FIG. 6 are omitted in FIGS. 14A to 14C.

In FIGS. 14A to 14C, the first pen sensing lines PSL1 may include pen sensing lines 1-1 PSL1-1, 1-2 PSL1-2, and 1-3 PSL1-3 in the order from left to right.

During the charging period, the first pen sensing lines PSL1 may receive a drive signal or a ground voltage from at least one of the second pads PD2 and the third pads PD3. Some of the pen sensing lines 1-1 PSL1-1, 1-2 PSL1-2, and 1-3 PSL1-3 may be selected, and the others may not be selected. The selected pen sensing lines may receive the drive signal or the ground voltage. The first pen sensing electrodes PSE1 connected with the selected pen sensing lines may receive the drive signal or the ground voltage. The unselected pen sensing lines may be floated. Some of the first pen sensing lines PSL1, the first pen sensing electrodes PSE1, and the second pen sensing lines PLS2 may be selected such that that a current path is formed in a coil or, a coil is defined)

Referring to FIG. 14A, during a first period of the charging period, the drive circuit of the input sensing unit ISP may select the second pad PD2 to which the pen sensing line 2-2 PSL2-2 is connected and the second pad PD2 to which the pen sensing line 1-2 PSL1-2 is connected. During the charging period, the pen sensing lines 1-1 PSL1-1, 1-2 PSL1-2, and 1-3 PSL1-3, the pen sensing electrodes 1-1 PSE1-1, and the second pen sensing lines PSL2 may be sequentially driven to form a coil.

The drive circuit of the input sensing unit ISP may apply a drive current Ip to the pen sensing line 2-2 PSL2-2 and may apply a ground voltage to the second pad PD2 connected to the pen sensing line 1-2 PSL1-2. At this time, the pen sensing line 1-1 PSL1-1 and the pen sensing line 1-3 PSL1-3 may be floated. The drive current $I_D$ may flow through the pen sensing line 2-2 PSL2-2, the pen sensing electrodes 1-1 PSE1-1 connected to the pen sensing line 1-2 PSL1-2, and the pen sensing line 1-2 PSL1-2. Accordingly, the second pen sensing lines PSL2, the first pen sensing electrode PSE1 connected to the pen sensing line 1-2 PSL1-2 among the first pen sensing electrodes PSE1, and the pen sensing line 1-2 PSL1-2 may define a coil-shaped current path, and the coil-shaped current path may generate a magnetic field.

Referring to FIG. 14B, during a second period of the charging period, the drive circuit of the input sensing unit ISP may select the second pad PD2 connected to the pen sensing line 1-1 PSL1-1 and the third pad PD3 connected to the pen sensing line 1-3 PSL1-3. The drive circuit of the input sensing unit ISP may apply the drive current $I_D$ to the second pad PD2 connected to the pen sensing line 1-1 PSL1-1 and may apply the ground voltage to the third pad PD3 connected to the pen sensing line 1-3 PSL1-3. The drive current $I_D$ may flow through the pen sensing line 1-1 PSL1-1, the first pen sensing electrodes PSE1 connected to the pen sensing line 1-1 PSL1-1, the first pen sensing electrodes PSE1 connected to the pen sensing line 1-3

PSL1-3, and the pen sensing line 1-3 PSL1-3. The pen sensing line 1-1 PSL1-1, the first pen sensing electrodes PSE1 connected to the pen sensing line 1-1 PSL1-1, the first pen sensing electrodes PSE1 connected to the pen sensing line 1-3 PSL1-3, and the pen sensing line 1-3 PSL1-3 may define a coil-shaped current path.

The resonance circuit of the pen PN may be charged during the second period of the charging period. The resonance circuit of the pen PN may include an inductor L and a capacitor C connected to the inductor L, and an LC resonance circuit may be formed by the inductor L and the capacitor C. The capacitor C may be a variable capacitor whose capacitance is varied. The resonance circuit of the pen PN disposed on the first pen sensing electrodes PSE1 disposed in the middle may receive a magnetic field formed in the current path of FIG. 14B. The resonance circuit of the pen PN may resonate using a signal received through a change in the magnetic field in the current path.

Referring to FIG. 14C, during a third period of the charging period, the drive circuit of the input sensing unit ISP may select the second pad PD2 to which the pen sensing line 1-2 PSL1-2 is connected and the third pad PD3 to which the pen sensing line 2-3 PSL2-3 among the second pen sensing lines PSL2 is connected. The drive circuit of the input sensing unit ISP may apply the drive current Ip to the second pad PD2 to which the pen sensing line 1-2 PSL1-2 is connected and may apply the ground voltage to the third pad PD3 to which the pen sensing line 2-3 PSL2-3 among the second pen sensing lines PSL2 is connected. The drive current Ip may flow through the pen sensing line 1-2 PSL1-2, the first pen sensing electrodes PSE1 connected to the pen sensing line 1-2 PSL1-2, and the second pen sensing lines PSL2 The pen sensing line 1-2 PSL1-2, the first pen sensing electrodes PSE1 connected to the pen sensing line 1-2 PSL1-2, and the second pen sensing lines PSL2 may define a coil-shaped current path.

During the charging period described with reference to FIGS. 14A to 14C, a constant voltage may be applied to the second pen sensing electrodes PSE2 through the third pen sensing lines PSL3. The driving sequence of the charging period described with reference to FIGS. 14A to 14C is only an embodiment, and the present disclosure is not necessarily limited thereto. For example, the operating sequence of the first to third periods may be changed. In addition, two first pen sensing electrodes PSE1 closest to each other among the first pen sensing electrodes PSE1 may define a portion of a coil-shaped current path.

Figure 15:
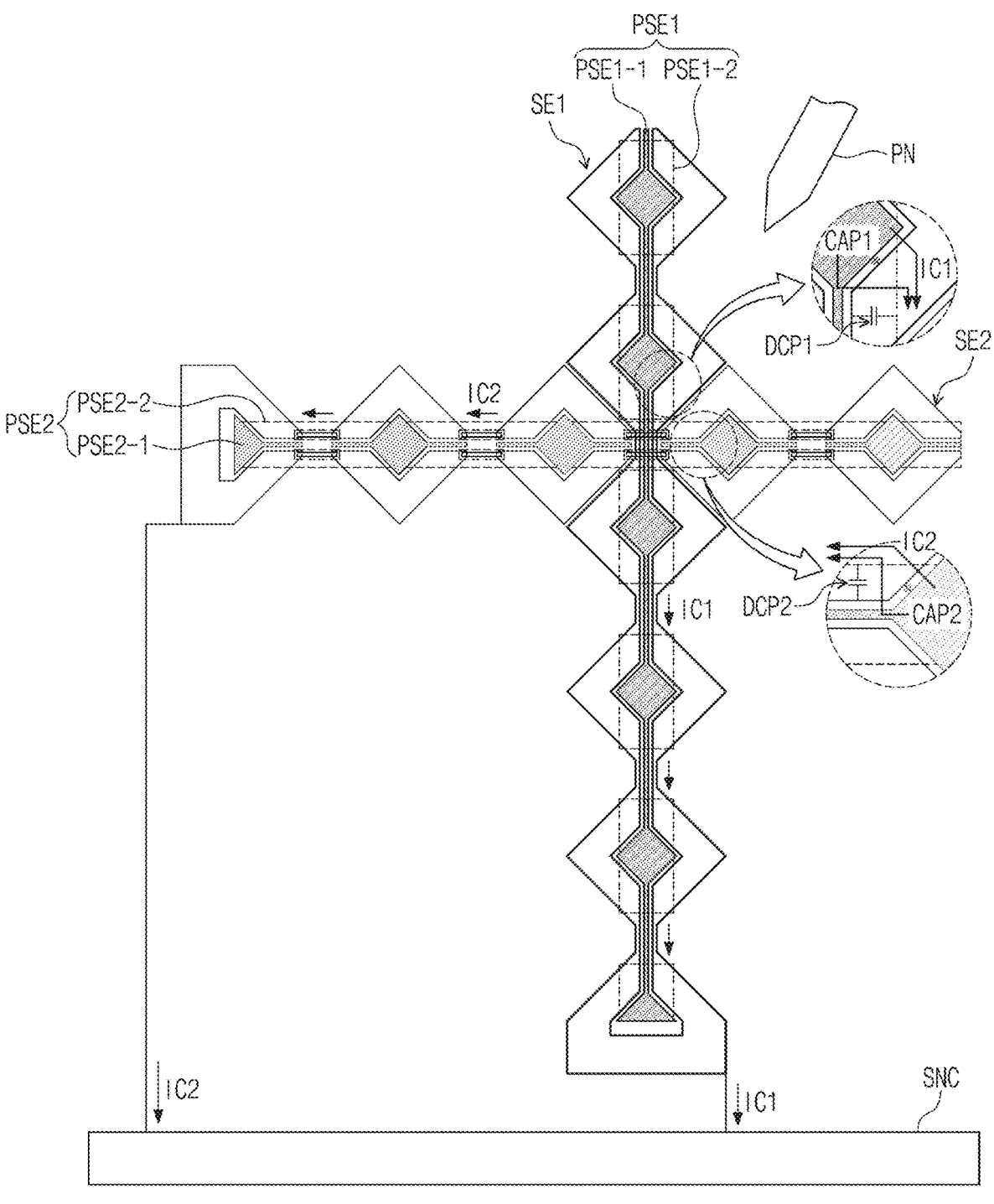
FIG. 15 is a plan view for explaining a sensing operation of the input sensing unit for a touch of a pen according to an embodiment of the present disclosure.

FIG. 15 is a plan view for explaining a sensing operation of the input sensing unit for a touch of the pen PN.

For convenience of description, a portion of one first pen sensing electrode PSE1 and a portion of one second pen sensing electrode PSE2 through which induced current generated by the pen PN flows are illustrated as an example in FIG. 15. In addition, the first sensing electrode SE1 adjacent to the pen sensing electrode 1-1 PSE1-1 and the second sensing electrode SE2 adjacent to the pen sensing electrode 2-1 PSE2-1 are illustrated in FIG. 15 together with the pen sensing electrode 1-1 PSE1-1 and the pen sensing electrode 2-1 PSE2-1. The pen sensing electrodes 1-2 PSE1-2 and 2-2 PSE2-2 are illustrated by dotted lines.

Referring to FIG. 15, during the pen sensing period following the charging period, a sensing circuit SNC may be connected to the first and second sensing electrodes SE1 and SE2. During the pen sensing period, a constant voltage may be applied to the pen sensing electrodes 1-1 PSE1-1 and the pen sensing electrodes 2-1 PSE2-1.

The LC resonance circuit of the pen PN may generate magnetic flux while consuming charged charges. Induced current may be generated in the pen sensing electrode 1-1 PSE1-1 and the pen sensing electrode 2-1 PSE2-1 by the magnetic flux. The pen may generate an oscillating magnetic field, and the induced current may be generated in the pen sensing electrodes 1-1 PSE1-1 and 1-2 PSE1-2 by the oscillating magnetic field.

First induced current IC1 generated in the pen sensing electrode 1-1 PSE1-1 may be provided to the first sensing electrode SE1 by a first capacitor CAP1 formed by the pen sensing electrode 1-1 PSE1-1 and the first sensing electrode SE1 and may be provided to the sensing circuit SNC.

A first dummy capacitor DCP1 may be formed by the pen sensing electrode 1-2 PSE1-2 and the first sensing electrode SE1 overlapping each other. The first induced current IC1 may be provided to the first sensing electrode SE1 by the first dummy capacitor DCP1 additionally formed by the pen sensing electrode 1-2 PSE1-2 and the first sensing electrode SE1 and may be provided to the sensing circuit SNC.

Second induced current IC2 generated in the pen sensing electrode 2-1 PSE2-1 may be provided to the second sensing electrode SE2 by a second capacitor CAP2 formed by the pen sensing electrode 2-1 PSE2-1 and the second sensing electrode SE2 and may be provided to the sensing circuit SNC.

A second dummy capacitor DCP2 may be formed by the pen sensing electrode 2-2 PSE2-2 and the second sensing electrode SE2 overlapping each other. The second induced current IC2 may be provided to the second sensing electrode SE2 by the second dummy capacitor DCP2 additionally formed by the pen sensing electrode 2-2 PSE2-2 and the second sensing electrode SE2 and may be provided to the sensing circuit SNC.

The sensing circuit SNC may sense the position of the pen PN by sensing the first induced current IC1 and the second induced current IC2 provided through the first and second sensing electrodes SE1 and SE2. A touch of the pen PN may be sensed by the pen sensing electrodes 1-1 PSE1-1 and 2-1 PSE2-1 and the first and second sensing electrodes SE1 and SE2.

In an embodiment of the present disclosure, the first and second induced currents IC1 and IC2 may be provided to the first and second sensing electrodes SE1 and SE2 by the first and second dummy capacitors DCP1 and DCP2 as well as the first and second capacitors CAP1 and CAP2. The first and second induced currents IC1 and IC2 may be defined as a sensing signal. The magnitude of the sensing signal may be defined by the magnitudes of the first and second induced currents IC1 and IC2.

When the first and second induced currents IC1 and IC2 are provided to the first and second sensing electrodes SE1 and SE2 using only the first and second capacitors CAP1 and CAP2, the sensing signal may be reduced depending on line resistance.

In an embodiment of the present disclosure, since the first and second pen sensing electrodes PSE1 and PSE2 are provided in a double layer structure, the first and second induced currents IC1 and IC2 may be transmitted by the first and second dummy capacitors DCP1 and DCP2 as well as the first and second capacitors CAP1 and CAP2, and the reduction in the sensing signal may be prevented. Accordingly, the sensing signal may be more easily provided to the sensing circuit SNC, and thus the sensing sensitivity for the pen PN may be improved.

Figure 16:
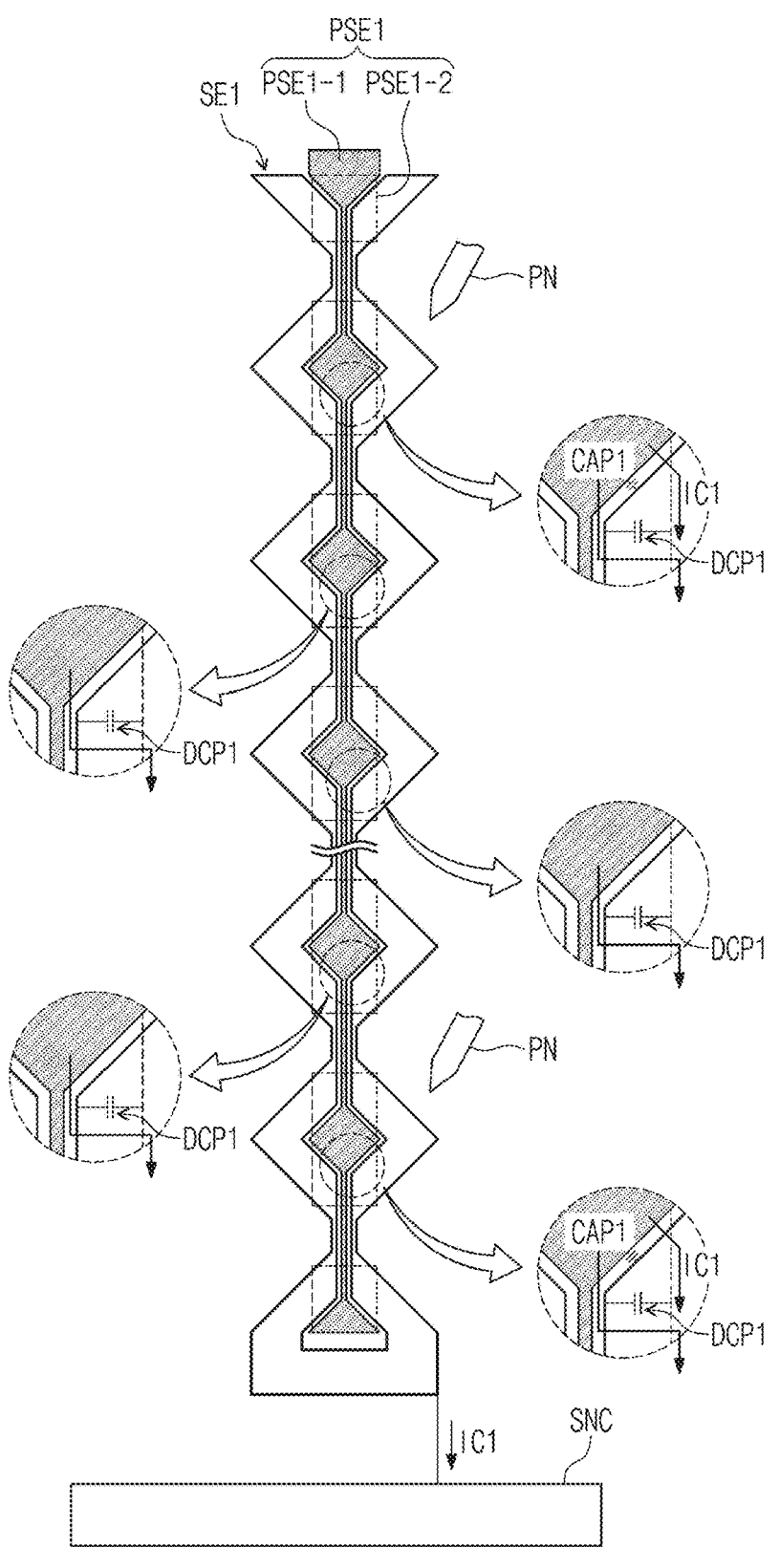
FIG. 16 is a plan view for explaining a sensing operation of the input sensing unit depending on various positions of the pen according to an embodiment of the present disclosure.

FIG. 16 is a plan view for explaining a sensing operation of the input sensing unit depending on various positions of the pen PN. For convenience of description, one first pen sensing electrode PSE1 and a first sensing electrode SE1 adjacent to a pen sensing electrode 1-1 PSE1-1 are illustrated as an example in FIG. 16.

Referring to FIG. 16, the first sensing electrode SE1 may be connected to the sensing circuit SNC. Line resistance to the first sensing electrode SE1 may increase away from the sensing circuit SNC. Accordingly, the magnitude of a sensing signal may be reduced in a region disposed away from the sensing circuit SNC. The magnitude of the sensing signal may be defined by the magnitude of induced current.

When the pen PN is disposed on a portion adjacent to the sensing circuit SNC, the first induced current IC1 may be provided to the first sensing electrode SE1 through the first dummy capacitor DCP1 adjacent to the sensing circuit SNC and may be provided to the sensing circuit SNC. The line resistance of the portion adjacent to the sensing circuit SNC may be small, and thus the first induced current IC1 generated in the portion adjacent to the sensing circuit SNC may be normally provided to the sensing circuit SNC.

When the pen PN is disposed on a portion far away from the sensing circuit SNC, for example, when the pen PN is disposed adjacent to the upper end of the pen sensing electrode 1-1 PSE1-1, the first induced current IC1 may be provided to the first sensing electrode SE1 by a plurality of first dummy capacitors DCP1 formed by the pen sensing electrodes 1-2 PSE1-2. The first induced current IC1 may be provided to the first sensing electrode SE1 by the first dummy capacitors DCP1 more than those in a case when the pen PN is disposed on a portion adjacent to the sensing circuit SNC as the distance from the sensing circuit SNC increases.

Since the first induced current IC1 is provided to the first sensing electrode SE1 by more first dummy capacitors DCP1, a reduction rate of the sensing signal depending on line resistance may be reduced even though the line resistance is high. Accordingly, even though the pen PN touches a portion far away from the sensing circuit SNC, the sensing signal may not be attenuated and enough sensing signal may be easily provided to the sensing circuit SNC, and the sensing sensitivity for the pen PN may be improved.

Although the pen sensing electrodes 1-1 PSE1-1 and 1-2 PSE1-2 have been described above, the pen sensing electrodes 2-1 PSE2-1 and 2-2 PSE2-2 may also similarly operate.

The input sensing unit according to the embodiment of the present disclosure may be disposed on the display panel and may sense the touch of the user and the touch of the pen. Since the single input sensing unit senses the different external inputs, the thickness of the display device may be decreased.

Since the input sensing unit includes the pen sensing electrodes provided in the double layer structure, the resistances of the pen sensing electrodes may be lowered, and the dummy capacitors may improve the sensitivity of sensing the touch of the pen.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:
1. An input sensing unit comprising:
a first sensing electrode extending in a first direction;

a second sensing electrode extending in a second direction crossing the first direction and insulated from the first sensing electrode;

a first electrode extending in the first direction and overlapping the first sensing electrode; and a second electrode extending in the second direction and overlapping the second sensing electrode, wherein the second sensing electrode includes a plurality of sensing patterns and a plurality of first connecting patterns disposed on a different layer from the plurality of sensing patterns and each connecting adjacent sensing patterns, wherein the first electrode includes a plurality of first electrode patterns and at least one second connecting pattern disposed on a different layer from the plurality of first electrode patterns and each connecting adjacent first electrode patterns, wherein the plurality of first connecting patterns, the plurality of first electrode patterns of the first electrode, and the second electrode are disposed on a same layer, and wherein the at least one second connecting pattern, the first sensing electrode and the plurality of sensing patterns of the second sensing electrode are disposed on a same layer.

2. The input sensing unit of claim 1, wherein the second electrode includes a first conductive layer and a second conductive layer disposed on the first conductive layer to overlap the first conductive layer in a plan view, and wherein the first conductive layer and the second conductive layer are connected to each other through contact holes formed through an insulating layer disposed between the first conductive layer and the second conductive layer.

3. The input sensing unit of claim 2, wherein the plurality of first connecting patterns are formed on a same plane as the first conductive layer.

4. The input sensing unit of claim 1, wherein the first electrode includes a third conductive layer forming the plurality of first electrode patterns and a fourth conductive layer disposed on the third conductive layer to overlap the third conductive layer in a plan view and forming the at least one second connecting pattern.

5. The input sensing unit of claim 4, wherein the third conductive layer and the fourth conductive layer are connected to each other through contact holes formed through an insulating layer disposed between the third conductive layer and the fourth conductive layer.

6. The input sensing unit of claim 5, wherein the second electrode includes a first conductive layer and a second conductive layer disposed on the first conductive layer to overlap the first conductive layer in a plan view, and wherein the first conductive layer extends continuously along the second direction and the third conductive layer has a disconnected portion in an area in which the first electrode and the second electrode cross each other.

7. The input sensing unit of claim 6, wherein the fourth conductive layer extends continuously along the first direction and the second conductive layer has a disconnected portion in an area in which the first electrode and the second electrode cross each other.

8. The input sensing unit of claim 7, further comprising a plurality of dummy patterns disposed to be spaced apart from the first conductive layer and the third conductive layer, wherein the plurality of dummy patterns are formed on a same plane as the first conductive layer and the third conductive layer.

9. The input sensing unit of claim 5, wherein the second electrode includes a first conductive layer and a second conductive layer disposed on the first conductive layer to overlap the first conductive layer in a plan view, and wherein each of the first conductive layer and the third conductive layer has a disconnected portion in an area close to a cross region of the first electrode and the second electrode.

10. The input sensing unit of claim 9, wherein the fourth conductive layer extends continuously along the first direction, and wherein the second conductive layer has at least one disconnected portion in an area close to a cross region of the first electrode and the second electrode.

11. The input sensing unit of claim 10, wherein each of the second conductive layer and the fourth conductive layer has at least one disconnected portion in an area close to a cross region of the first electrode and the second electrode.

12. The input sensing unit of claim 4, wherein the second electrode includes a first conductive layer and a second conductive layer disposed on the first conductive layer to overlap the first conductive layer in a plan view, wherein the first conductive layer is formed on a same plane as the third conductive layer, and wherein the second conductive layer is formed on a same plane as the fourth conductive layer.

13. The input sensing unit of claim 1, wherein the first sensing electrode includes a pair of first sensing electrodes symmetrical to each other with the first electrode disposed therebetween, and wherein the second sensing electrode includes a pair of second sensing electrodes symmetrical to each other with the second electrode disposed therebetween.

14. An input sensing unit comprising:

a first sensing electrode extending in a first direction;

a second sensing electrode extending in a second direction crossing the first direction and insulated from the first sensing electrode;

a first electrode extending in the first direction and overlapping the first sensing electrode;

a second electrode extending in the second direction and overlapping the second sensing electrode; and a first dummy pattern insulated from the first sensing electrode and the first electrode, and overlapping the first electrode in a plan view, wherein the first sensing electrode includes a pair of first sensing electrodes and the first dummy pattern is disposed between the pair of first sensing electrodes.

15. The input sensing unit of claim 14, wherein the second electrode includes a first conductive layer and a second conductive layer overlapping the first conductive layer in a plan view and connected to the first conductive layer through contact holes formed through an insulating layer disposed between the first conductive layer and the second conductive layer.

16. The input sensing unit of claim 15, wherein the first conductive layer is formed on a same plane as the first electrode, and wherein the first electrode extends continuously in the first direction and the first conductive layer has a disconnected portion in an area in which the first electrode and the second electrode cross each other.

17. The input sensing unit of claim 15, further comprising a plurality of second dummy patterns disposed to be spaced apart from the first conductive layer and the first electrode, wherein the plurality of second dummy patterns are formed on a same plane as the first conductive layer and the first electrode.

18. The input sensing unit of claim 14, wherein the first dummy pattern is a floating pattern.

19. The input sensing unit of claim 14, wherein the pair of first sensing electrodes symmetrical to each other with the first electrode disposed therebetween, and wherein the second sensing electrode includes a pair of second sensing electrodes symmetrical to each other with the second electrode disposed therebetween.

20. An input sensing unit comprising:

a pair of first sensing electrodes extending in a first direction, wherein each of the pair of first sensing electrodes includes a plurality of first sensing patterns and a plurality of first connecting patterns disposed on a different layer from the plurality of first sensing patterns and each connecting adjacent first sensing patterns of the plurality of first sensing patterns;

a second sensing electrode extending in a second direction crossing the first direction and insulated from the pair of first sensing electrodes;

a first electrode extending in the first direction and disposed between the pair of first sensing electrodes and overlapping the pair of first sensing electrodes; and a second electrode extending in the second direction and overlapping the second sensing electrode, wherein the second electrode includes a plurality of second electrode patterns and at least one second connecting pattern disposed on a different layer from the plurality of second electrode patterns and each connecting adjacent second electrode patterns of the plurality of second sensing patterns, wherein the second connecting pattern, the pair of first sensing electrodes, and the second sensing electrode are disposed on a same layer, and wherein the plurality of first connecting patterns, the first electrode and the second electrode are disposed on a same layer.

21. The input sensing unit of claim 20, wherein the first electrode includes a first conductive layer and a second conductive layer disposed on the first conductive layer to overlap the first conductive layer in a plan view, and wherein the first conductive layer and the second conductive layer are connected to each other through contact holes formed through an insulating layer disposed between the first conductive layer and the second conductive layer.

22. The input sensing unit of claim 21, wherein the second electrode includes a third conductive layer forming the plurality of second electrode patterns and a fourth conductive layer disposed on the third conductive layer to overlap the third conductive layer in a plan view and forming the at least one second connecting pattern, and wherein the third conductive layer and the fourth conductive layer are connected to each other through contact holes formed through an insulating layer disposed between the third conductive layer and the fourth conductive layer.

23. The input sensing unit of claim 22, wherein the first conductive layer is formed on a same plane as the third conductive layer, and the second conductive layer is formed on a same plane as the fourth conductive layer.

24. The input sensing unit of claim 23, wherein each of the first conductive layer and the third conductive layer has a disconnected portion in an area close to a cross region of the first electrode and the second electrode.

25. The input sensing unit of claim 24, wherein the second conductive layer extends continuously in a first direction and the fourth conductive layer has a disconnected portion in an area close to a cross region of the first electrode and the second electrode.

26. The input sensing unit of claim 23, wherein the second conductive layer extends continuously in a first direction and the fourth conductive layer has a disconnected portion in an area in which the first electrode and the second electrode cross each other.

27. The input sensing unit of claim 26, wherein the first conductive layer has a disconnected portion in an area in which the first electrode and the second electrode cross each other.

28. An electronic device comprising:

a substrate;

a circuit layer on the substrate, and comprising a transistor;

a light emitting element layer on the circuit layer and comprising a light-emitting element electrically connected to the transistor; and a sensor layer on the light emitting element layer, the sensor layer comprising:

a first sensing electrode extending in a first direction;

a second sensing electrode intersecting the first sensing electrode;

a first electrode overlapping the first sensing electrode and extending in the first direction; and a second electrode overlapping the second sensing electrode, wherein the second sensing electrode includes a plurality of first patterns spaced apart from each other and a first bridge pattern electrically connecting adjacent first patterns of the plurality of first patterns, wherein the first electrode includes a plurality of second patterns spaced apart from each other and a second bridge pattern electrically connecting adjacent second patterns of the plurality of second patterns, wherein the plurality of first patterns, the first sensing electrode, and the second bridge pattern are disposed on a same layer, and wherein the second electrode, the plurality of second patterns, and the first bridge pattern are disposed on a same layer.

* * * * *